United States Patent
Liang et al.

(10) Patent No.: US 12,473,276 B2
(45) Date of Patent: Nov. 18, 2025

(54) COMPOUND HAVING NEUROPROTECTIVE EFFECT, PREPARATION METHOD THEREFOR AND USE THEREOF

(71) Applicant: Shanghai Zhimeng Biopharma, Inc., Shanghai (CN)

(72) Inventors: Bo Liang, Shanghai (CN); Huanming Chen, Shanghai (CN); Gang Liu, Shanghai (CN); Zhijun Zhang, Shanghai (CN); Tian Xia, Shanghai (CN); Bo Hua, Shanghai (CN); Qiu Jin, Shanghai (CN)

(73) Assignee: SHANGHAI ZHIMENG BIOPHARMA, INC., Shanghai (CN)

( * ) Notice: Subject to any disclaimer, the term of this patent is extended or adjusted under 35 U.S.C. 154(b) by 782 days.

(21) Appl. No.: 17/783,796

(22) PCT Filed: Dec. 10, 2020

(86) PCT No.: PCT/CN2020/135289
§ 371 (c)(1),
(2) Date: Jun. 9, 2022

(87) PCT Pub. No.: WO2021/115380
PCT Pub. Date: Jun. 17, 2021

(65) Prior Publication Data
US 2023/0054304 A1    Feb. 23, 2023

(30) Foreign Application Priority Data
Dec. 10, 2019  (CN) .......................... 201911261595.5

(51) Int. Cl.
| | | |
|---|---|---|
| C07D 413/04 | (2006.01) | |
| C07D 263/58 | (2006.01) | |
| C07D 265/18 | (2006.01) | |
| C07D 413/14 | (2006.01) | |
| C07D 493/04 | (2006.01) | |
| C07D 498/10 | (2006.01) | |
| C07F 9/6584 | (2006.01) | |
| C07H 13/10 | (2006.01) | |

(52) U.S. Cl.
CPC ......... *C07D 413/04* (2013.01); *C07D 263/58* (2013.01); *C07D 265/18* (2013.01); *C07D 413/14* (2013.01); *C07D 493/04* (2013.01); *C07D 498/10* (2013.01); *C07F 9/65846* (2013.01); *C07H 13/10* (2013.01)

(58) Field of Classification Search
CPC ... C07D 413/04; C07D 413/14; C07D 265/18
See application file for complete search history.

(56) References Cited

U.S. PATENT DOCUMENTS

| | | |
|---|---|---|
| 6,624,186 B2 | 9/2003 | Teuber et al. |
| 2015/0197497 A1 | 7/2015 | Abeywickrama et al. |

FOREIGN PATENT DOCUMENTS

| | | |
|---|---|---|
| CN | 1329601 A | 1/2002 |
| CN | 1795192 A | 6/2006 |
| CN | 101160295 A | 4/2008 |
| CN | 107873031 A | 4/2018 |
| WO | 198905803 A1 | 6/1989 |
| WO | 2004037829 A1 | 5/2004 |
| WO | 2006039212 A2 | 4/2006 |
| WO | 2010021693 A2 | 2/2010 |
| WO | 2015052675 A1 | 4/2015 |
| WO | 2015155358 A1 | 10/2015 |
| WO | 2016127924 A1 | 8/2016 |

OTHER PUBLICATIONS

Extended European Search Report issued Dec. 5, 2023 in EP Application No. 20899991.2.
Int'l Search Report issued Mar. 25, 2021 in Int'l Application No. PCT/CN2020/135289.
"RN 2375729-08-9. RN 881539-79-3. RN 396101-33-0. RN 396098-93-4 STN" REG, Jun. 24, 2019 , pp. 1-2.
"RN 1974955-34-4, RN 1971607-27-8, RN 1906641-90-4, RN 1902583-31-6, RN 1902060-98-3, RN 1488137-30-9, RN 1040330-82-2, RN 1016681-22-3 STN" REG, Aug. 18, 2016, pp. 1-4.
Kumar et al, "Synthesis, characterization, pharmacological evaluation and molecular docking studies of novel benzoxazine derivatives for the treatment of inflammation," International Journal of Pharmaceutical Sciences and Research, vol. 5, No. 9, pp. 3897-3994 (Aug. 18, 2016).
Office Action issued Dec. 20, 2024 in EP Application No. 20899991.2.
Waisser et al., "Influence of the replacement of the oxo function with the thioxo group on the antimycobacterial activity of 3-aryl-6,8-dichloro-2H-1,3-benzoxazine-2,4(3H)-diones and 3-arylquinazoline-2,4(1H,3H)-diones," IL Farmaco, vol. 56, pp. 803-807 (2001).

(Continued)

*Primary Examiner* — Rebecca L Anderson
(74) *Attorney, Agent, or Firm* — Panitch Schwarze Belisario & Nadel LLP

(57) ABSTRACT

Disclosed are a compound having a neuroprotective effect, a preparation method therefor and a use thereof. Specifically, the compound has the structure shown by formula I, the definition of each group and substituent being as described in the description. Further disclosed are a preparation method for the compound and a use thereof for neuroprotection.

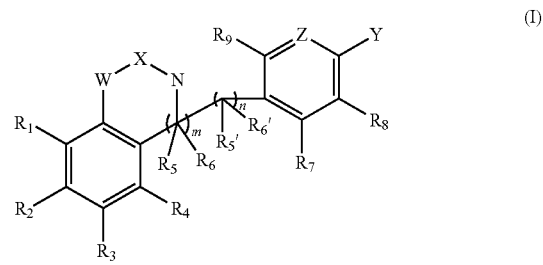

8 Claims, No Drawings

(56) References Cited

OTHER PUBLICATIONS

Yadav et al., "Mineral supported syntheses of benzoxazine-2-thiones under microwave irradiation," Tetrahedron, vol. 60, pp. 131-136 (2004).
Written Opinion in SG Application No. 11202250283Q (no date provided).
Office Action issued Aug. 17, 2022 in CN Application No. 202011454815.9.

COMPOUND HAVING NEUROPROTECTIVE EFFECT, PREPARATION METHOD THEREFOR AND USE THEREOF

CROSS-REFERENCE TO RELATED APPLICATIONS

This application is a Section 371 of International Application No. PCT/CN2020/133289, filed Dec. 10, 2020, which was published in the Chinese language on Jun. 17, 2021 under International Publication No. WO 2021/115380 A1, which claims priority under 35 U.S.C. § 119 (b) to Chinese Application No. 201911261595.5, filed Dec. 10, 2019.

TECHNICAL FIELD

The invention relates to the biomedical field, in particular to a class of neuroprotective compounds and their preparation methods and uses.

BACKGROUND ART

Stroke is an acute cerebrovascular disease, including ischemic and hemorrhagic stroke. The incidence of ischemic stroke accounts for 60%~70% of the total number of strokes. Stroke has the characteristics of high incidence, high mortality and high disability.

The molecular mechanism of neuroprotection and the development of neuroprotective drugs are one of the hot research fields in stroke treatment. Currently commonly used neuroprotective agents include free radical scavengers, glutamate antagonists, calcium channel antagonists, cell membrane stabilizers, etc. However, due to the complexity of the pathogenesis of stroke, there is no ideal neuroprotective agent in clinical practice. Due to the high incidence and great harm of stroke, it is of great significance to develop new neuroprotective agents.

SUMMARY OF THE INVENTION

The purpose of the present invention is to provide a compound of formula I, a preparation method thereof, and its use in neuroprotection.

In the first aspect of the present invention, it provides a compound of formula I or a stereoisomer, or a pharmaceutically acceptable salt thereof:

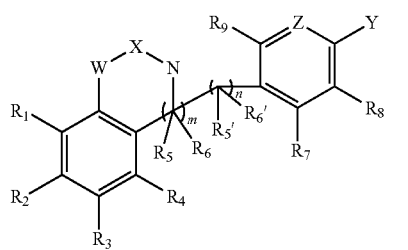

Formula I wherein, $R_1$, $R_2$, $R_3$, $R_4$, $R_5$, $R_5'$, $R_6$, $R_6'$, $R_7$, $R_8$ and $R_9$ are each independently selected from the group consisting of hydrogen, halogen, amino, hydroxyl, carboxyl, nitro, cyano, $C_{1-6}$alkyl, $C_{1-6}$ alkoxy, halogenated $C_{1-6}$ alkyl, halogenated $C_{1-6}$ alkoxy, $C_{3-6}$ cycloalkyl, halogenated $C_{3-6}$ cycloalkyl, and $C_{1-6}$ alkylamino;

$R_5$ and $R_6$ or $R_5'$ and $R_6'$ can cyclize to form substituted or unsubstituted 3-8 membered saturated or unsaturated cycloalkyl or heterocycloalkyl containing one or more (e.g. 2, 3, or 4) heteroatoms selected from N, S or O, and the substituted refers to being substituted by one or more (e.g. 2, 3, or 4) substituents selected from the group consisting of hydrogen, halogen, and $C_{1-6}$alkyl;

X is selected from the group consisting of

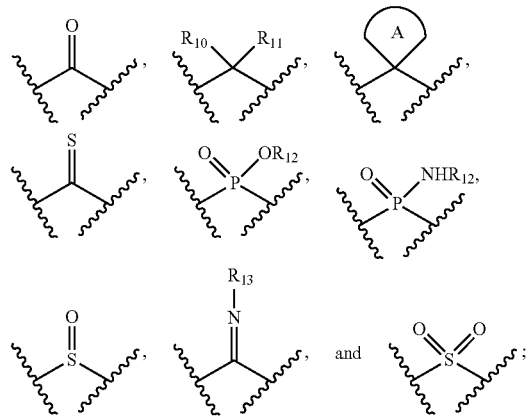

$R_{10}$, $R_{11}$, $R_{12}$ and $R_{13}$ are each independently selected from the group consisting of hydrogen, halogen, $C_{1-6}$ alkyl, $C_{3-6}$ cycloalkyl, $C_{1-6}$ alkoxy, halogenated $C_{1-6}$ alkyl, halogenated $C_{3-6}$ cycloalkyl, halogenated $C_{1-6}$ alkoxy, substituted or unsubstituted $C_{6-10}$ aryl, substituted or unsubstituted 5-6 membered heteroaryl containing one or more (e.g. 2, 3, or 4) heteroatoms selected from N, S or O, and 3-8 membered saturated or unsaturated heterocycloalkyl containing one or more (e.g. 2, 3, or 4) heteroatoms selected from N, S or O, and the substituted refers to being substituted by one or more (e.g. 2, 3, or 4) substituents selected from the group consisting of hydrogen, halogen, and $C_{1-6}$ alkyl;

ring A is substituted or unsubstituted 3-8 membered saturated or unsaturated cycloalkyl or substituted or unsubstituted 3-8 membered heterocycloalkyl containing one or more (e. g. 2, 3, or 4) heteroatoms selected from N, S or O, and the substituted refers to being substituted by one or more (e.g. 2, 3, or 4) substituents selected from the group consisting of hydrogen, halogen, and $C_{1-6}$ alkyl;

W is selected from the group consisting of O, S, and $NR_{19}$;

$R_{19}$ is selected from the group consisting of hydrogen, $C_{1-6}$ alkyl, $C_{3-6}$ cycloalkyl, halogenated $C_{1-6}$ alkyl, halogenated $C_{3-6}$ cycloalkyl, $C_{6-10}$ aryl, substituted or unsubstituted 3-8 membered saturated or unsaturated heterocycloalkyl or heteroaryl containing one or more (e.g. 2, 3 or 4) heteroatoms selected from N, S or O, and the substituted refers to being substituted by one or more (e.g. 2, 3, or 4) substituents selected from the group consisting of hydrogen, halogen, and $C_{1-6}$ alkyl;

m is 0 or 1;

n is 0 or 1;

Z is N or $CR_{18}$;

$R_{18}$ is selected from the group consisting of hydrogen, hydroxyl, halogen, amino, cyano, $C_{1-6}$ alkyl, $C_{3-6}$ cycloalkyl, $C_{1-6}$ alkoxy, halogenated $C_{1-6}$ alkyl, halogenated $C_{3-6}$ cycloalkyl, halogenated $C_{1-6}$ alkoxy, and $C_{1-6}$ alkylamino;

Y is selected from the group consisting of $COOR_{15}$, $CONR_{16}R_{17}$, $C_{6-10}$ aryl, 3-8 membered saturated or unsaturated heterocycloalkyl or heteroaryl containing one or more (e.g. 2, 3 or 4) heteroatoms selected from N, S or O, and the heterocycloalkyl is optionally substituted by one or more (e.g. 2, 3, or 4) substituents selected from the group consisting of =O, hydrogen, halogen, and $C_{1-6}$ alkyl;

$R_{15}$, $R_{16}$, and $R_{17}$ are each independently selected from the group consisting of hydrogen, $C_{1-6}$ alkyl, $C_{3-8}$ cycloalkyl, $C_{6-10}$ aryl, 3-15 membered saturated or unsaturated heterocycloalkyl or heteroaryl containing one or more (e.g. 2, 3 or 4) heteroatoms selected from N, S or O, and —($C_{1-6}$ alkylene) (3-15 membered saturated or unsaturated heterocycloalkyl or heteroaryl containing one or more (e.g. 2, 3, 4 or 5) heteroatoms selected from N, S or O); the alkyl, cycloalkyl, aryl, heteroaryl and heterocycloalkyl are optionally substituted by one or more (e.g. 2, 3 or 4) substituents selected from the group consisting of hydrogen, halogen, hydroxyl, $C_{1-6}$ alkylene hydroxyl, =O, —$NR_{20}R_{21}$, cyano, $C_{2-6}$ alkynyl, $C_{2-6}$ alkenyl, $C_{1-6}$ alkyl, $C_{3-8}$ cycloalkyl, 3-8 membered heterocycloalkyl containing one or more (e.g. 2, 3 or 4) heteroatoms selected from N, S or O unsubstituted or substituted by $C_{1-6}$ alkyl, halogenated $C_{1-6}$ alkyl, $C_{1-6}$ alkyl substituted by amino and carboxyl, $C_{1-6}$ alkoxy, 5-10 membered heteroaryl containing one or more (e.g. 2, 3 or 4) heteroatoms selected from N, S or O, $C_{6-12}$ aryl, and —$COO(C_{1-6}$ alkyl);

$R_{20}$ and $R_{21}$ are independently selected from the group consisting of hydrogen, $C_{1-6}$ alkyl, $C_{3-6}$ cycloalkyl, halogenated $C_{1-6}$ alkyl, and halogenated $C_{3-6}$ cycloalkyl;

or Y and $R_8$ cyclize to form

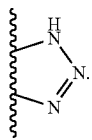

In another preferred embodiment, m=1, n=0;

$R_1$, $R_2$, $R_3$, $R_4$, $R_5$, $R_5'$, $R_6$, $R_6'$, $R_7$, $R_8$ and $R_9$ are each independently selected from the group consisting of hydrogen, halogen, $C_{1-6}$ alkyl, $C_{3-6}$ cycloalkyl, $C_{1-6}$ alkoxy, halogenated $C_{1-6}$ alkyl, halogenated $C_{3-6}$ cycloalkyl, and halogenated $C_{1-6}$ alkoxy;

X is selected from the group consisting of

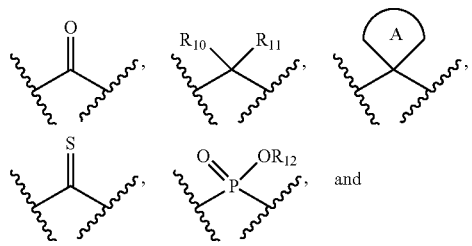

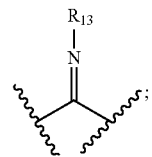

$R_{10}$, $R_{11}$, $R_{12}$ and $R_{13}$ are each independently selected from the group consisting of hydrogen, halogen, $C_{1-6}$ alkyl, $C_{3-6}$ cycloalkyl, halogenated $C_{1-6}$ alkyl, halogenated $C_{3-6}$ cycloalkyl, substituted or unsubstituted $C_{6-10}$ aryl, and substituted or unsubstituted 5-6 membered heteroaryl containing one or more (e.g. 2, 3, or 4) heteroatoms selected from N, S or O, and the substituted refers to being substituted by one or more (e.g. 2, 3, or 4) substituents selected from the group consisting of hydrogen, halogen, and $C_{1-6}$ alkyl;

ring A is substituted or unsubstituted 3-8 membered cycloalkyl or substituted or unsubstituted 3-8 membered heterocycloalkyl containing one or more (e.g. 2, 3, or 4) heteroatoms selected from N, S, or O, and the substituted refers to being substituted by one or more (e.g. 2, 3, or 4) substituents selected from the group consisting of hydrogen, halogen, and $C_{1-6}$ alkyl;

W is O;

Z is N or $CR_{18}$;

$R_{18}$ is selected from the group consisting of hydrogen, hydroxyl, halogen, amino, cyano, $C_{1-6}$ alkyl, $C_{3-6}$ cycloalkyl, $C_{1-6}$ alkoxy, halogenated $C_{1-6}$ alkyl, halogenated $C_{3-6}$ cycloalkyl, halogenated $C_{1-6}$ alkoxy, and $C_{1-6}$ alkylamino;

Y is selected from the group consisting of $COOR_{15}$, and substituted or unsubstituted 3-8 membered saturated or unsaturated heterocycloalkyl or heteroaryl containing one or more (e.g. 2, 3 or 4) heteroatoms selected from N, S or O, and the heterocycloalkyl is optionally substituted by one or more (e.g. 2, 3 or 4) substituents selected from the group consisting of =O, hydrogen, halogen, and $C_{1-6}$ alkyl;

$R_{15}$ is selected from the group consisting of hydrogen, $C_{1-6}$ alkyl, $C_{3-8}$ cycloalkyl, $C_{6-10}$ aryl, 3-15 membered saturated or unsaturated heterocycloalkyl or heteroaryl containing one or more (e.g. 2, 3 or 4) heteroatoms selected from N, S or O, and —($C_{1-6}$ alkylene) (3-15 membered saturated or unsaturated heterocycloalkyl or heteroaryl containing one or more (e.g. 2, 3, 4 or 5) heteroatoms selected from N, S or O); the alkyl, cycloalkyl, aryl, heteroaryl and heterocycloalkyl are optionally substituted by one or more (e.g. 2, 3 or 4) substituents selected from the group consisting of hydrogen, halogen, hydroxyl, $C_{1-6}$ alkylene hydroxyl, =O, —$NR_{20}R_{21}$, cyano, $C_{2-6}$ alkynyl, $C_{2-6}$ alkenyl, $C_{1-6}$ alkyl, $C_{3-10}$ cycloalkyl, 3-8 membered heterocycloalkyl containing one or more (e.g. 2, 3 or 4) heteroatoms selected from N, S or O unsubstituted or substituted by $C_{1-6}$ alkyl, halogenated $C_{1-6}$ alkyl, $C_{1-6}$ alkyl substituted by amino and carboxyl, $C_{1-6}$ alkoxy, 5-10 membered heteroaryl containing one or more (e.g. 2, 3 or 4) heteroatoms selected from N, S or O, $C_{6-12}$ aryl, —$COO(C_{1-6}$alkyl);

$R_{20}$ and $R_{21}$ are independently selected from the group consisting of hydrogen, $C_{1-6}$ alkyl, $C_{3-6}$ cycloalkyl, halogenated $C_{1-6}$ alkyl, and halogenated $C_{3-6}$ cycloalkyl;

or Y and $R_8$ cyclize to form

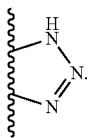

In another preferred embodiment, m=0, n=1;
$R_1$, $R_2$, $R_3$, $R_4$, $R_5$, $R_5'$, $R_6$, $R_6'$, $R_7$, $R_8$ and $R_9$ are each independently selected from the group consisting of hydrogen, halogen, $C_{1-6}$ alkyl, $C_{3-6}$ cycloalkyl, $C_{1-6}$ alkoxy, halogenated $C_{1-6}$ alkyl, halogenated $C_{3-6}$ cycloalkyl, and halogenated $C_{1-6}$ alkoxy;

X is selected from the group consisting of

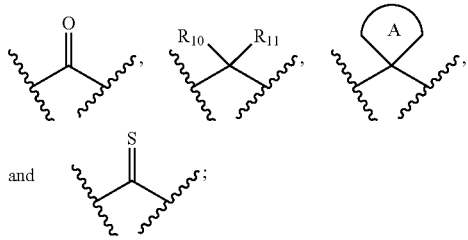

$R_{10}$ and $R_{11}$ are each independently selected from the group consisting of hydrogen, halogen, $C_{1-6}$ alkyl, $C_{3-6}$ cycloalkyl, halogenated $C_{1-6}$ alkyl, halogenated $C_{3-6}$ cycloalkyl, substituted or unsubstituted $C_{6-10}$ aryl, and substituted or unsubstituted 5-6 membered heteroaryl containing one or more (e.g. 2, 3, or 4) heteroatoms selected from N, S or O, and the substituted refers to being substituted by one or more (e.g. 2, 3, or 4) substituents selected from the group consisting of hydrogen, halogen, and $C_{1-6}$ alkyl;

ring A is substituted or unsubstituted 3-8 membered cycloalkyl or substituted or unsubstituted 3-8 membered heterocycloalkyl containing one or more (e.g. 2, 3, or 4) heteroatoms selected from N, S, or O, and the substituted refers to being substituted by one or more (e.g. 2, 3, or 4) substituents selected from the group consisting of hydrogen, halogen, and $C_{1-6}$ alkyl;

W is O;
Z is N or $CR_{18}$;
$R_{18}$ is selected from the group consisting of hydrogen, hydroxyl, halogen, amino, cyano, $C_{1-6}$ alkyl, $C_{3-6}$ cycloalkyl, $C_{1-6}$ alkoxy, halogenated $C_{1-6}$ alkyl, halogenated $C_{3-6}$ cycloalkyl, halogenated $C_{1-6}$ alkoxy, and $C_{1-6}$ alkylamino;

Y is $COOR_{15}$;
$R_{15}$ is selected from the group consisting of hydrogen, $C_{1-6}$ alkyl, $C_{3-8}$ cycloalkyl, $C_{6-10}$ aryl, and 3-15 membered saturated or unsaturated heterocycloalkyl or heteroaryl containing one or more (e.g. 2, 3 or 4) heteroatoms selected from N, S or O; the alkyl, cycloalkyl, aryl, heteroaryl and heterocycloalkyl are optionally substituted by one or more (e.g. 2, 3 or 4) substituents selected from the group consisting of hydrogen, halogen, hydroxyl, =O, cyano, $C_{2-6}$ alkynyl, $C_{2-6}$ alkenyl, $C_{1-6}$ alkyl, $C_{3-8}$ cycloalkyl, 3-8 membered heterocycloalkyl containing one or more (e.g. 2, 3 or 4) heteroatoms selected from N, S or O unsubstituted or substituted by $C_{1-6}$ alkyl, halogenated $C_{1-6}$ alkyl, $C_{1-6}$ alkoxy, 5-10 membered heteroaryl containing one or more (e.g. 2, 3 or 4) heteroatoms selected from N, S or O, and $C_{6-12}$ aryl.

In another preferred embodiment, $R_1$ and $R_3$ are Cl.
In another preferred embodiment, $R_2$, $R_4$, $R_5$, $R_5'$, $R_6$, $R_6'$, $R_7$, $R_8$, $R_9$ are hydrogen.

In another preferred embodiment, X is selected from the group consisting of

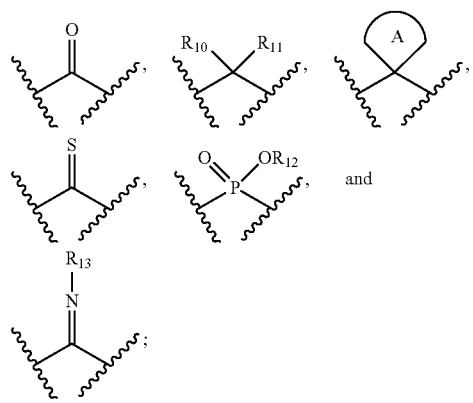

$R_{10}$, $R_{11}$, $R_{12}$ and $R_{13}$ are each independently selected from the group consisting of hydrogen, halogen, $C_{1-6}$ alkyl, $C_{3-6}$ cycloalkyl, $C_{1-6}$ alkoxy, halogenated $C_{1-6}$ alkyl, halogenated $C_{3-6}$ cycloalkyl, halogenated $C_{1-6}$ alkoxy, substituted or unsubstituted $C_{6-10}$ aryl, substituted or unsubstituted 5-6 membered heteroaryl containing one or more (e.g. 2, 3, or 4) heteroatoms selected from N, S or O, and 3-8 membered saturated or unsaturated heterocycloalkyl containing one or more (e.g. 2, 3, or 4) heteroatoms selected from N, S or O, and the substituted refers to being substituted by one or more (e.g. 2, 3, or 4) substituents selected from the group consisting of hydrogen, halogen, and $C_{1-6}$ alkyl;

ring A is substituted or unsubstituted 3-8 membered saturated or unsaturated cycloalkyl or substituted or unsubstituted 3-8 membered heterocycloalkyl containing one or more (e. g. 2, 3, or 4) heteroatoms selected from N, S or O, and the substituted refers to being substituted by one or more (e.g. 2, 3, or 4) substituents selected from the group consisting of hydrogen, halogen, and $C_{1-6}$ alkyl.

In another preferred embodiment, W is 0.
In another preferred embodiment, m=1 and n=0.
In another preferred embodiment, m=0 and n=1.
In another preferred embodiment, Z is N or $CR_{18}$;
$R_{18}$ is selected from the group consisting of hydrogen, hydroxyl, halogen, amino, cyano, $C_{1-6}$ alkyl, $C_{3-6}$ cycloalkyl, $C_{1-6}$ alkoxy, halogenated $C_{1-6}$ alkyl, halogenated $C_{3-6}$ cycloalkyl, halogenated $C_{1-6}$ alkoxy, and $C_{1-6}$ alkylamino.

In another preferred embodiment, Y is selected from the group consisting of $COOR_{15}$, and 3-8 membered saturated or unsaturated heterocycloalkyl or heteroaryl containing one or more (e.g. 2, 3 or 4) heteroatoms selected from N, S or O, and the heterocycloalkyl is optionally substituted by one or more (e.g. 2, 3, or 4) substituents selected from the group consisting of =O, hydrogen, halogen, and $C_{1-6}$ alkyl;

$R_{15}$ is selected from the group consisting of hydrogen, $C_{1-6}$ alkyl, $C_{3-8}$ cycloalkyl, $C_{6-10}$ aryl, 3-15 membered saturated or unsaturated heterocycloalkyl or heteroaryl containing one or more (e.g. 2, 3 or 4) heteroatoms selected from N, S or O, and —(C$_{1-6}$ alkylene) (3-15 membered saturated or unsaturated heterocycloalkyl or heteroaryl containing one or more (e.g. 2, 3, 4 or 5) heteroatoms selected from N, S or O); the alkyl, cycloalkyl, aryl, heteroaryl and heterocycloalkyl are optionally substituted by one or more (e.g. 2, 3 or 4) substituents selected from the group consisting of hydrogen, halogen, hydroxyl, C$_{1-6}$ alkylene hydroxyl, =O, —NR$_{20}$R$_{21}$, cyano, C$_{2-6}$ alkynyl, C$_{2-6}$ alkenyl, C$_{1-6}$ alkyl, C$_{3-10}$ cycloalkyl, 3-8 membered heterocycloalkyl containing one or more (e.g. 2, 3 or 4) heteroatoms selected from N, S or O unsubstituted or substituted by C$_{1-6}$ alkyl, halogenated C$_{1-6}$ alkyl, C$_{1-6}$ alkyl substituted by amino and carboxyl, C$_{1-6}$ alkoxy, 5-10 membered heteroaryl containing one or more (e.g. 2, 3 or 4) heteroatoms selected from N, S or O, C$_{6-12}$ aryl, and —COO(C$_{1-6}$ alkyl);

R$_{20}$ and R$_{21}$ are independently selected from the group consisting of hydrogen, C$_{1-6}$ alkyl, C$_{3-6}$ cycloalkyl, halogenated C$_{1-6}$ alkyl, and halogenated C$_{3-6}$ cycloalkyl.

In another preferred embodiment, Y and R$_8$ cyclize to form

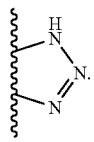

In another preferred embodiment, Y is selected from the group consisting of COOR$_{15}$,

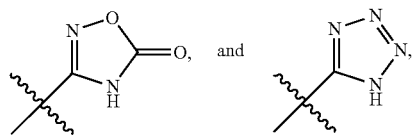 [SMILES: *c1noc(=O)[nH]1 ; *c1nnn[nH]1]

R$_{15}$ is as defined above;
Z is selected from the group consisting of N and C(OH).

In another preferred embodiment, Y is COOR$_{15}$; R$_{15}$ is selected from the group consisting of hydrogen, C$_{1-6}$ alkyl, C$_{3-8}$ cycloalkyl, C$_{6-10}$ aryl, and 3-15 membered saturated or unsaturated heterocycloalkyl containing one or more (e.g. 2, 3 or 4) heteroatoms selected from N, S or O; the alkyl, cycloalkyl, aryl and heterocycloalkyl are optionally substituted by one or more (e.g. 2, 3 or 4) substituents selected from the group consisting of hydrogen, halogen, hydroxyl, —NR$_{20}$R$_{21}$, cyano, C$_{2-6}$ alkynyl, C$_{2-6}$ alkenyl, C$_{1-6}$ alkyl, C$_{3-10}$ cycloalkyl; R$_{20}$ and R$_{21}$ are as described above;
Z is N.

In another preferred embodiment, Y is COOR$_{15}$; R$_{15}$ is selected from the group consisting of C$_{1-6}$ alkyl, C$_{3-8}$ cycloalkyl, and 3-15 membered saturated or unsaturated heterocycloalkyl containing one or more (e.g. 2, 3 or 4) heteroatoms selected from N, S or O; the heterocycloalkyl is optionally substituted by one or more (e.g. 2, 3 or 4) substituents selected from the group consisting of hydrogen, halogen, C$_{1-6}$ alkyl, and C$_{3-10}$ cycloalkyl;
Z is C(OH).

In another preferred embodiment, R$_1$, R$_2$, R$_3$, R$_4$, R$_7$, R$_8$ and R$_9$ are each independently selected from the group consisting of hydrogen, and halogen;
R$_5$, R$_5$', R$_6$ and R$_6$' are each hydrogen;
W is O;
X is

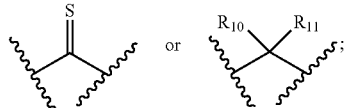

Z is N or C(OH);
Y is COOR$_{15}$;
R$_{10}$ and R$_{11}$ are each independently selected from the group consisting of hydrogen, halogen, C$_{1-6}$ alkyl, C$_{3-6}$ cycloalkyl, halogenated C$_{1-6}$ alkyl, and halogenated C$_{3-6}$ cycloalkyl;
R$_{15}$ is selected from the group consisting of hydrogen, C$_{1-6}$ alkyl, C$_{3-8}$ cycloalkyl, C$_{6-10}$ aryl, 3-15 membered saturated or unsaturated heterocycloalkyl or heteroaryl containing one or more (e.g. 2, 3 or 4) heteroatoms selected from N, S or O, and —(C$_{1-6}$ alkylene) (3-15 membered saturated or unsaturated heterocycloalkyl or heteroaryl containing one or more (e.g. 2, 3, 4 or 5) heteroatoms selected from N, S or O); the alkyl, cycloalkyl, aryl, heteroaryl and heterocycloalkyl are optionally substituted by one or more (e.g. 2, 3 or 4) substituents selected from the group consisting of hydrogen, halogen, hydroxyl, C$_{1-6}$ alkylene hydroxyl, =O, —NR$_{20}$R$_{21}$, cyano, C$_{2-6}$ alkynyl, C$_{2-6}$ alkenyl, C$_{1-6}$ alkyl, C$_{3-8}$ cycloalkyl, 3-8 membered heterocycloalkyl containing one or more (e.g. 2, 3 or 4) heteroatoms selected from N, S or O unsubstituted or substituted by C$_{1-6}$ alkyl, halogenated C$_{1-6}$ alkyl, C$_{1-6}$ alkyl substituted by amino and carboxyl, C$_{1-6}$ alkoxy, 5-10 membered heteroaryl containing one or more (e.g. 2, 3 or 4) heteroatoms selected from N, S or O, C$_{6-12}$ aryl, and —COO(C$_{1-6}$ alkyl);
R$_{20}$ and R$_{21}$ are independently selected from the group consisting of hydrogen, C$_{1-6}$ alkyl, C$_{3-6}$ cycloalkyl, halogenated C$_{1-6}$ alkyl, and halogenated C$_{3-6}$ cycloalkyl;
for m and n, m=1 and n=0, or m=0 and n=1.

In another preferred embodiment, R$_1$, R$_2$, R$_3$, R$_4$, R$_7$, R$_8$ and R$_9$ are each independently selected from the group consisting of hydrogen, and halogen;
R$_5$, R$_5$', R$_6$ and R$_6$' are each hydrogen;
W is O;
X is

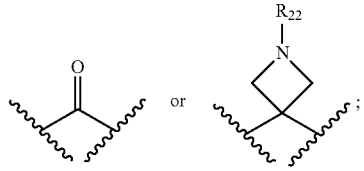

Z is N or C(OH);
Y is COOR$_{15}$;
R$_{15}$ is selected from the group consisting of hydrogen, C$_{1-6}$ alkyl, C$_{3-8}$ cycloalkyl, C$_{6-10}$ aryl, 3-15 membered saturated or unsaturated heterocycloalkyl or heteroaryl containing one or more (e.g. 2, 3 or 4) heteroatoms selected from N, S or O, and —(C$_{1-6}$ alkylene) (3-15 membered saturated or unsaturated heterocycloalkyl or heteroaryl containing one or more (e.g. 2, 3, 4 or 5) heteroatoms selected from N, S or O); the alkyl, cycloalkyl, aryl, heteroaryl and heterocycloalkyl are optionally substituted by one or more (e.g. 2, 3 or 4) substituents selected from the group consisting of hydrogen, halogen, hydroxyl, C$_{1-6}$ alkylene hydroxyl, =O, —NR$_{20}$R$_{21}$, cyano, C$_{2-6}$ alkynyl, C$_{2-6}$ alkenyl, C$_{1-6}$ alkyl, C$_{3-8}$ cycloalkyl, 3-8 membered heterocycloalkyl containing one or more (e.g. 2, 3 or 4) heteroatoms selected from N, S or O unsubstituted or substituted by C$_{1-6}$ alkyl, halogenated C$_{1-6}$ alkyl, C$_{1-6}$ alkyl substituted by amino and carboxyl, C$_{1-6}$ alkoxy, 5-10 membered heteroaryl containing one or more (e.g. 2, 3 or 4) heteroatoms selected from N, S or O, C$_{6-12}$ aryl, and —COO(C$_{1-6}$ alkyl);

R$_{20}$ and R$_{21}$ are independently selected from the group consisting of hydrogen, C$_{1-6}$ alkyl, C$_{3-6}$ cycloalkyl, halogenated C$_{1-6}$ alkyl, and halogenated C$_{3-6}$ cycloalkyl;

R$_{22}$ is selected from the group consisting of hydrogen and C$_{1-6}$ alkyl;

for m and n, m=1 and n=0, or m=0 and n=1.

In another preferred embodiment, R$_1$, R$_2$, R$_3$, R$_4$, R$_7$, R$_8$ and R$_9$ are each independently selected from the group consisting of hydrogen, and halogen;

R$_5$, R$_5$', R$_6$ and R$_6$' are each hydrogen;
W is O;
X is

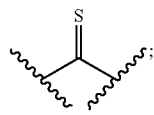 [SMILES: *C(*)=S]

Z is N;
Y is COOR$_{15}$;

R$_{15}$ is selected from the group consisting of hydrogen, C$_{1-6}$ alkyl, and C$_{3-8}$ cycloalkyl; the alkyl and cycloalkyl are optionally substituted by one or more (e.g. 2, 3 or 4) C$_{1-6}$ alkoxy;

for m and n, m=1 and n=0, or m=0 and n=1.

In another preferred embodiment, R$_1$, R$_2$, R$_3$, R$_4$, R$_7$, R$_8$ and R$_9$ are each independently selected from the group consisting of hydrogen, and halogen;

R$_5$, R$_5$', R$_6$ and R$_6$' are each hydrogen;
W is O;
X is

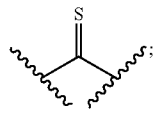

Z is N;
Y is COOR$_{15}$;
R$_{15}$ is C$_{1-6}$ alkyl substituted by C$_{1-6}$ alkoxy;
m=1 and n=0.

In another preferred embodiment, in "C$_{1-6}$ alkyl substituted by C$_{1-6}$ alkoxy", the C$_{1-6}$ alkoxy is selected from the group consisting of methoxy, ethoxy, propoxy, isopropoxy and butoxy;

the C$_{1-6}$ alkyl is selected from the group consisting of methyl, ethyl, propyl, isopropyl, butyl, isobutyl, tert-butyl, neopentyl, and ter-pentyl.

In another preferred embodiment, the compound is as described below.

In the second aspect of the present invention, it provides a preparation method for the compound or the stereoisomer, or the pharmaceutically acceptable salt thereof according to the first aspect of the present invention comprising the following steps:

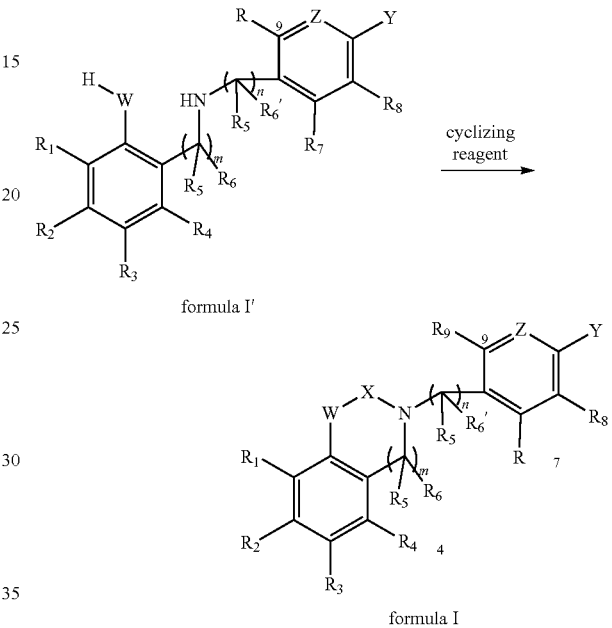

reacting a compound of formula I' with a cyclizing reagent to obtain the compound of formula I;

wherein, R$_1$, R$_2$, R$_3$, R$_4$, R$_5$, R$_5$', R$_6$, R$_6$', R$_7$, R$_8$, R$_9$, W, X, Z, Y, m and n are as defined in the first aspect of the present invention.

In another preferred embodiment, the cyclizing reagent is selected from the group consisting of phosgene (carbonyl chloride), bis (trichloromethyl) carbonate, N,N'-carbonyldiimidazole (CDI), thiophosgene, N,N'-thiocarbonyldiimidazole (TCDT), fatty aldehydes, aromatic aldehydes, fatty ketones, aromatic ketones, phosphorus oxychloride, cyanogen bromide, or a combination thereof.

In another preferred embodiment, the fatty aldehyde is selected from the group consisting of paraformaldehyde, n-butyraldehyde, or a combination thereof.

In another preferred embodiment, the fatty ketone is selected from the group consisting of cyclobutanone, 3-oxetanone, or a combination thereof.

In another preferred embodiment, the aromatic aldehyde is benzaldehyde.

In the third aspect of the present invention, it provides a pharmaceutical composition comprising a pharmaceutically acceptable carrier and one or more compounds, or the stereoisomer, or the pharmaceutically acceptable salt thereof according to the first aspect of the present invention.

In the fourth aspect of the present invention, it provides a use of the compound, or the stereoisomer, or the pharmaceutically acceptable salt thereof according to the first aspect of the present invention for the preparation of a medicament for the prevention and/or treatment of neuronal damage-affected diseases or disorders.

In another preferred embodiment, the neuronal damage-affected diseases or disorders are selected from the group consisting of neuropathic pain, migraine, inflammatory pain, chronic pain, stroke, brain injury, depression, Alzheimer's disease, epilepsy, affective disorders, and neurodegenerative diseases.

In the fifth aspect of the invention, it provides a neuroprotective agent comprising one or more compounds or the stereoisomer, or the pharmaceutically acceptable salt thereof according to the first aspect of the invention.

In the sixth aspect of the present invention, it provides a method for preventing and/or treating neuronal damage-affected diseases or disorders comprising the step of administering to a patient in need thereof a prophylactically and/or therapeutically effective amount of the pharmaceutical composition of the third aspect of the invention.

in the seventh aspect of the invention, it provides a method for preventing and/or treating cerebral infarction comprising the step of administering to a patient in need thereof a prophylactically and/or therapeutically effective amount of the pharmaceutical composition of the third aspect of the invention.

It should be understood that within the scope of the present invention, the above-mentioned technical features of the present invention and the technical features specifically described in the following (e.g. Examples) can be combined with each other to form a new or preferred technical solutions, which will not redundantly be described one by one herein.

DETAILED DESCRIPTION OF THE INVENTION

After long-term and in-depth research, the present inventors unexpectedly prepared a novel compound with neuroprotective effect. The compound of the invention can effectively pass through the blood-brain barrier and has a good neuroprotective effect, and can be used to treat diseases such as stroke and pain. On this basis, the inventors have completed the present invention.

Terms

In the present invention, unless specifically indicated, the terms used have the general meaning well known to those skilled in the art.

In the present invention, the term "halogen" refers to F, Cl, Br or I.

In the present invention, "$C_{1-6}$ alkyl" refers to a straight or branched chain alkyl comprising 1 to 6 carbon atoms, such as methyl, ethyl, propyl, isopropyl, butyl, isobutyl, tert-butyl, neopentyl, tert-amyl, or the like.

In the present invention, the term "$C_{2-6}$ alkenyl" refers to a straight or branched chain alkenyl having 2 to 6 carbon atoms and containing one double bond, including, without limitation, vinyl, propenyl, butenyl, isobutenyl, pentenyl, hexenyl, and the like.

In the present invention, the term "$C_{2-6}$ alkynyl" refers to a straight or branched chain alkynyl having 2 to 6 carbon atoms and containing one triple bond, including, without limitation, ethynyl, propynyl, butynyl, isobutynyl, pentynyl, hexynyl, and the like.

In the present invention, the term "$C_{3-8}$ cycloalkyl" or "cycloalkyl" refers to a cyclic alkyl (including spino-cycloalkyl, bridged cycloalkyl such as the structure

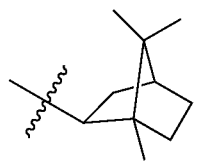 [SMILES: *C1CC2CCC1(C)C2(C)C]

shown in compound 04033) having 3 to 8 carbon atoms on the ring, including, without limitation, cyclopropyl, cyclobutyl, cyclopentyl, cyclohexyl, cycloheptyl, cyclooctyl, and the like. The term "$C_{3-6}$ cycloalkyl" has a similar meaning.

In the present invention, the term "$C_{1-6}$ alkoxy" refers to a straight or branched chain alkoxy having 1 to 6 carbon atoms, including, without limitation, methoxy, ethoxy, propoxy, isopropoxy and butoxy, etc. It is preferably a $C_{1-4}$ alkoxy.

In the present invention, the term "$C_{1-6}$ alkylamino" refers to $C_{1-6}$ alkyl-NH—.

In the present invention, the terms "heterocycloalkyl" and "heterocyclyl" are 3-8 membered heterocyclyl (including heterospirocycloalkyl, heterocycloalkyl, heterobridged cycloalkyl) containing 1, 2, or 3 heteroatoms selected from N, O or S, including, but not limited to, the following groups:

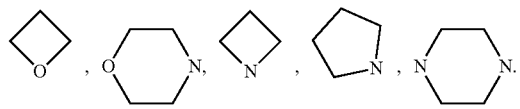

The term "unsaturated" refers to the presence of a double bond structure in the corresponding structure. The term "saturated" refers to the absence of a double bond structure in the corresponding structure. The heterocycloalkyl can be substituted or unsubstituted, and the substituted heterocycloalkyl has the structure

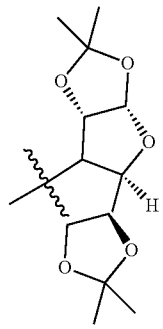

shown in the compound 04132.

In the present invention, the term "aromatic ring" or "aryl" has the same meaning, preferably is "$C_{6-10}$ aryl". The term "$C_{6-10}$ aryl" refers to an aromatic ring group having 6 to 10 carbon atoms in the ring that does not contain heteroatoms, such as phenyl, naphthyl and the like.

In the present invention, the term "aromatic heterocycle" or "heteroaryl" has the same meaning and refers to a heteroaromatic group containing one or more heteroatoms. For example, "$C_{3-10}$ heteroaryl" refers to an aromatic heterocyclyl containing 1 to 4 heteroatoms selected from oxygen, sulfur and nitrogen and 3 to 10 carbon atoms. Non-limiting examples include: furyl, thienyl, pyridyl, pyrazolyl, pyrrolyl, N-alkylpyrrolyl, pyrimidinyl, pyrazinyl, imidazolyl, tetrazolyl and the like. The heteroaryl ring may be fused to an aryl, heterocyclyl or cycloalkyl ring, wherein the ring connected to the parent structure is a heteroaryl ring. Heteroaryl groups can be optionally substituted or unsubstituted.

In the present invention, the term "halogenated" means substituted by halogen.

In the present invention, the term "substituted" means that one or more hydrogen atoms on a specific group are replaced with a specific substituent. The specific substituents are the substituents described correspondingly in the foregoing, or the substituents appearing in the respective embodiments. Unless otherwise specified, a substituted group may have a substituent selected from a specific group at any substitutable position of the group, and the substituent may be the same or different at each position. Those skilled in the art will understand that the combinations of substituents contemplated by the present invention are those that are stable or chemically achievable. The substituents are, for example (but not limited to): halogen, hydroxyl, carboxyl (—COOH), C1-C6 alkyl, C2-C6 alkenyl, C2-C6 alkynyl, C3-C8 cycloalkyl, 3-12 membered heterocyclyl, aryl, heteroaryl, C1-C8 aldehyde group, C2-C10 acyl, C2-C10 ester group, amino, C1-C6 alkoxy, C1-C10 sulfonyl group and the like.

Compound

The invention provides a compound shown in Formula I or a stereoisomer, or a pharmaceutically acceptable salt thereof,

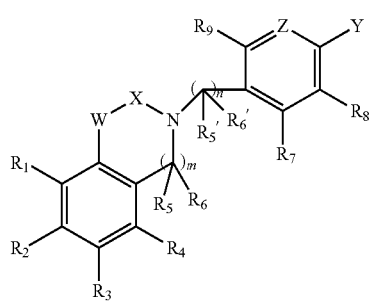

Formula I wherein, each group is as defined above.

In another preferred embodiment, in the compound, any one of $R_1$, $R_2$, $R_3$, $R_4$, $R_5$, $R_5'$, $R_6$, $R_6'$, $R_7$, $R_8$, $R_9$, $R_{10}$, $R_{11}$, $R_{12}$, $R_{13}$, $R_{15}$, $R_{16}$, $R_{17}$, $R_{18}$, $R_{19}$, ring A, W, X, Y, Z, m and n is each the corresponding group in the specific compound of the present invention.

In another preferred embodiment, the compound is preferably a compound prepared in the examples.

In another preferred embodiment, the compound is selected from the group consisting of:

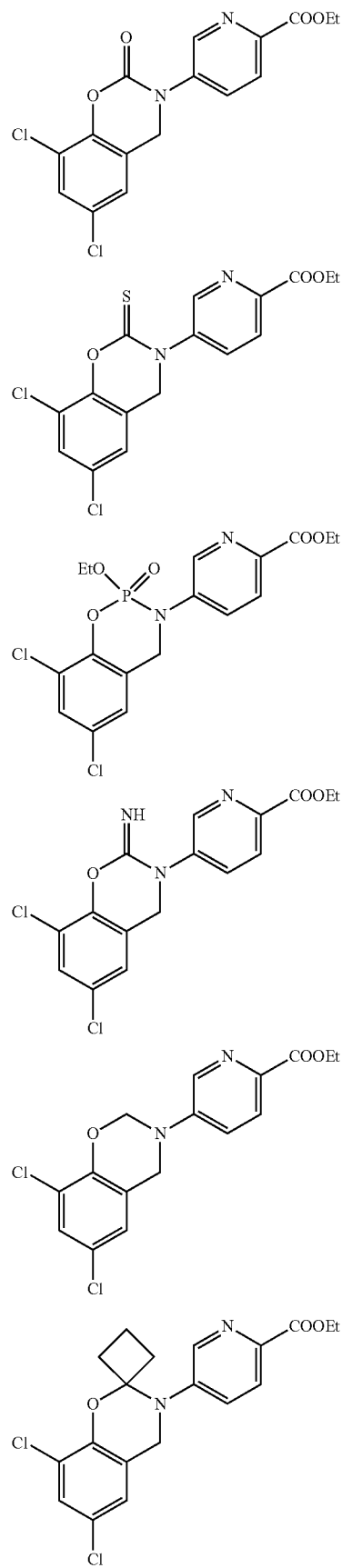

-continued
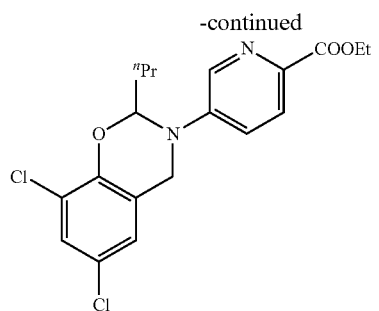
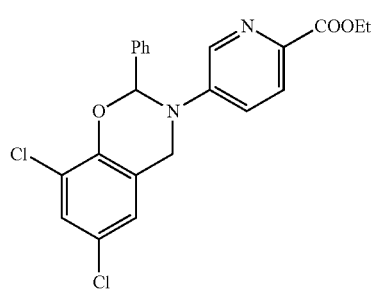
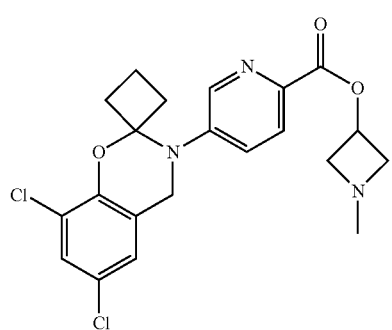
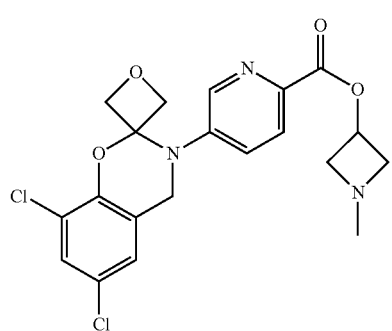
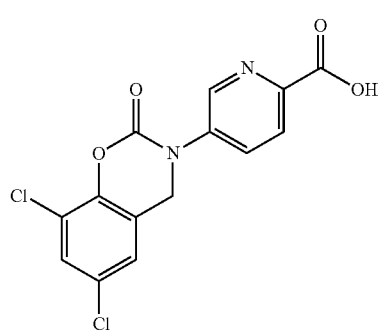
-continued
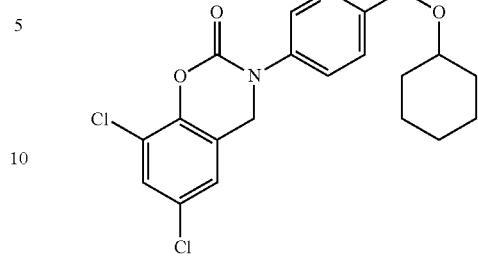
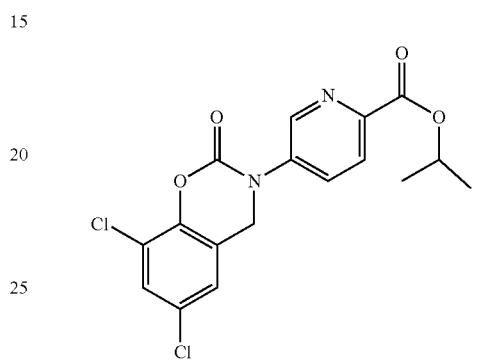
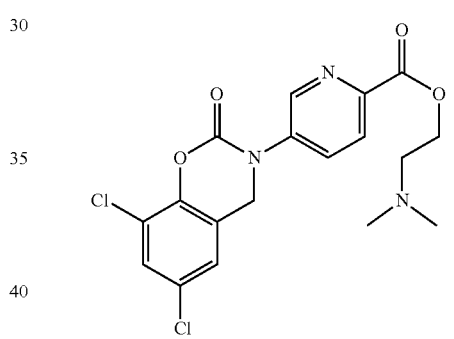
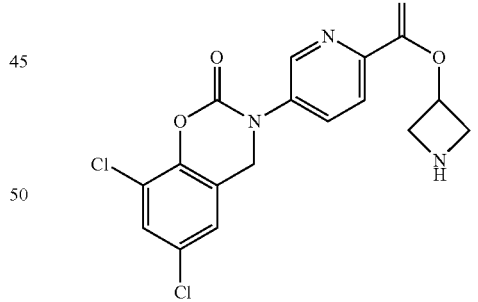
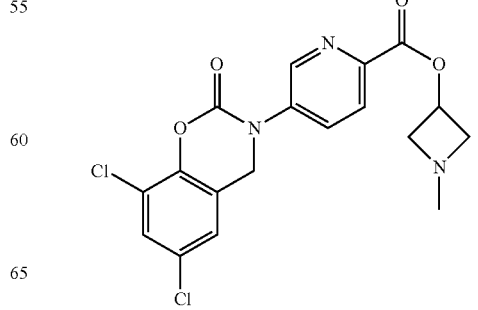

17
-continued
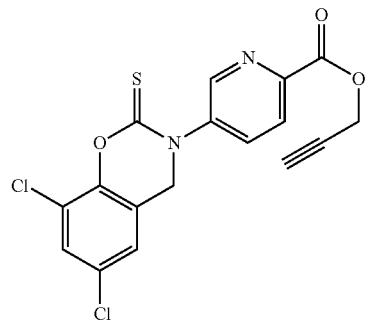
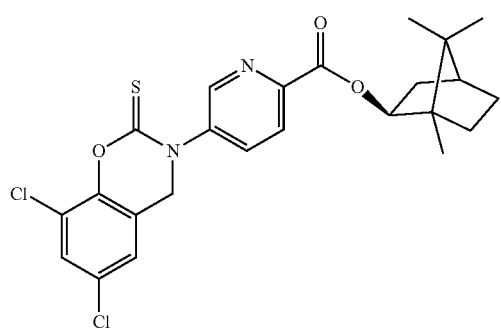
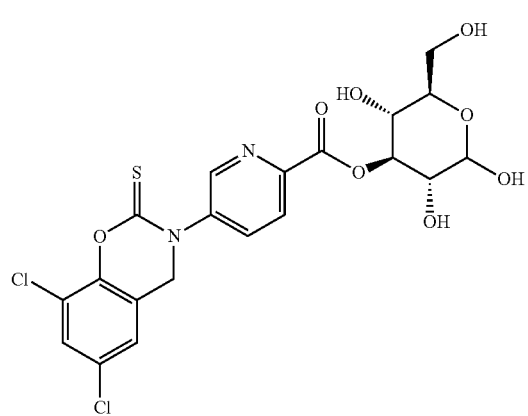
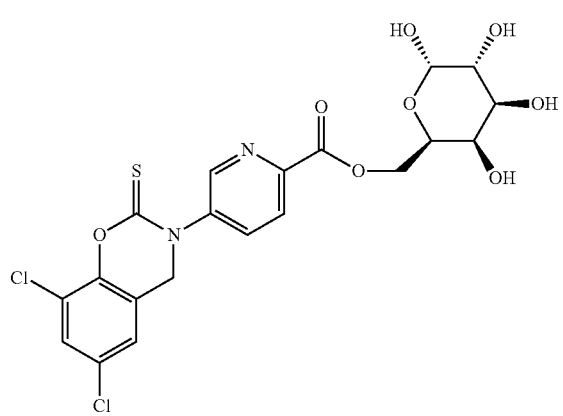
18
-continued
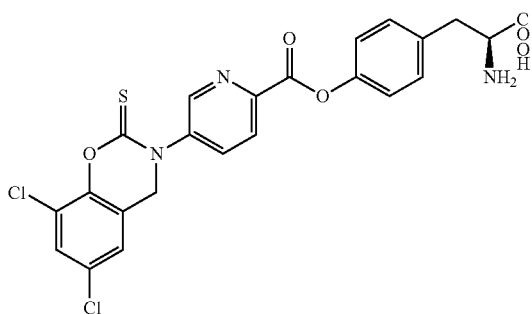
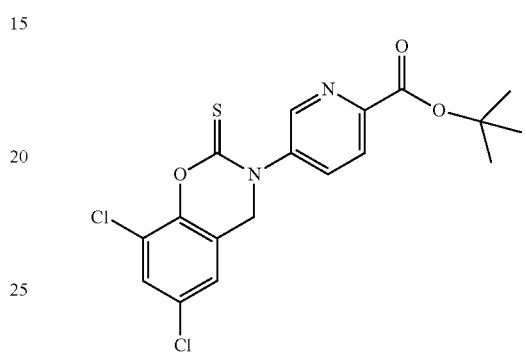
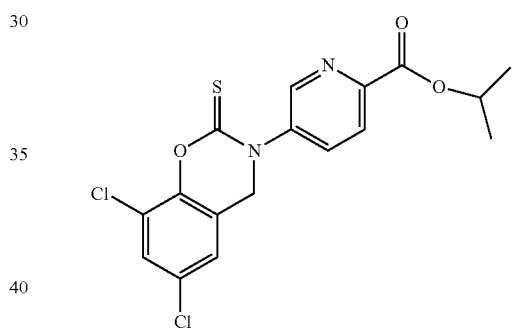
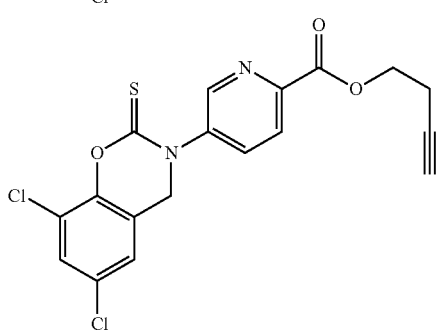
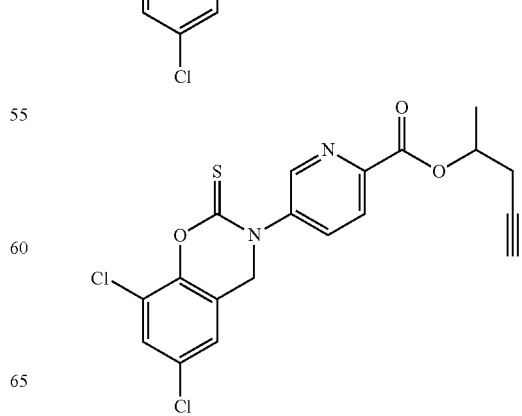

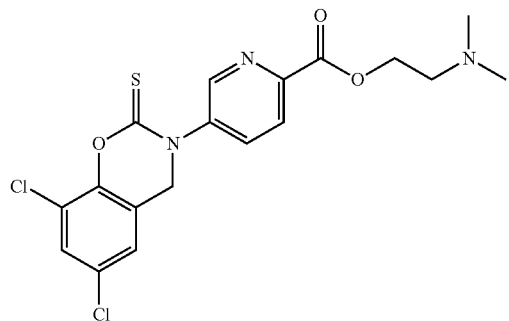
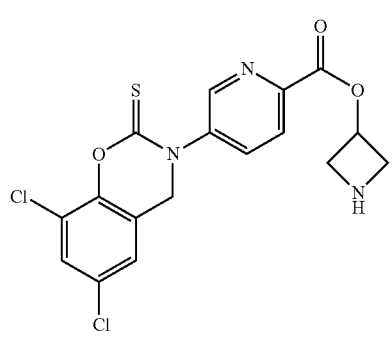
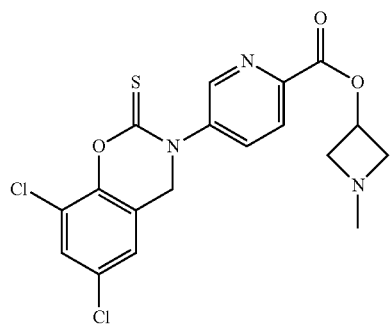
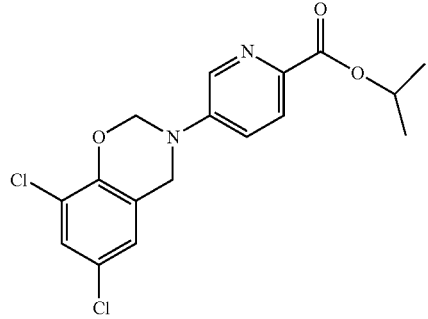
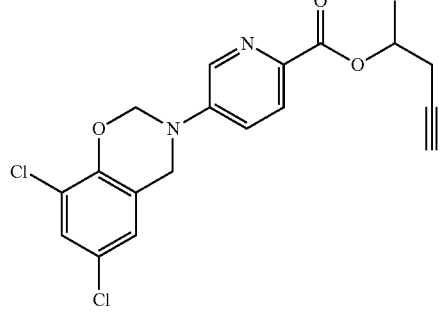
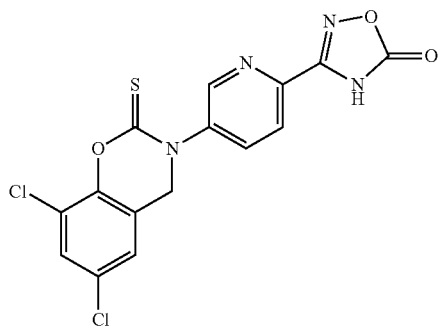
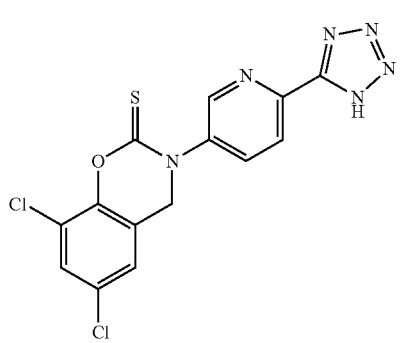
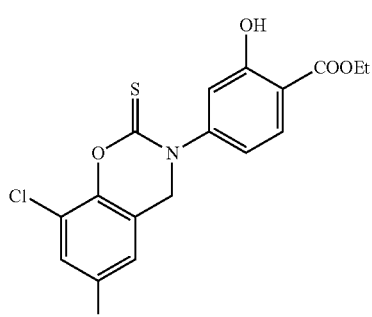
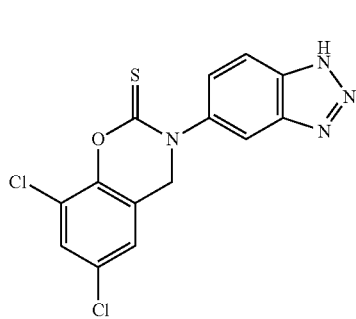
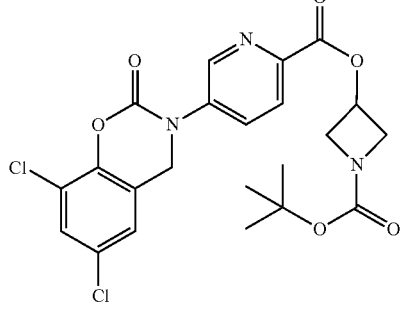

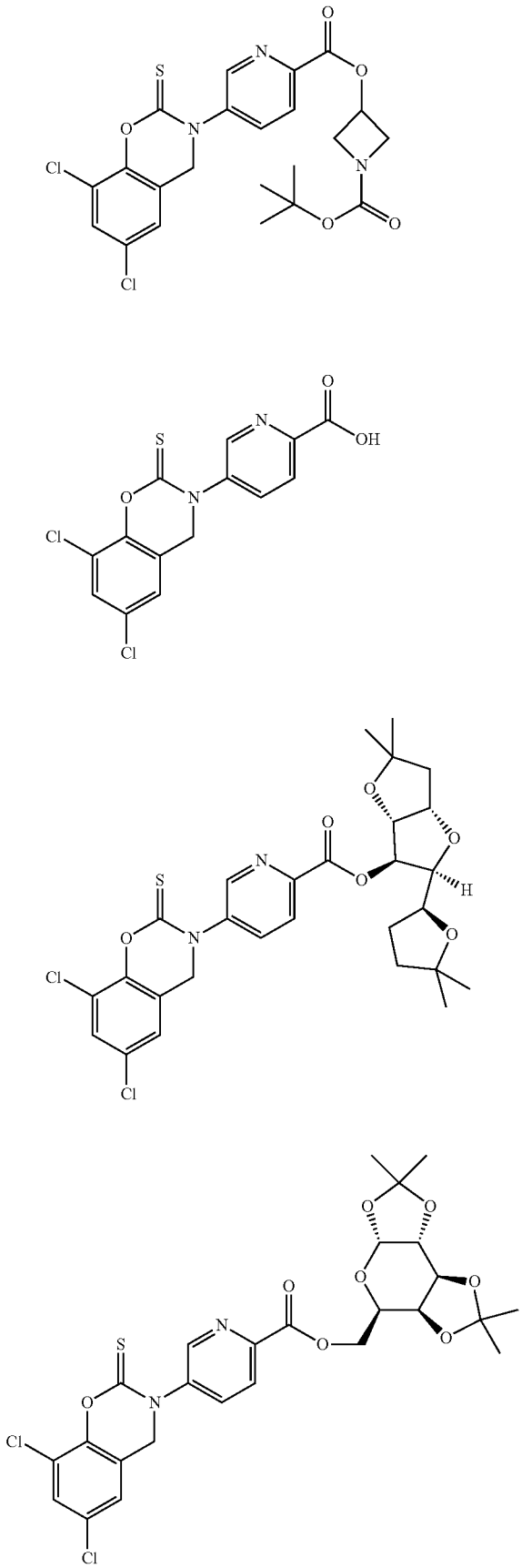
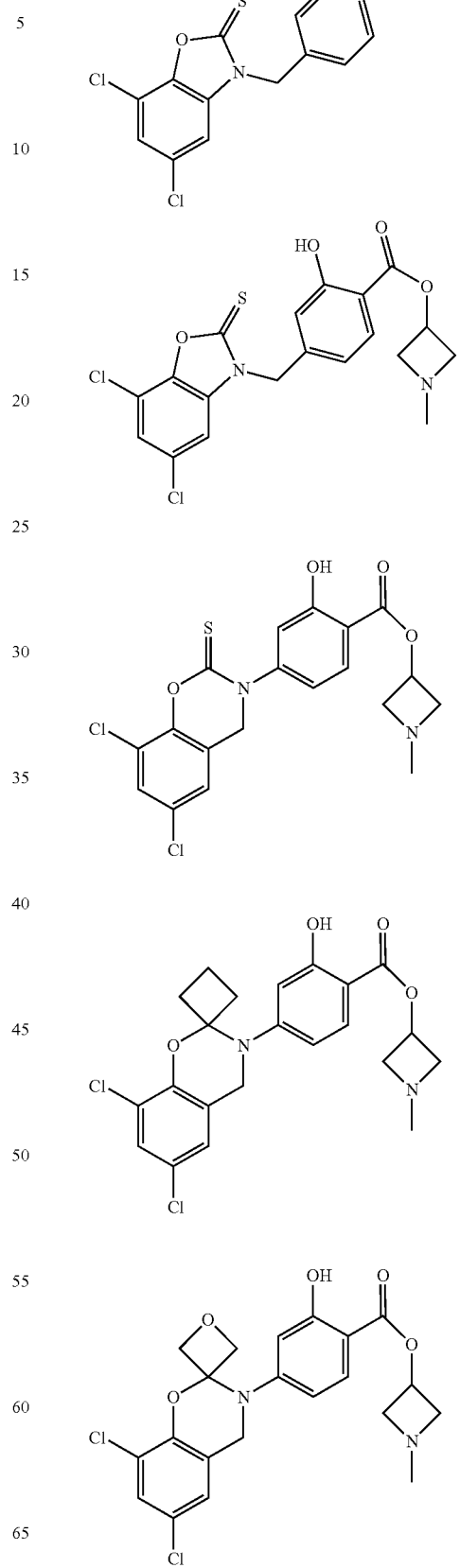

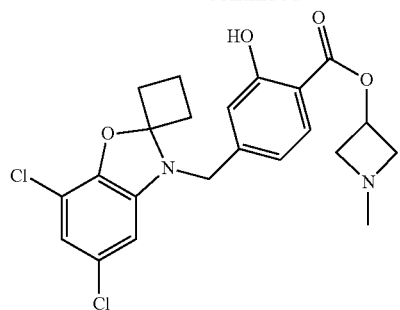
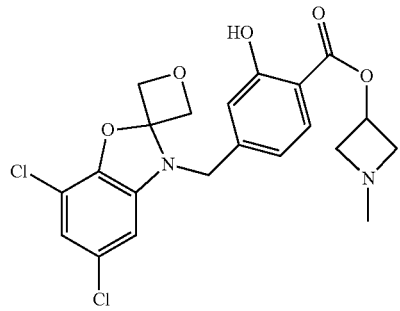
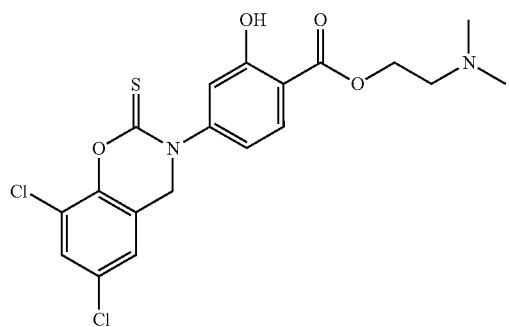
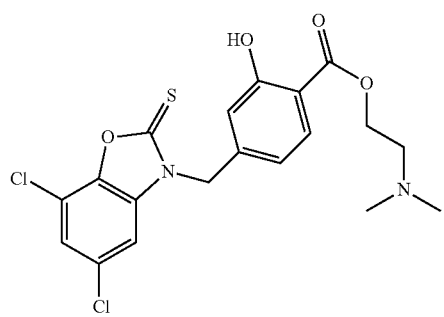
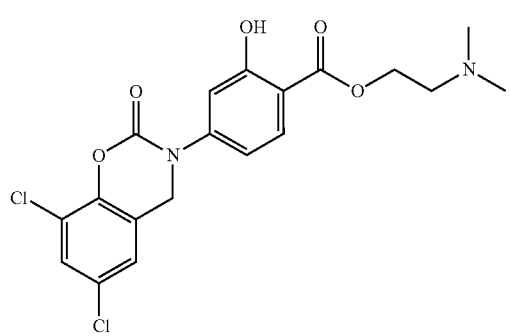
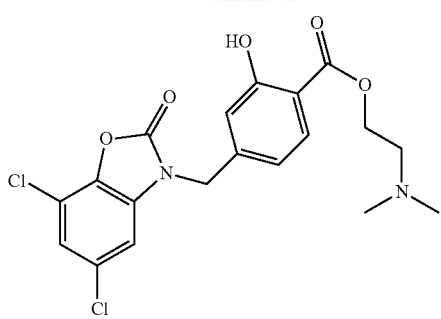
In another preferred embodiment, the compound is selected from the group consisting of:
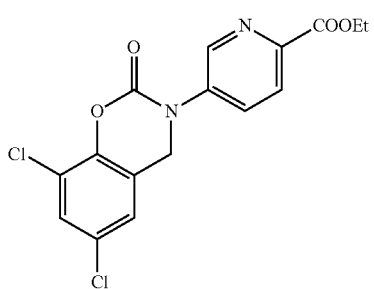
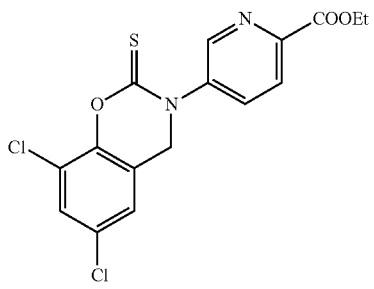
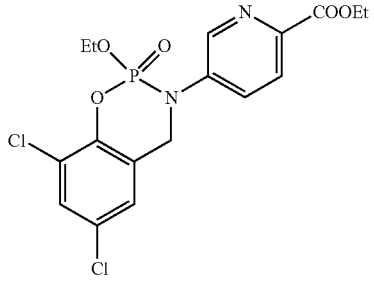
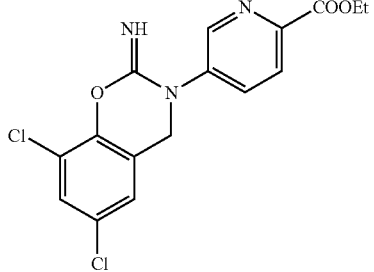

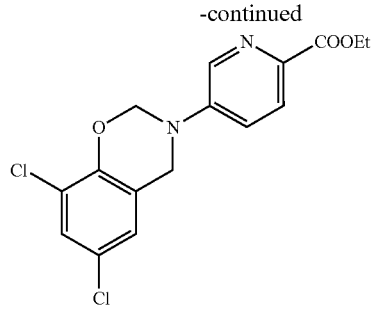
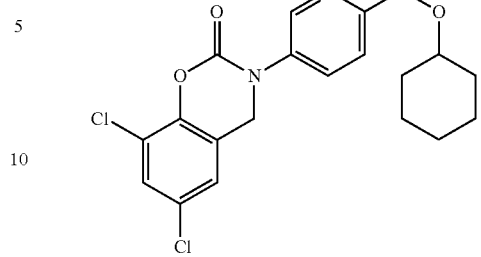
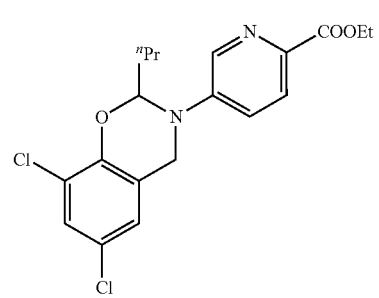
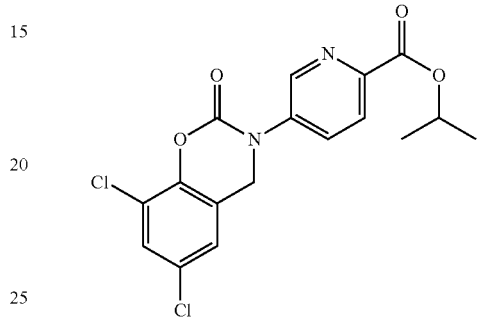
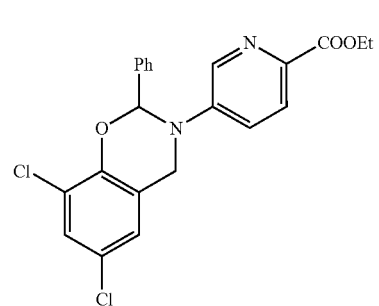
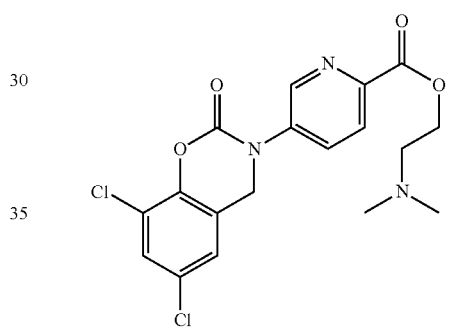
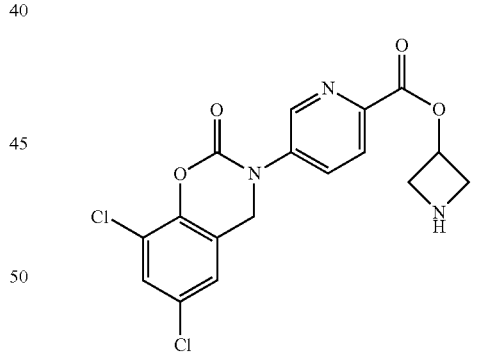
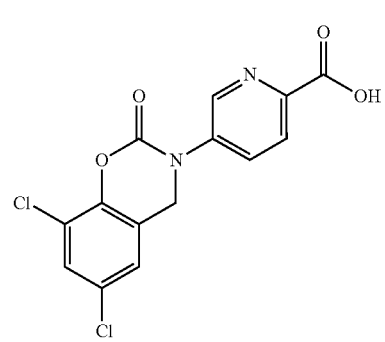
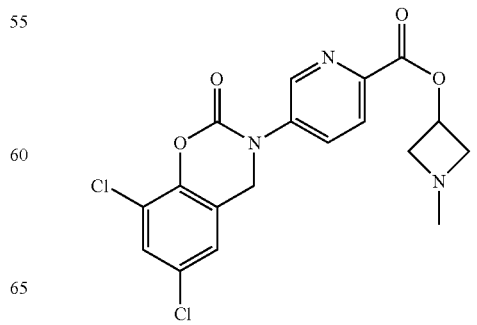

27
-continued
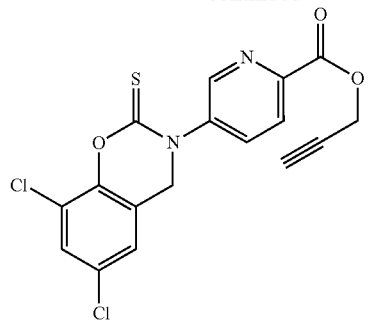
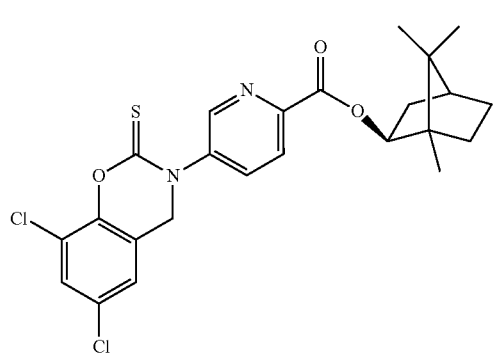
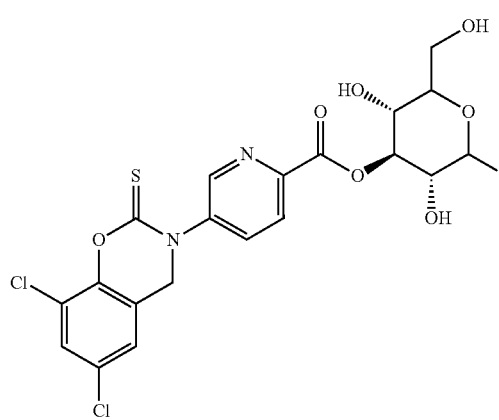
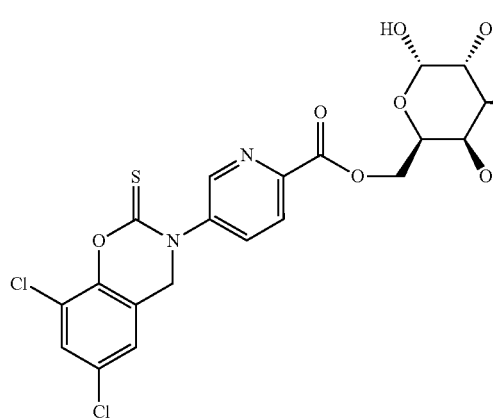
28
-continued
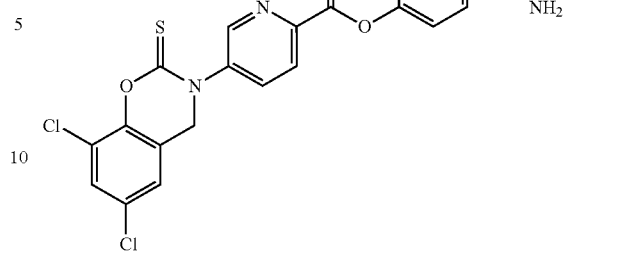
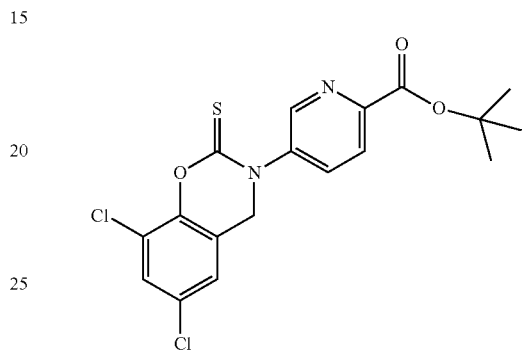
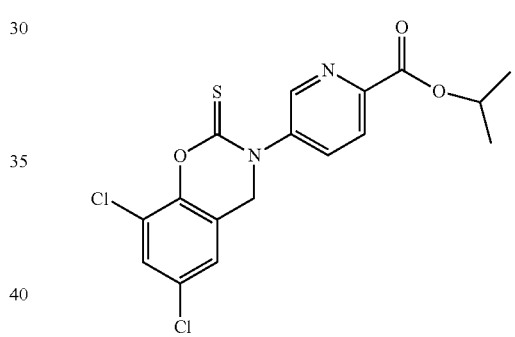
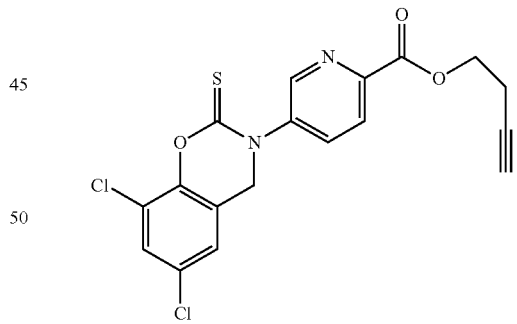
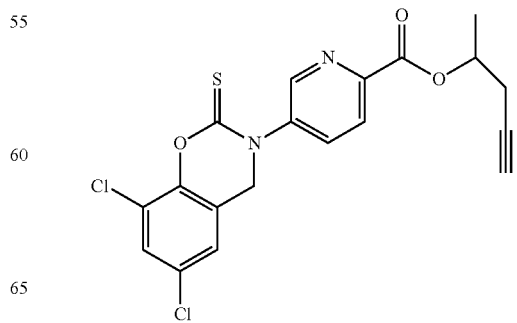

29
-continued
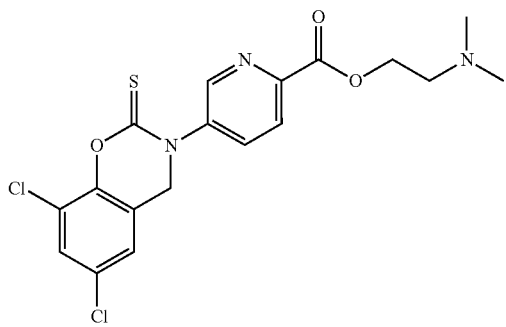
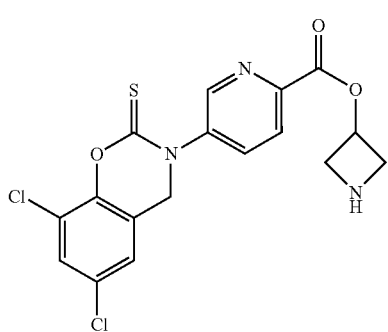
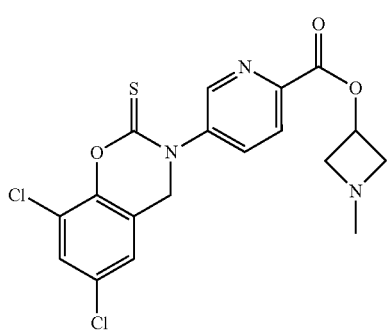
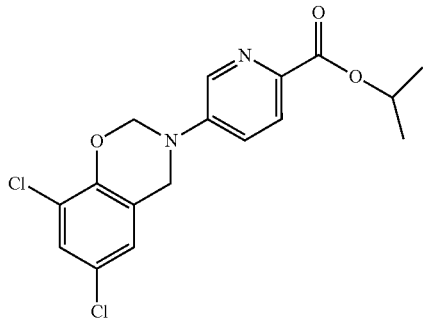
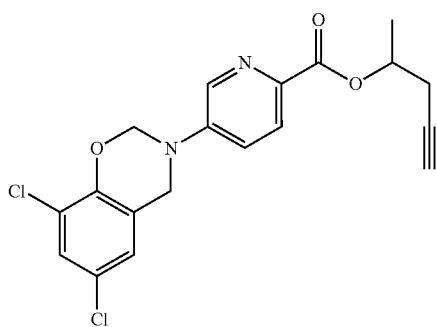
30
-continued
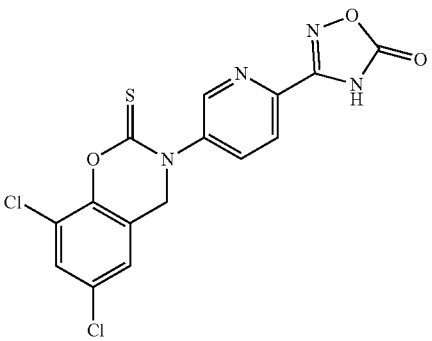
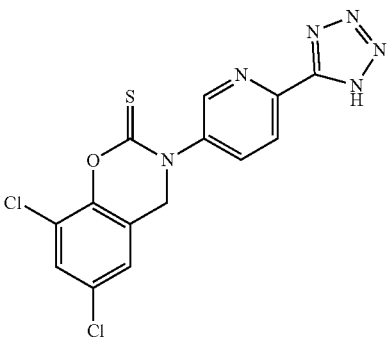
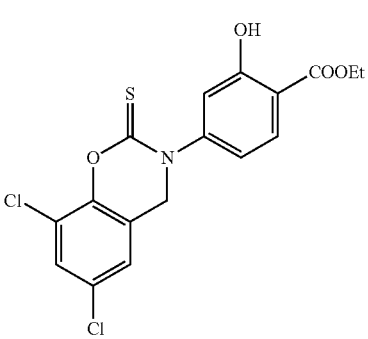
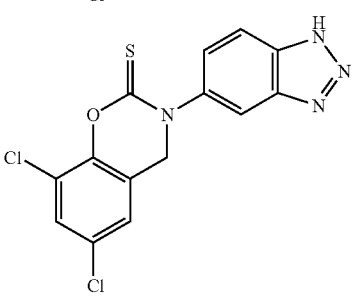
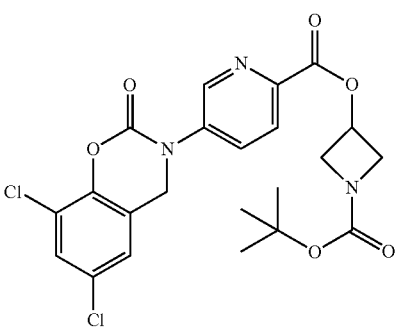

31
-continued
32
-continued
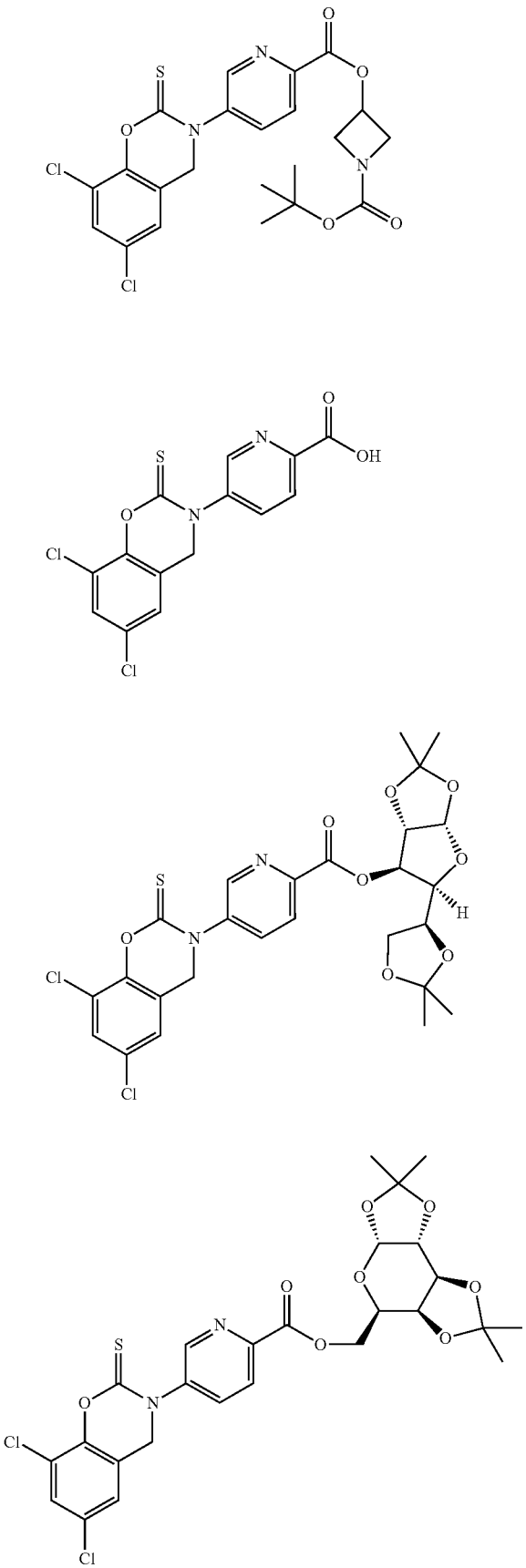
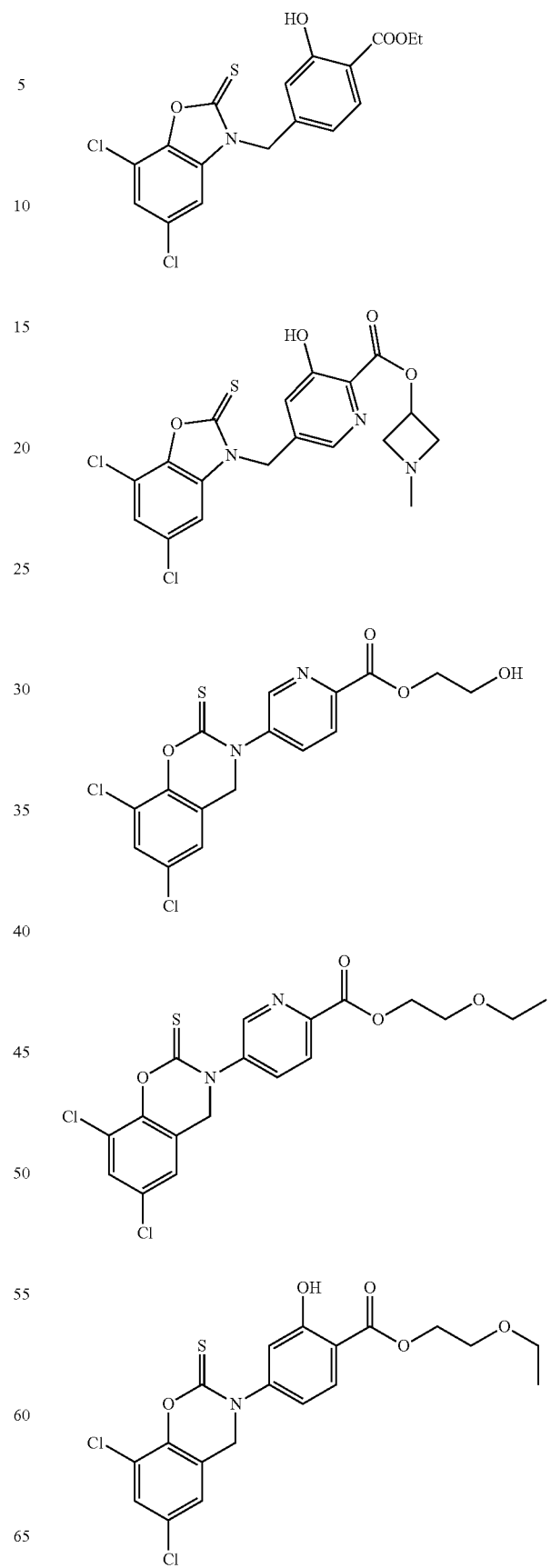

33
-continued
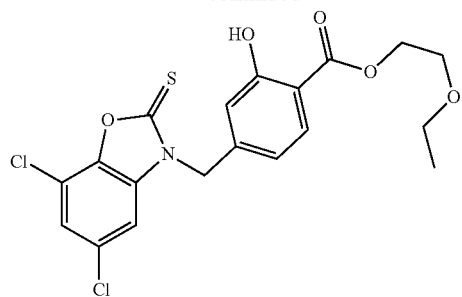
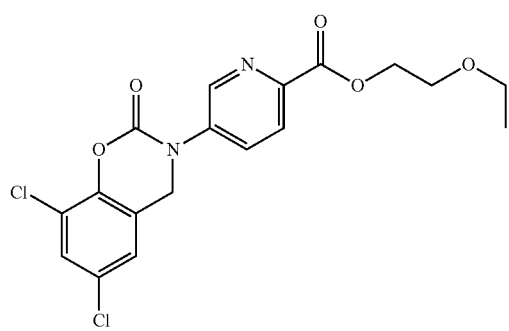
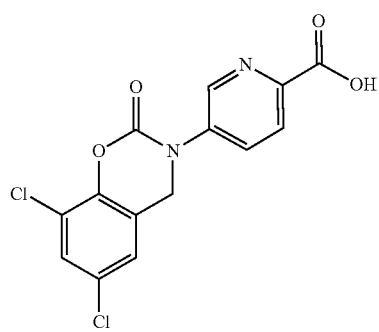
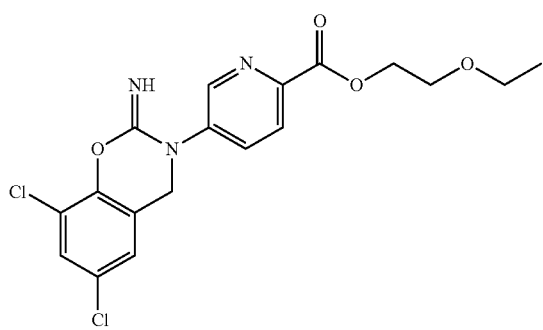
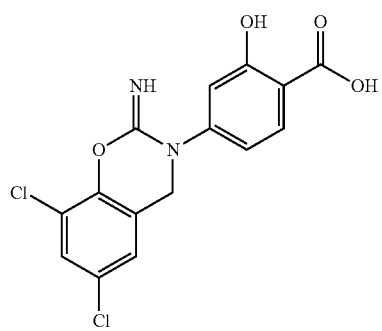
34
-continued
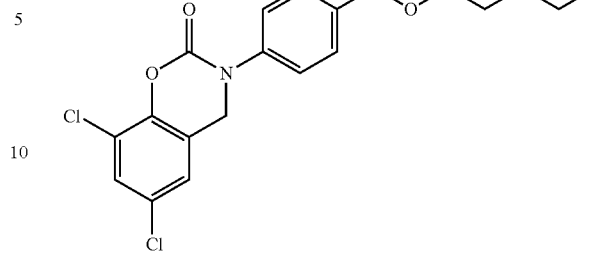
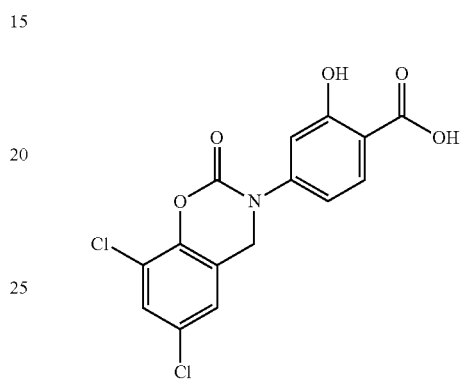
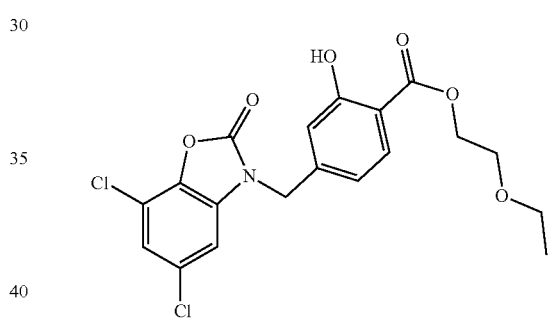
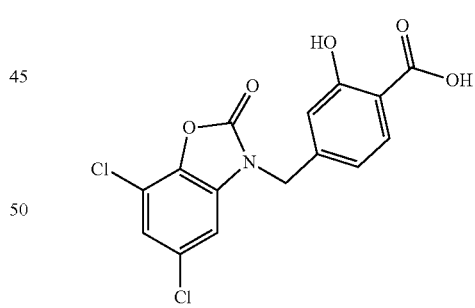
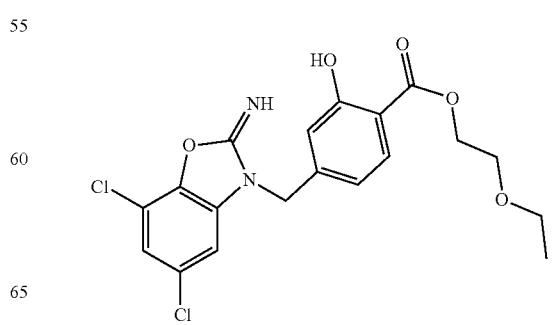

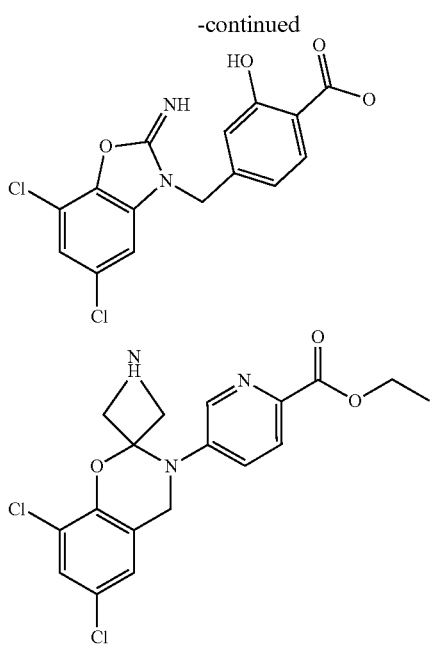

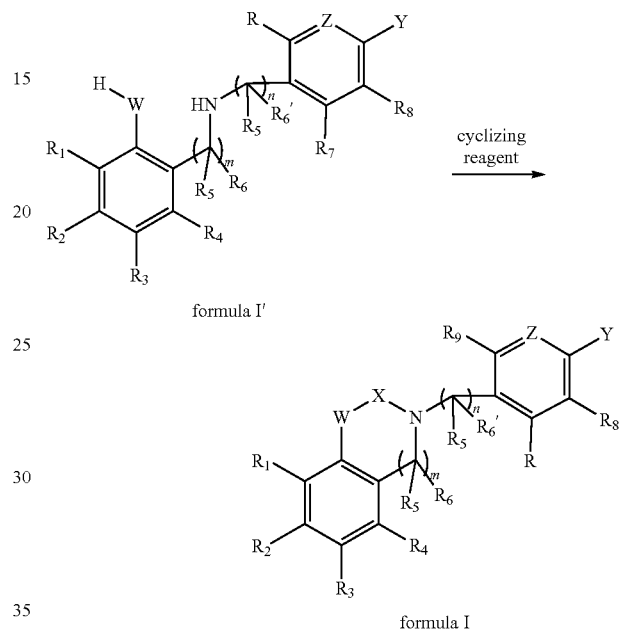

formula I' formula I reacting a compound of formula I' with a cyclizing reagent to obtain the compound of formula I;

wherein, $R_1$, $R_2$, $R_3$, $R_4$, $R_5$, $R_5'$, $R_6$, $R_6'$, $R_7$, $R_8$, $R_9$, W, X, Z, Y, m and n are as defined above.

Pharmaceutical Composition and Method for Administration

The invention also provides a pharmaceutical composition comprising a pharmaceutically acceptable carrier and one or more of the compounds or stereoisomers thereof, or pharmaceutically acceptable salts thereof.

Since the compounds of the present invention can effectively pass through the blood-brain barrier and have excellent neuroprotective effects, the compounds of the present invention and the pharmaceutical compositions containing the compounds of the present invention as the main active ingredients can be used to treat, prevent and alleviate diseases related to neuronal damage. According to the prior art, the compounds of the present invention can be used to treat (but not limited to) the following diseases: neuropathic pain, migraine, inflammatory pain, chronic pain, stroke, brain injury, depression, Alzheimer's disease, epilepsy, affective disorders, neurodegenerative diseases, etc.

The pharmaceutical composition of the present invention comprises a safe and effective amount of a compound of the present invention or a pharmacologically acceptable salt thereof, and a pharmacologically acceptable excipient or carrier. in which, "safe and effective amount" is meant that the amount of the compound is sufficient to significantly improve the condition without causing serious side effects. Generally, the pharmaceutical composition contains 1-2000

As used herein, the term "pharmaceutically acceptable salt" refers to a salt formed by a compound of the present invention with an acid or base suitable for use as a medicine. Pharmaceutically acceptable salts include inorganic salts and organic salts. A preferred class of salts is the salts of the compounds of the invention formed with acids. Acids suitable for salt formation include, but are not limited to: hydrochloric acid, hydrobromic acid, hydrofluoric acid, trifluoroacetic (TFA) acid, sulfuric acid, nitric acid, phosphoric acid and other inorganic acids; formic acid, acetic acid, trifluoroacetic acid, propionic acid, succinic acid, naphthalenedisulfonic acid (1,5), asiatic acid, oxalic acid, valeric acid, diethylacetic acid, malonic acid, succinic acid, fumaric acid, pimelic acid, adipic acid, maleic acid, lactic acid, malic acid, tartaric acid, citric acid, picric acid, salicylic acid, benzoic acid, phenylpropionic acid, gluconic acid, ascorbic acid, niacin, isonicotinic acid, methanesulfonic acid, ethanesulfonic acid, sulfamic acid, p-toluenesulfonic acid, benzenesulfonic acid, naplithalenesulfonic acid and other organic acids; and proline, phenylalanine, aspartic acid, glutamic acid and other amino acids.

Another preferred class of salts are salts of the compounds of the invention formed with bases, such as alkali metal salts (such as sodium or potassium salts), alkaline earth metal salts (such as magnesium or calcium salts), ammonium salts (such as lower grades alkanol ammonium salts and other pharmaceutically acceptable amine salts), such as methylamine salt, ethylamine salt, propylamine salt, dimethylamine salt, trimethylamine salt, diethylamine salt, triethylamine salt, tert-butylamine salt, ethylenediamine salt, hydroxyethylamine salt, dihydroxyethylamine salt, trihydroxyethylamine salt, and an amine salt formed from morpholine, piperazine, and lysine, respectively.

The term "stereoisomer" or "optical isomer" means that the chiral carbon atom involved in the compound of the present invention may be in the R configuration, or in the S configuration, or a combination thereof.

Preparation Method

The preparation method of the formula I structural compound according to the present invention is more specifically described below, but these specific methods do not constitute any limitation. The compounds of the present invention may also be conveniently prepared by optionally combining various synthetic methods described in the specification or known in the art, and such combinations are readily made by those skilled in the art to which the present invention pertains.

Typically, the preparation process of the compounds of the present invention is as follows, wherein the starting materials and reagents used are commercially available unless otherwise specified.

mg of the compound of the present invention/dose, more preferably, 1-200 mg of the compound of the present invention/dose. Preferably, the "one dose" is a capsule, tablet or injection.

"Pharmaceutically acceptable carrier" means one or more compatible solid or liquid fillers or gelatinous materials which are suitable for human use and should be of sufficient purity and sufficiently low toxicity. "Compatibility" means that each component in the composition can be admixed with the compounds of the present invention and with each other without significantly reducing the efficacy of the compounds. Some examples of pharmaceutically acceptable carriers include cellulose and the derivatives thereof (such as sodium carboxymethyl cellulose, sodium ethyl cellulose, cellulose acetate, etc.), gelatin, talc, solid lubricants (such as stearic acid, magnesium stearate), calcium sulfate, vegetable oils (such as soybean oil, sesame oil, peanut oil, olive oil, etc.), polyols (such as propylene glycol, glycerol, mannitol, sorbitol, etc.), emulsifiers (such as Tween®), wetting agent (such as sodium dodecyl sulfate), coloring agents, flavoring agents, stabilizers, antioxidants, preservatives, pyrogen-free water, etc.

The pharmaceutical composition is an injection, a capsule, a tablet, a pill, a powder, or a granule.

The methods of administration of the compounds or pharmaceutical compositions of the present invention are not particularly limited, and representative methods of administration include, but are not limited to, oral, rectal, parenteral (intravenous, intramuscular or subcutaneous), and topical administration.

Solid dosage forms for oral administration include capsules, tablets, pills, powders and granules. In these solid dosage forms, the active compound is mixed with at least one conventional inert excipient (or carrier), such as sodium citrate or dicalcium phosphate, or mixed with any of the following components: (a) fillers or compatibilizer, such as starch, lactose, sucrose, glucose, mannitol and silicic acid; (b) binders, such as hydroxymethyl cellulose, alginate, gelatin, polyvinylpyrrolidone, sucrose and arabic gum; (c) humectants, such as, glycerol; (d) disintegrating agents such as agar, calcium carbonate, potato starch or tapioca starch, alginic acid, certain composite silicates, and sodium carbonate; (e) dissolution-retarding agents, such as wax, (f) absorption accelerators, such as quaternary ammonium compound; (g) wetting agents, such as cetyl alcohol and glyceryl monostearate; (h) adsorbents, such as kaolin; and (i) lubricants, such as talc, calcium stearate, magnesium stearate, solid polyethylene glycol, sodium dodecyl sulfate or mixture thereof. In capsules, tablets and pills, the dosage forms may also contain buffering agents.

Solid dosage forms such as tablets, dragees, capsules, pills and granules can be prepared with coatings and shells such as enteric coatings and other materials known in the art. They may contain opacifying agents and the release of the active compound or compound in such compositions may be released in a portion of the digestive tract in a delayed manner. Examples of embedding components that can be employed are polymeric materials and waxy materials. If necessary, the active compound may also be in microencapsulated form with one or more of the above-mentioned excipients.

Liquid dosage forms for oral administration include pharmaceutically acceptable emulsions, solutions, suspensions, syrups or tinctures. In addition to the active compound, the liquid dosage form may contain inert diluents conventionally used in the art, such as water or other solvents, solubilizers and emulsifiers, such as ethanol, isopropanol, ethyl carbonate, ethyl acetate, propylene glycol, 1,3-butanediol, dimethylformamide and oils, especially cottonseed oil, peanut oil, corn germ oil, olive oil, castor oil and sesame oil or mixtures of these substances.

In addition to these inert diluents, the compositions may contain adjuvants such as wetting agents, emulsifying and suspending agents, sweetening agents, flavoring agents and spices.

In addition to the active compound, the suspension may contain suspending agent, such as ethoxylated isooctadecanol, polyoxyethylene sorbitol and dehydrated sorbitan ester, microcrystalline cellulose, aluminum methoxide and agar, or the mixture thereof etc.

The compositions for parenteral injection may comprise physiologically acceptable sterile aqueous or anhydrous solutions, dispersions, suspensions or emulsions, and sterile powders which can be re-dissolved into sterile injectable solutions or dispersions. Suitable aqueous and non-aqueous carriers, diluents, solvents or excipients include water, ethanol, polyols and any suitable mixtures thereof.

Dosage forms for the compounds of the invention for topical administration include ointments, powders, patches, sprays and inhalants. The active ingredient is mixed under sterile conditions with a physiologically acceptable carrier and any preservatives, buffers, or propellants which may be required if necessary.

The compounds of the invention can be administered alone or in combination with other pharmaceutically acceptable compounds.

The treatment method of the present invention can be administered alone or in combination with other treatment means or therapeutic drugs.

When the pharmaceutical composition a safe and effective amount of the compound of the present invention is administered to a mammal (such as a human) in need of treatment, wherein the dosage at the time of administration is the pharmaceutically effective dosage, for people having a body weight of 60 kg, the daily dose is usually 1-2000 mg, preferably 1-500 mg. Of course, specific doses should also consider factors such as the administration route, the health of the patient, etc., which are within the skill of the skilled physician.

Compared with the prior art, the present invention has the following main advantages:

(1) The present invention provides a class of novel neuroprotective compounds which can effectively pass through the blood-brain barrier.
(2) The compound of the present invention has better neuroprotective activity, better in vivo efficacy, better safety, better pharmacokinetics and better druggability.
(3) The compounds of the present invention are expected to be used for the treatment and/or prevention of neuronal damage-affected diseases or disorders.

The present invention will be further illustrated below with reference to the specific examples. It should be understood that these examples are only to illustrate the invention but not to limit the scope of the invention. Experimental methods in which the specific conditions are not specified in the following examples are usually in accordance with conventional conditions such as the conditions described in Sambrook et al., Molecular Cloning: Laboratory Manual (New York: Cold Spring Harbor Laboratory Press, 1989), or in accordance with the conditions recommended by the manufacturer. Unless indicated otherwise, percentage and parts are calculated by weight.

Unless otherwise defined, all professional and scientific terminology used in the text have the same meanings as known to the skilled in the art. In addition, any methods and materials similar or equal with the recorded content can apply to the methods of the invention. The method of the preferred embodiment described herein and the material are only for demonstration purposes.

Example 1 Preparation of Compound 04013

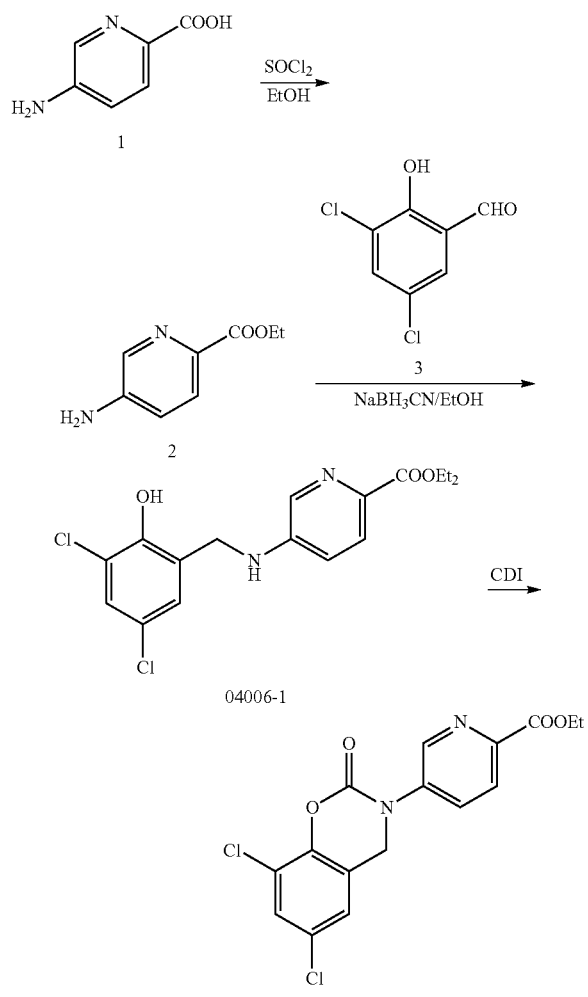

Step 1. Compound 2

At 25° C., dichlorosulfoxide (20 mL) was slowly added dropwise to a solution of compound 1 (2.0 g, 14.5 mmol) in ethanol (20 mL). The reaction system was heated to 60° C. and stirred overnight. The mixture was concentrated under reduced pressure, and the residue was extracted with water (50 mL) and ethyl acetate (50 ml×2). The combined organic phase was dried over anhydrous sodium sulfate, and concentrated under reduced pressure to obtain white solid compound 2 (0.90 g, yield: 37.5%)

Step 2. Compound 04006-1

At 25° C., a solution of compound 2 (0.90 g, 5.4 mmol) and compound 3 (1.0 g, 5.0 mmol) in methanol was stirred for 1 hour, sodium cyanoborohydride (0.38 g, 6.0 mmol) was added, and stirred overnight. The reaction was quenched with sodium bicarbonate aqueous solution (100 mL), concentrated under reduced pressure to remove methanol, and extracted with ethyl acetate (100 mL×3). The combined organic phase was dried over anhydrous sodium sulfate, concentrated under reduced pressure, and the residue was purified by silica gel column to obtain a white solid compound 04006-1 (0.90 g, yield: 53%).

MS (ESI): Calcd. for $C_{15}H_{14}Cl_2N_2O_3$ 340; Found 341 $[M+H]^+$.

Step 3. Compound 04013

CDI (N,N'-carbonyldiimidazole) (200 mg, 0.62 mmol) was added to a solution of compound 04006-1 (200 mg, 0.58 mmol) in ethyl acetate (10 mL) at 25° C., and stirred for 16 hours. The reaction solution was directly filtered, the filter cake was slurried with ethyl acetate, filtered, and dried to obtain gray-white solid compound 04013 (65 mg, yield: 30%).

MS (ESI): Calcd. for $C_{16}H_{12}Cl_2N_2O_4$ 366; Found 367 $[M+H]^+$.

HNMR (400 MHz, $CD_3OD$): δ 8.83 (s, 1H), 8.24-8.22 (d, J=8.0 Hz, 1H), 7.97-7.95 (d, J=8.0 Hz, 1H), 7.45 (s, 1H), 7.12 (s, 1H), 4.93 (s, 2H), 4.53-4.48 (q, J=6.8 Hz, 2H), 1.48-1.44 (t, J=6.8 Hz, 3H).

Example 2 Preparation of Compound 04015

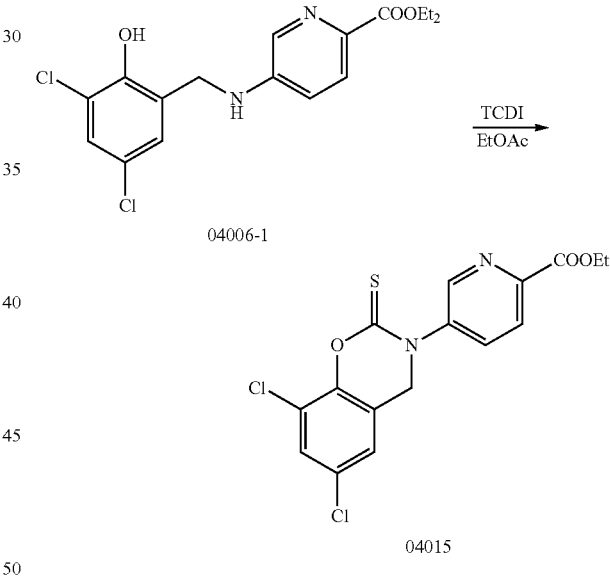

Step 1. Compound 04015

TCDI (thiocarbonyl diimidazole) (118 mg, 0.6 mmol) was added to a solution of compound 04006-1 (0.2 g, 0.58 mmol) in ethyl acetate (10 mL) at 25° C., and stirred for 16 hours. The reaction solution was washed with water, extracted with ethyl acetate, and the organic phase was dried over anhydrous sodium sulfate, concentrated under reduced pressure. The residue was purified by a preparation plate to obtain compound 04015 (22 mg, yield: 10%).

MS (ESI): Calcd. for $C_{16}H_{12}Cl_2N_2O_3S$ 382; Found 383 $[M+H]^+$.

HNMR (400 MHz, $CD_3OD$): δ 8.83 (s, 1H), 8.28 (d, J=8.0 Hz, 1H), 7.91 (d, J=8.0 Hz, 1H), 7.48 (s, 1H), 7.07 (s, 1H), 4.83 (s, 2H), 4.52 (q, J=6.0 Hz, 2H), 1.47 (t, J=6.0 Hz, 3H).

Example 3 Preparation of Compound 04016

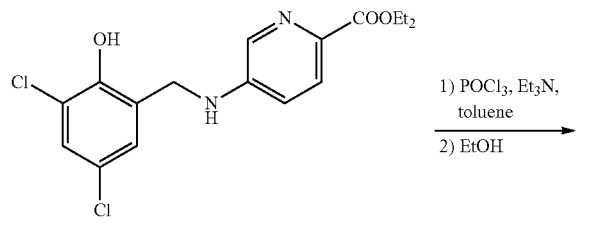

04006-1

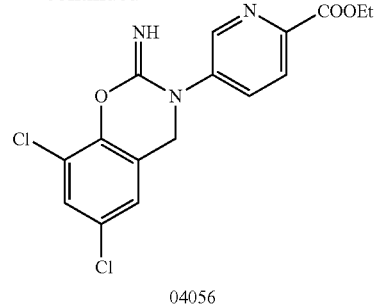

04056

Step 1. Compound 04056

The compound 04006-1 (200 mg, 0.59 mmol) was dissolved in acetonitrile (5 mL), then triethylamine (178 mg, 1.77 mmol) was added, a solution of cyanogen bromide (79 mg, 0.76 mmol) in acetonitrile (5 mL) was added dropwise, and stirred at 25° C. for 1 hour. The reaction solution was diluted with water (20 mL) and then extracted with ethyl acetate (3×50 mL). The combined organic phase was dried over anhydrous sodium sulfate, concentrated under reduced pressure, and the residue was purified by neutral alumina column chromatography (developing agent: dichloromethane/methanol=100:1-100:8) to obtain compound 04056 (40.3 mg, yield: 19%) as a yellow solid.

LCMS: [M+H]$^+$=366.0

$^1$H NMR 1H NMR (400 MHz, DMSO-d$_6$) δ 8.05 (s, 1H), 7.79-7.63 (m, 2H), 7.34 (d, J=13.0 Hz, 2H), 6.88 (d, J=7.7 Hz, 1H), 4.41 (d, J=3.9 Hz, 2H), 4.23 (d, J=6.8 Hz, 2H), 1.27 (t, J=6.7 Hz, 3H).

04016

Step 1. Compound 04016

At 25° C., phosphorus oxychloride (0.55 mL) was added to a solution of compound 04006-1 (200 mg, 0.59 mmol) and triethylamine (178 mg, 1.76 mmol) in toluene (10 mL), and the reaction system was heated to 70° C. under nitrogen protection and reacted for 16 hours. The mixture was concentrated under reduced pressure, and ethanol (20 mL) was added to the residue, and stirred for half an hour. The mixture was concentrated under reduced pressure, and the residue was purified by preparative chromatography to obtain 04016 (49.7 mg, yield: 19.6%).

MS (ESI): Calcd. for C$_{17}$H$_{17}$Cl$_2$N$_2$O$_5$P 430; Found 431 [M+H]$^+$.

HNMR (400 MHz, CDCl$_3$): δ 8.70 (d, J=2.4 Hz, 1H), 8.13-8.10 (d, J=8.8 Hz, 1H), 7.87-7.80 (dd, d, J=8.8 Hz, 2.0 Hz, 1H), 7.43 (s, 1H), 7.15 (d, J=2.4 Hz, 1H), 4.88-4.70 (m, 2H), 4.47 (q, J=7.2 Hz, 2H), 4.35-4.24 (m, 2H), 1.47-1.42 (t, J=7.2 Hz, 3H), 1.38-1.32 (t, J=7.2 Hz, 3H).

Example 4 Preparation of Compound 04056

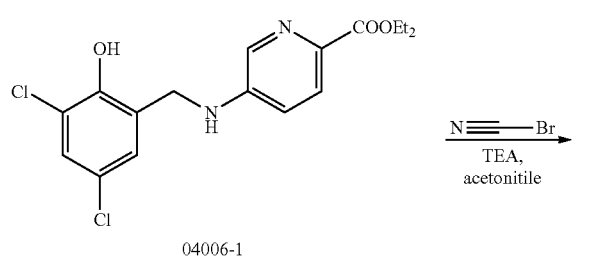

04006-1

Example 5 Preparation of Compound 04022

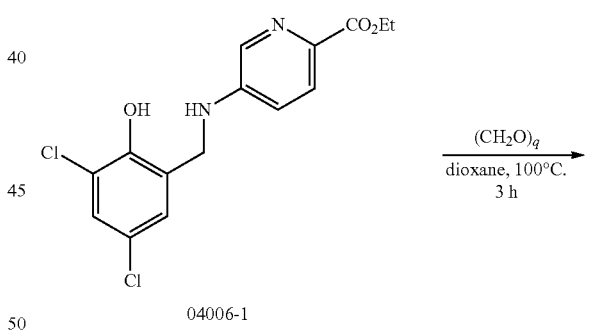

04006-1

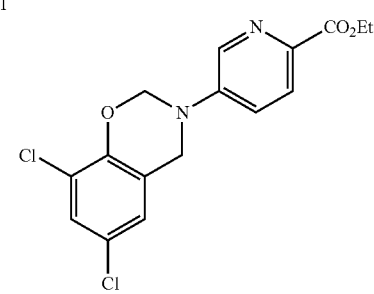

04022

Step 1. Compound 04022

Compounds 04006-1 (300 mg, 0.88 mmol) and paraformaldehyde (CAS: 30525-89-4) (79 mg, 2.64 mmol) were dissolved in 1,4 dioxane (10 mL), heated to 110° C. and stirred for 16 hours. The reaction solution was concentrated and purified by silica gel column chromatography (developing agent: dichloromethane) to obtain compound 04022 (white solid, 154 mg, yield: 50%).

LCMS: [M+H]⁺=353.1

$^1$H NMR (400 MHz, CDCl$_3$) δ 8.56 (s, 1H), 8.07 (d, J=8.6 Hz, 1H), 7.46 (d, J=8.5 Hz, 1H), 7.25 (d, J=1.9 Hz, 1H), 6.97 (d, J=1.9 Hz, 1H), 5.50 (s, 2H), 4.71 (s, 2H), 4.45 (q, J=7.1 Hz, 2H), 1.42 (t, J=7.1 Hz, 3H).

Example 6 Preparation of Compound 04046

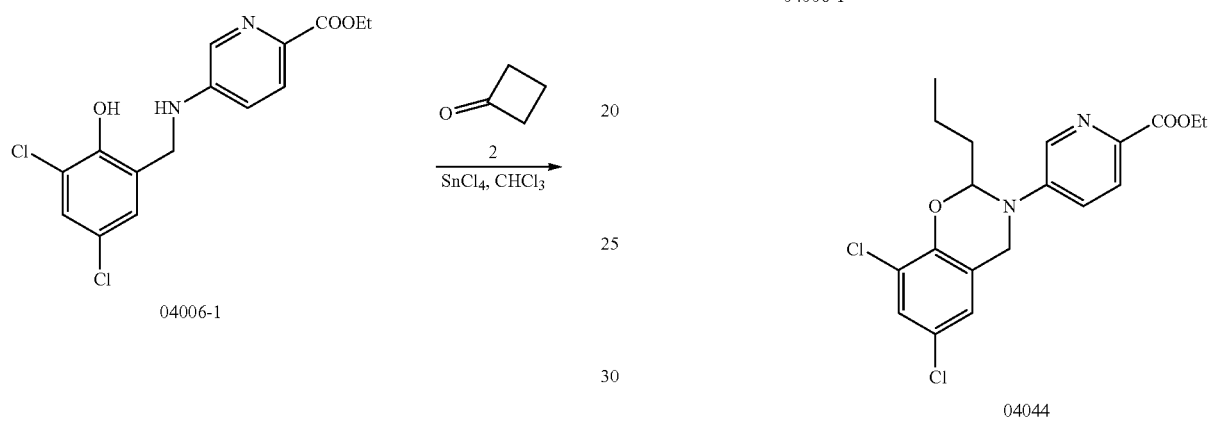

Step 1. Compound 04046

Compound 04006-1 (50 mg, 0.15 mmol) was dissolved in chloroform (5 mL), cyclobutanone 2 (0.1 mL) and two drops of tin tetrachloride (2M solution in dichloromethane) were added, and the reaction solution was heated to 90° C. and stirred for 16 hours. After cooling to 25° C., the reaction solution was concentrated and purified by neutral alumina column chromatography (developing agent: dichloromethane) to obtain compound 04046 (yellow solid, 6.0 mg, yield: 10.4%).

LCMS: [M+H]⁺=393.1

$^1$H NMR (400 MHz, CDCl$_3$) δ 8.48 (s, 1H), 7.93 (d, J=8.5 Hz, 1H), 7.39 (dd, J=8.5, 2.3 Hz, 1H), 7.15 (d, J=2.0 Hz, 1H), 6.75 (s, 1H), 4.55 (s, 2H), 4.40-4.33 (m, 2H), 2.51-2.38 (m, 4H), 2.11-2.01 (m, 1H), 1.86-1.77 (m, 1H), 1.34 (t, J=7.2 Hz, 3H).

Example 7 Preparation of Compound 04044

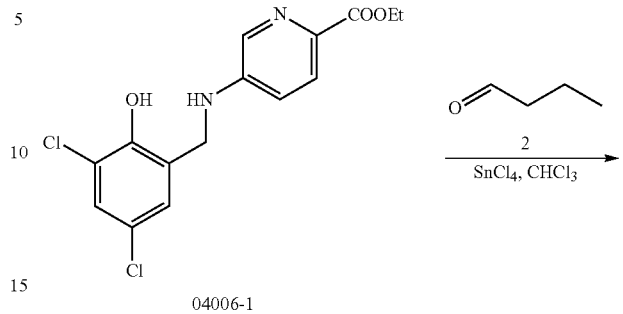

Step 1. Compound 04044

Compound 040064 (50 mg, 0.15 mmol), compound 2 (0.1 mL) and SnCl$_4$ (2 drops, 2M solution in dichloromethane) were dissolved in trichloromethane (8 mL), heated to 90° C. and stirred for 16 hours. After cooling to 25° C., the above solution was concentrated, and the residue was purified by preparative chromatography to obtain compound 04044 (light yellow solid, 2.0 mg, yield: 3.4%).

LCMS: [M+H]⁺=395.0

$^1$H NMR (400 MHz, CDCl$_3$) δ 8.15 (s, 1H), 7.96 (d, J=8.6 Hz, 1H), 7.29 (d, J=2.1 Hz, 1H), 7.15 (s, 1H), 6.89 (d, J=8.1 Hz, 1H), 4.79-4.72 (m, 1H), 4.45-4.39 (m, 4H), 1.69-1.62 (m, 2H), 1.41 (t, J=7.1 Hz, 3H), 1.32-1.25 (m, 2H), 1.01-0.88 (m, 3H).

Example 8 Preparation of Compound 04045

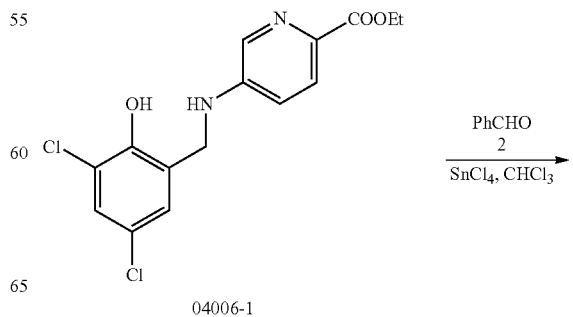

-continued

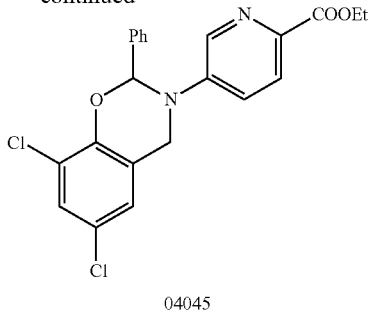

04045

Step 1. Compound 04045

Compound 04006-1 (50 mg, 0.15 mmol), compound 2 (0.1 mL) and SnCl₄ (2 drops, 2M solution in dichloromethane) were dissolved in trichloromethane (8 mL), heated to 90° C. and stirred for 16 hours. After cooling to 25° C., the above solution was concentrated, and the residue was purified by preparative chromatography to obtain compound 04045 (12.3 mg, yield 20%).

LCMS: [M+H]⁺=429.0

¹H NMR (400 MHz, CDCl₃) δ 8.64 (s, 1H), 8.08 (d, J=8.4 Hz, 1H), 7.54 (t, J=7.8 Hz, 1H), 7.46-7.35 (m, 5H), 7.27 (s, 1H), 6.88 (s, 1H), 6.84 (s, 1H), 4.48-4.40 (m, 4H), 1.43 (t, J=7.1 Hz, 3H).

Example 9 Preparation of Compound 04024

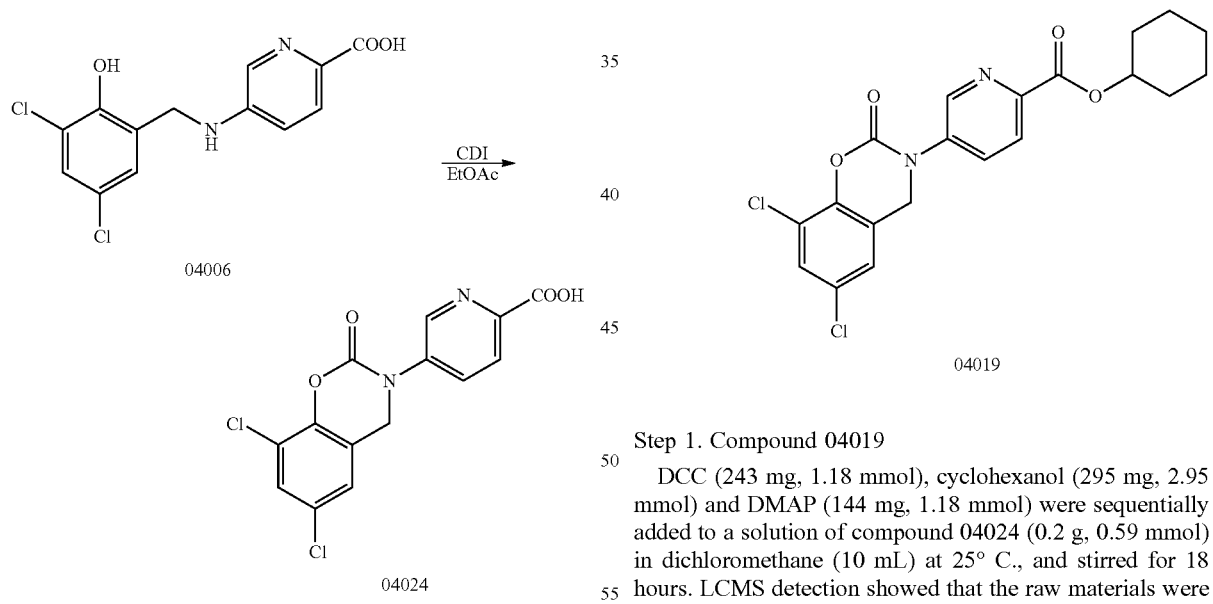

Step 1. Compound 04024

At 25° C., CDI (2.1 g, 12.8 mmol) was added to a solution of compound 04006 (2 g, 6.4 mmol) in dimethyl sulfoxide (15 mL), and stirred for 0.5 h. The reaction solution was slowly poured into 10 mL of ice water, and a large amount of white flocculent solid appeared. The mixture was stirred for 0.5 h, filtered, and the filter cake was dried under reduced pressure to obtain compound 04024 (1.5 g, yield: 69%).

MS (ESI): Calcd. for $C_{14}H_8Cl_2N_2O_4$ 338; Found 339 [M+H]⁺.

¹H NMR (400 MHz, DMSO-d₆): δ 8.84 (s, 1H), 8.16 (d, J=8.4 Hz, 1H), 8.09 (d, J=8.4 Hz, 1H), 7.75 (s, 1H), 7.45 (s, 1H), 2.06 (s, 2H).

Example 10 Preparation of Compound 04019

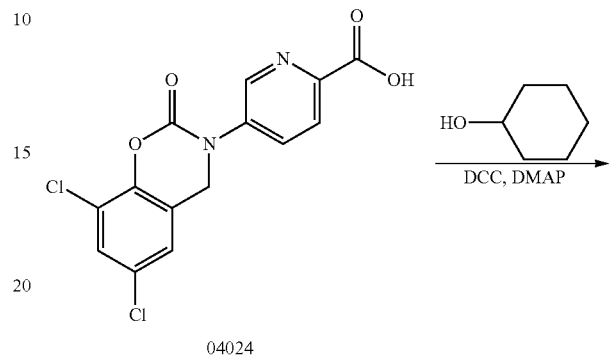

Step 1. Compound 04019

DCC (243 mg, 1.18 mmol), cyclohexanol (295 mg, 2.95 mmol) and DMAP (144 mg, 1.18 mmol) were sequentially added to a solution of compound 04024 (0.2 g, 0.59 mmol) in dichloromethane (10 mL) at 25° C., and stirred for 18 hours. LCMS detection showed that the raw materials were reacted completely, and the reaction solution was filtered. The filtrate was concentrated, and the residue was separated and purified by silica gel column (eluent was petroleum ether:ethyl acetate=10:1 to 2:1) to obtain compound 04019 (33.12 mg, yield: 13%).

MS (ESI): Calcd. for $C_{20}H_{18}Cl_2N_2O_4$ 420; Found 421 [M+H]⁺.

¹HNMR (400 MHz, DMSO-d₆): δ 8.86 (s, 1H), 8.16 (d, J=8.0 Hz, 1H), 8.09 (d, J=8.0 Hz, 1H), 7.75 (s, 1H), 7.46 (s, 1H), 5.06 (s, 2H), 5.00-4.96 (m, 1H), 1.98-1.87 (m, 2H), 1.80-1.70 (m, 2H), 1.70-1.50 (m, 2H), 1.50-1.20 (m, 4H).

Example 11 Preparation of Compound 04020

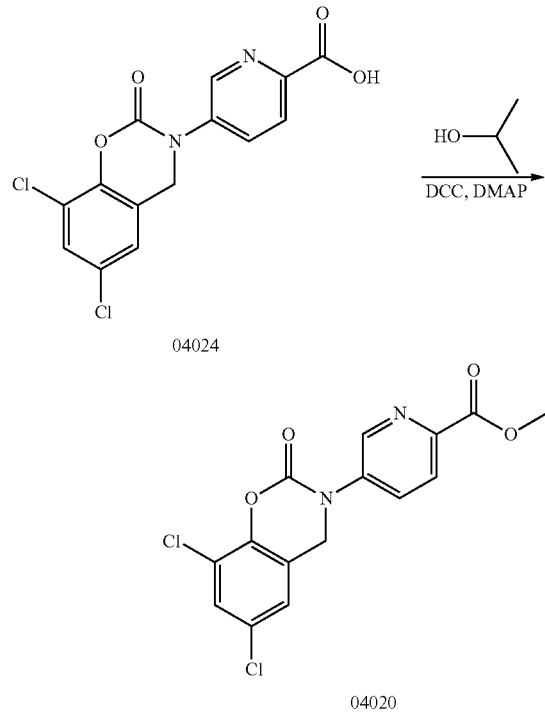

Step 1. Compound 04020

DCC (550 mg, 2.67 mmol), isopropanol (162 mg, 2.67 mmol) and DMAP (218 mg, 1.78 mmol) were sequentially added to a solution of compound 04024 (0.3 g, 0.89 mmol) in dichloromethane (10 mL), and stirred at 25° C. for 18 hours. LCMS detection showed that the raw materials were reacted completely, and the reaction solution was filtered. The filtrate was concentrated under reduced pressure, and the residue was purified by silica gel column (eluent is petroleum ether/ethyl acetate=2/1) to obtain compound 04020 (23.71 mg, yield: 8%).

MS (ESI): Calcd. for $C_{17}H_{14}Cl_2N_2O_4$ 380; Found 381 $[M+H]^+$.

$^1$HNMR (400 MHz, CD$_3$OD): δ 8.89 (s, 1H), 8.26 (d, J=8.0 Hz, 1H), 8.16 (d, J=8.0 Hz, 1H), 7.56 (s, 1H), 7.38 (s, 1H), 5.36-5.29 (m, 1H), 5.06 (s, 2H), 1.44 (d, J=6.4 Hz, 6H).

Example 12 Preparation of Compound 04071

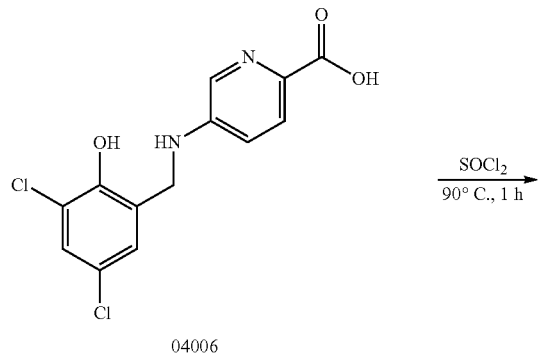

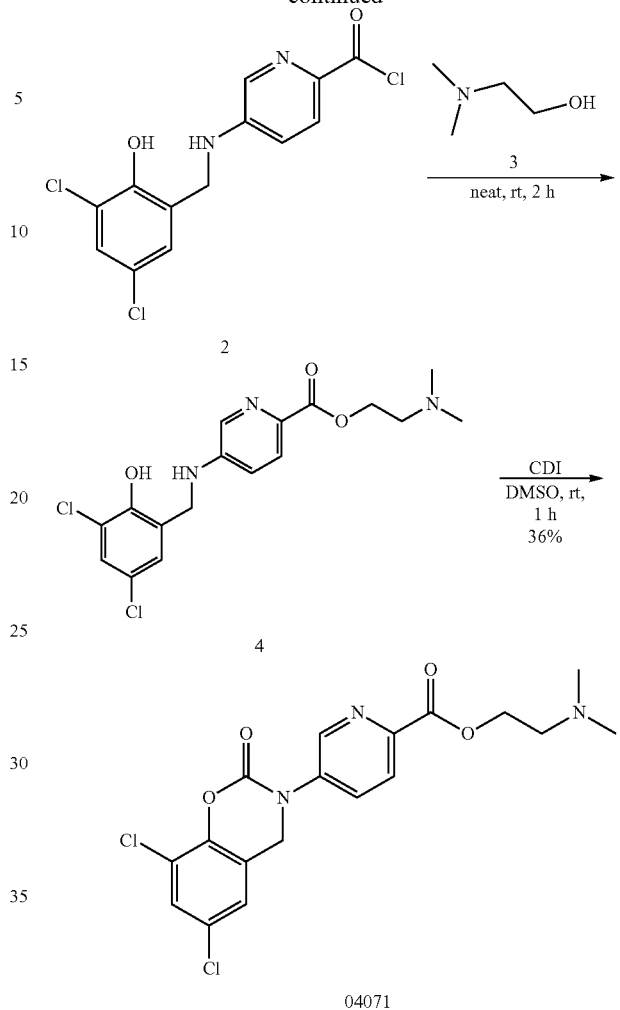

Step 1. Compound 2

The compound 04006 (4.0 g, 12.8 mmol) was slowly added to thionyl chloride (80 mL) at 0° C., the reaction solution was heated to 90° C. and stirred for 1 hour, and the reaction system became a brown-red solution. The brown-gray solid was obtained after the excess thionyl chloride was removed by concentration under reduced pressure. At 0° C., the brown-gray solid was slowly added to compound 3 (20 mL), then the temperature was raised to 25° C. and stirred for 2 hours. After concentration under reduced pressure, the residue was separated and purified by silica gel column chromatography (developing agent was dichloromethane/methanol=10:1) to obtain oil. The oil was added to water (100 mL), and freeze-dried to obtain compound 4 (2.0 g, yield: 40%).

LCMS: $[M+H]^+$=384.1; 386.1.

Step 2. Compound 04071

Compound 4 (800 mg, 1.04 mmol) was dissolved in dimethyl sulfoxide (15 mL), CDI (675 mg, 4.16 mmol) was slowly added, and stirred at 25° C. for 1 hour. The reaction solution was concentrated under reduced pressure, and the residue was purified by preparative liquid chromatography to obtain compound 04071 (308.5 mg, yield: 36%).

LCMS: $[M+H]^+$=410.0, 412.0

$^1$H NMR (400 MHz, DMSO-d$_6$) δ 8.87 (d, J=2.4 Hz, 1H), 8.17 (d, J=8.4 Hz, 1H), 8.10-8.07 (m, 1H), 7.73 (d, J=2.4 Hz,

1H), 7.45 (d, J=2.4 Hz, 1H), 5.06 (s, 2H), 4.41 (t, J=5.6 Hz, 2H), 2.63 (t, J=5.6 Hz, 2H), 2.22 (s, 6H).

Example 13 Preparation of Compound 04167 and Compound 04067

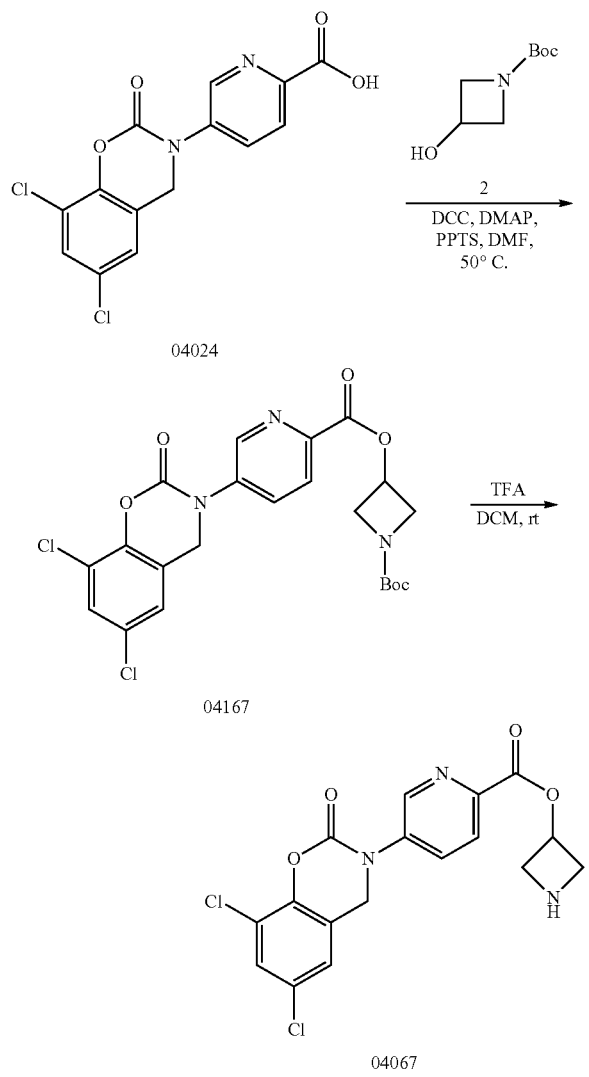

Step 1. Compound 04167

Compound 04024 (1.1 g, 3.243 mmol) was dissolved in dimethylformamide (50 mL), and then compound 2 (2.79 g, 16.107 mmol), DMAP (1.19 g, 9.731 mmol), PPTS (2.44 g, 9.731 mmol) and DCC (1.0 g, 4.865 mmol) were sequentially added. The reaction system was heated to 50° C. and stirred for 4 hours. The mixture was cooled to 25° C., diluted with ethyl acetate (100 mL) and stirred for 0.5 h. The reaction solution was filtered, the filtrate was washed with water, washed with saturated sodium chloride solution, dried over anhydrous sodium sulfate, concentrated under reduced pressure, and the residue was purified by silica gel column chromatography (petroleum ether/ethyl acetate=1/1) to obtain compound 04167 (1.07 g, yield: 66%) as a white solid.

LCMS: [M+H]⁺=494.1.

Step 2. Compound 04067

Compound 04167 (1 g, 2.023 mmol) was dissolved in dichloromethane (10 mL), then trifluoroacetic acid (5 mL) was added, and the reaction solution was stirred at 25° C. for 1 hour. The mixture was concentrated under reduced pressure, and the residue was purified by pre-HPLC (0.1% formic acid/acetonitrile/water) to obtain compound 04067 (583 mg, yield: 67%).

LCMS: [M+H]⁺=394.0

¹H NMR (400 MHz, CD₃OD) δ 8.88 (d, J=2.4 Hz, 1H), 8.28 (d, J=8.4 Hz, 1H), 8.15-8.13 (m, 1H), 7.54 (s, 1H), 7.33 (s, 1H), 5.57-5.53 (m, 1H), 5.06 (s, 2H), 4.06-4.01 (m, 2H), 3.91-3.87 (m, 2H).

Example 14 Preparation of Compound 04068

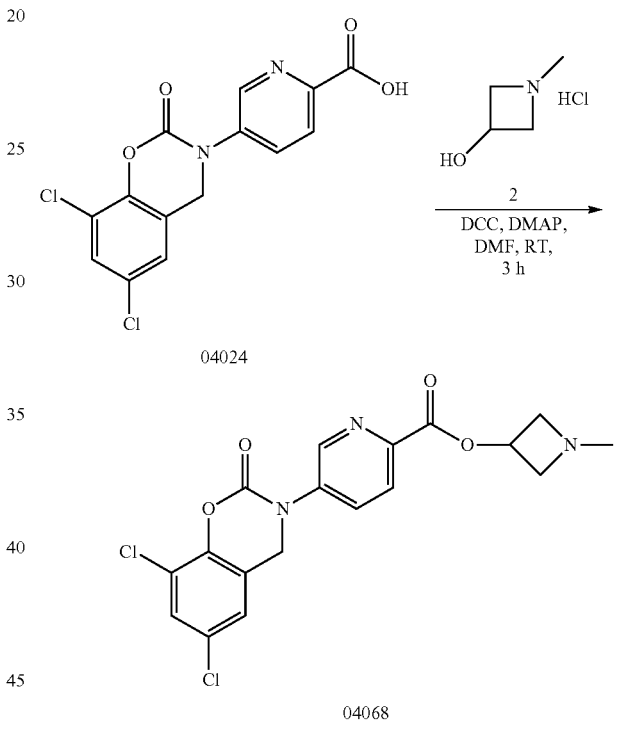

Step 1. Compound 04068

Compound 04024 (3 g, 8.9 mmol) was dissolved in dimethylformamide (20 mL), then DCC (2.7 g, 13.3 mmol), DMPP (110 mg, 0.9 mmol) and compound 2 (1.6 g, 13.3 mmol) were added, and stirred for 3 hours at 25° C. Solid was precipitated after ethyl acetate (100 mL) was added to the reaction solution, and filtered. The filtrate was washed with water. The organic phase was separated and concentrated under reduced pressure, and the residue was purified by silica gel column chromatography (dichloromethane/methanol=100:1 to 100:5) to obtain compound 04068 (500 mg, yield: 14%) as a yellow solid.

LCMS: [M+H]⁺=408.1.

¹H NMR (400 MHz, DMSO-d₆) δ 8.87 (d, J=2.0 Hz, 1H), 8.19 (d, J=8.4 Hz, 1H), 8.11 (dd, J=8.4, 2.4 Hz, 1H), 7.74 (d, J=2.4 Hz, 1H), 7.45 (d, J=2.4 Hz, 1H), 5.20-5.14 (m, 1H), 5.06 (s, 2H), 3.71-3.68 (m, 2H), 3.14-3.11 (m, 2H), 2.30 (s, 3H).

Example 15 Preparation of Compound 04115 and Compound 04034

Step 1. Compound 04115

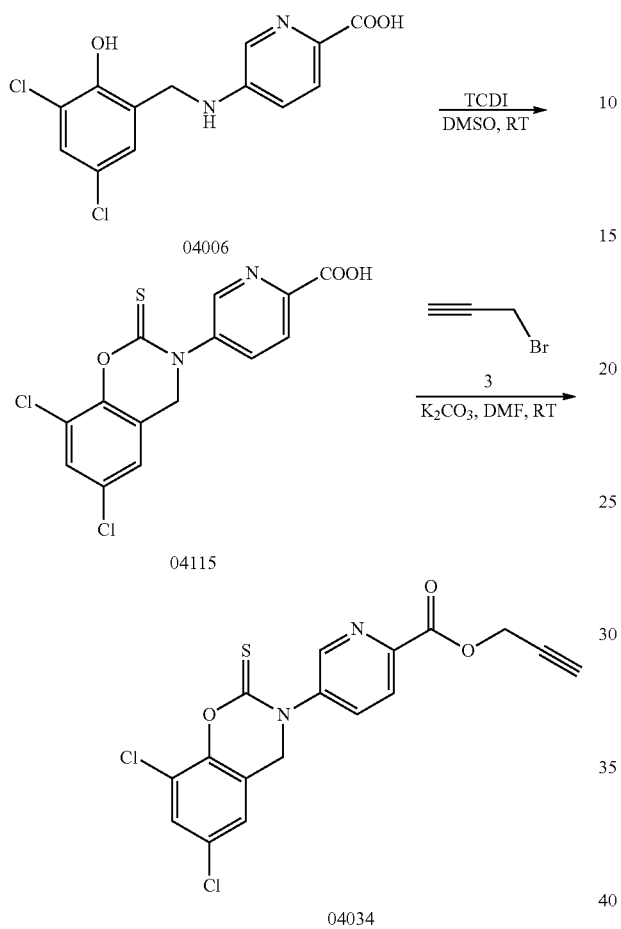

The compound 04006 (1.2 g, 3.8 mmol) was dissolved in dimethyl sulfoxide (10 mL), TCDI (1.37 g, 7.7 mmol) was added, and the solution was stirred at 25° C. for 2 hours under nitrogen protection. The reaction solution was diluted with 10 mL water and the pH value of the solution was adjusted with dilute hydrochloric acid to be less than 7, extracted with ethyl acetate (3×50 mL), dried over anhydrous sodium sulfate, concentrated under reduced pressure, and the residue was purified by silica gel column chromatography (developing agent was DCM/MeOH=100/1) to obtain compound 04115 (yellow solid, 1.2 g, yield: 89%).

LCMS: [M+H]$^+$=351.0.

Step 2. Compound 04034

Compound 04115 (120 mg, 0.34 mmol), compound 3 (60 mg, 0.51 mmol) and potassium carbonate (94 mg, 0.68 mmol) were dissolved in dimethylformamide (2 mL), and the reaction solution was stirred at 25° C. for 1 hour, diluted with water (10 mL) and extracted with ethyl acetate (3×50 mL). The obtained organic phase was dried over anhydrous sodium sulfate, and concentrated under reduced pressure, and the residue was purified by silica gel column chromatography (developing agent was petroleum ether/ethyl acetate=2/1) to obtain compound 04034 (white solid, 55.7 mg, yield: 42%).

LCMS: [M+H]$^+$=393.1.

$^1$H NMR (400 MHz, DMSO-d$_6$) δ8.90 (d, J=2.0 Hz, 1H), 8.24-8.18 (m, 2H), 7.78 (d, J=2.4 Hz, 1H), 7.44 (d, J=2.0 Hz, 1H), 5.02-5.01 (m, 4H), 3.67 (t, J=2.4 Hz, 1H).

Example 16 Preparation of Compound 04033

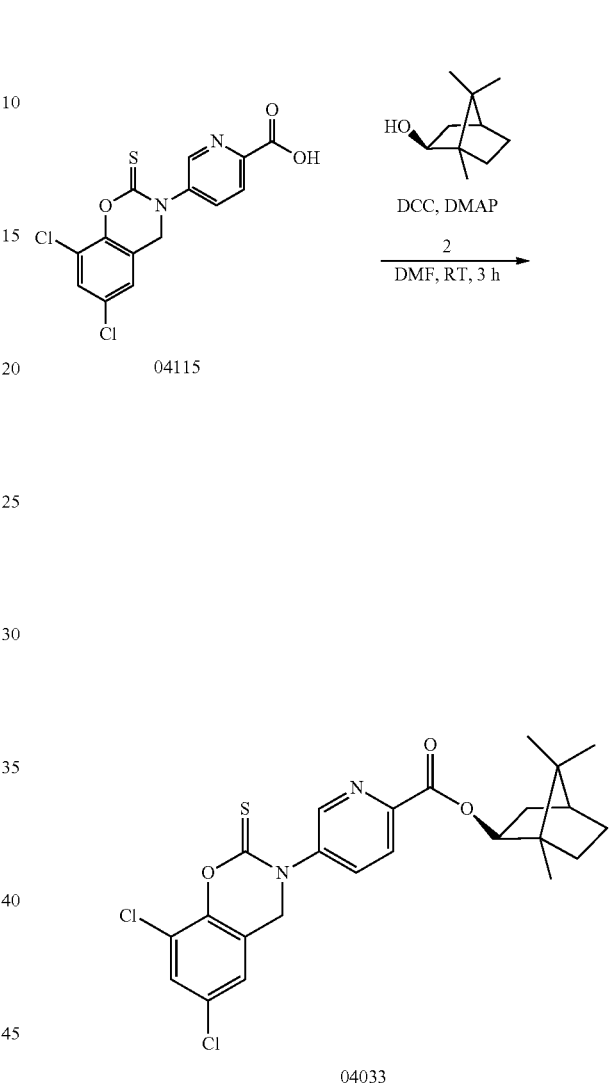

Step 1. Compound 04033

Compound 04115 (150 mg, 0.42 mmol), compound 2 (85 mg, 0.55 mmol), DCC (112 mg, 0.55 mmol) and DMAP (15 mg, 0.04 mmol) were dissolved in dimethylformamide (2 mL), and stirred at 25° C. for 3 hours. The reaction solution was diluted with water (30 mL) and then extracted with ethyl acetate (3×50 ml), and the organic phase was dried over anhydrous sodium sulfate. The residue after concentration under reduced pressure was purified by silica gel column chromatography (developing agent was petroleum ether/ethyl acetate=2/1) to obtain compound 04033 (white solid, 32.8 mg, yield 16%).

LCMS: [M+H]$^+$=491.1.

$^1$H NMR (400 MHz, DMSO-d$_6$) δ 8.89 (d, J=1.6 Hz, 1H), 8.20-8.16 (m, 2H), 7.78 (s, 1H), 7.44 (s, 1H), 5.10 (d, J=9.2 Hz, 1H), 5.02 (s, 2H), 2.42-2.39 (m, 1H), 2.15-2.06 (m, 1H), 1.81-1.71 (m, 2H), 1.42-1.27 (m, 2H), 1.15-1.10 (m, 1H), 0.98-0.85 (m, 9H).

Example 17 Preparation of Compound 04132 and Compound 04032

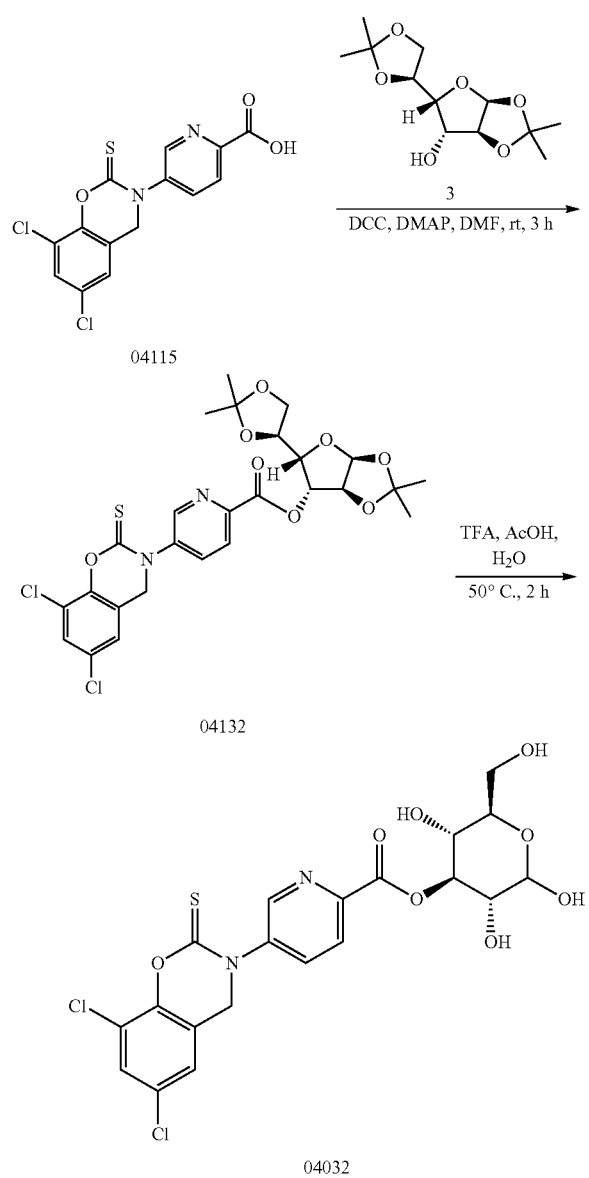

Step 1. Compound 04132

Compound 04115 (1.06 g, 3.00 mmol), compound 3 (1.01 g, 3.90 mmol), DCC (803 mg, 3.90 mmol) and DMAP (36.6 mg, 0.30 mmol) were dissolved in dimethylformamide (10 mL), and stirred at 25° C. for 3 hours. The reaction solution was diluted with water (100 mL) and then extracted with ethyl acetate (3×100 mL). The organic phase was dried over anhydrous sodium sulfate and concentrated under reduced pressure. The residue was purified by silica gel column chromatography (developing agent was petroleum ether/ethyl acetate=5/1) to obtain compound 04132 (yellow solid, 750 mg, yield: 42%).

LCMS: $[M+H]^+=597.1$.

Step 2. Compound 04032

The compound 04132 (298 mg, 0.50 mmol) was dissolved in water (3 mL), trifluoroacetic acid (3 mL) and acetic acid (3 mL) were added, and the reaction was heated to 50° C. and stirred for 2 hours. The reaction solution was concentrated under reduced pressure, and the residue was purified by preparative HPLC to obtain compound 04032 (white solid, 38.1 mg, yield 15%).

LCMS: $[M+H]^+=517.1$.

$^1$H NMR (400 MHz, DMSO-$d_6$): δ 8.88 (s, 1H), 8.25-8.16 (m, 2H), 7.78 (s, 1H), 7.45 (s, 1H), 6.99-6.37 (m, 1H), 5.36-4.96 (m, 5H), 4.94-4.40 (m, 2H), 3.80-3.58 (m, 1H), 3.59-3.40 (m, 2H), 3.23-3.19 (m, 2H).

Example 18 Preparation of Compound 04135 and Compound 04035

Step 1. Compound 04135

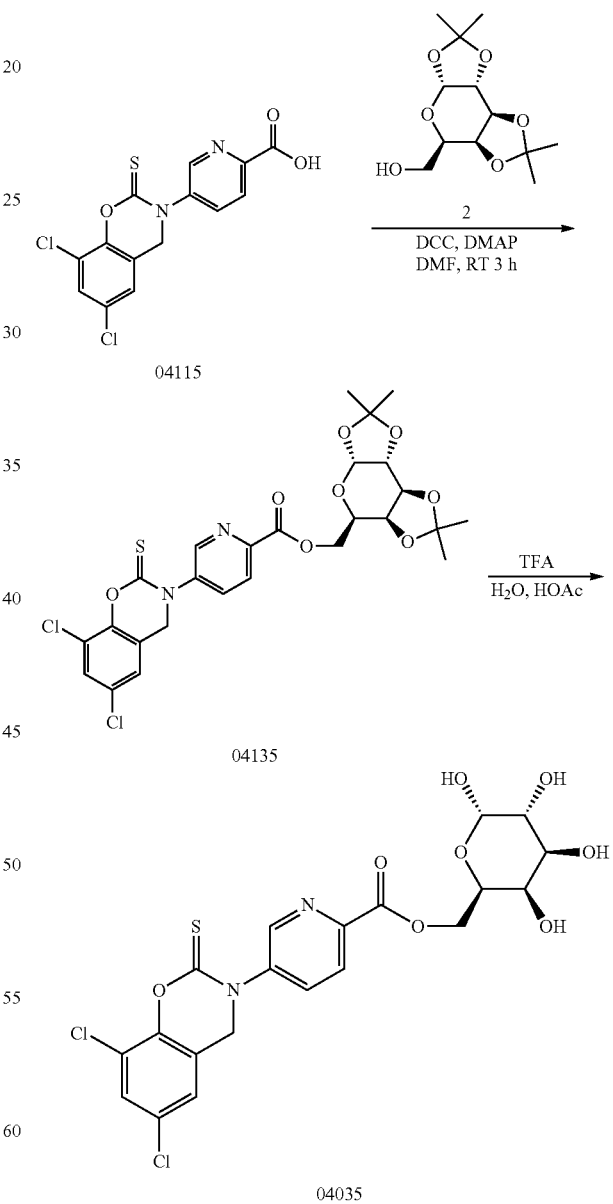

Compound 04115 (400 mg, 1.1 mmol), Compound 2 (381 mg, 1.4 mmol), DCC (288 mg, 1.4 mmol) and DMAP (12 mg, 0.1 mmol) were dissolved in dimethylformamide (3 mL), and stirred at 25° C. for 3 hours. The reaction solution was diluted with water (30 mL), extracted with ethyl acetate (3×50 mL), the organic phase was dried over anhydrous sodium sulfate, concentrated under reduced pressure, and the residue was purified by silica gel column chromatography (developing agent was petroleum ether/ethyl acetate=2/1) to obtain compound 04135 (white solid, 150 mg, yield: 23%).

LCMS: [M+H]$^+$=597.1.

Step 2. Compound 04035

The compound 04135 (150 mg, 0.25 mmol) was dissolved in water, trifluoroacetic acid (2 mL) and acetic acid (4 mL) were added, and the reaction solution was stirred at 50° C. for 2 hours. The mixture was concentrated under reduced pressure, and the residue was purified by preparative HPLC to obtain compound 04035 (white solid, 91.1 mg, yield 70%).

LCMS: [M+H]$^+$=517.1, [M+H+2]$^+$=519.1

$^1$H NMR (400 MHz, cd3od) δ 8.81 (d, J=2.2 Hz, 1H), 8.29 (d, J=8.4 Hz, 1H), 8.12 (dd, J=8.4, 2.4 Hz, 1H), 7.56 (d, J=2.2 Hz, 1H), 7.29 (s, 1H), 4.98 (s, 3H), 4.62-4.47 (m, 5H), 3.94 (dd, J=18.6, 7.5 Hz, 2H), 3.83-3.74 (m, 1H), 3.50 (d, J=6.4 Hz, 1H).

Example 19 Preparation of Compound 04036

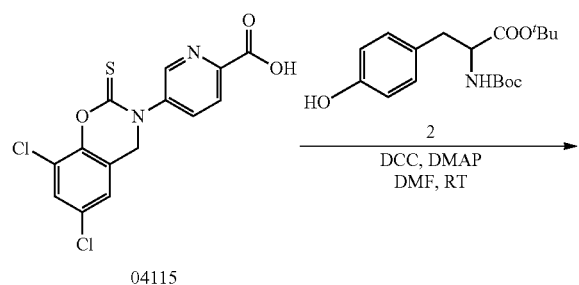

04115

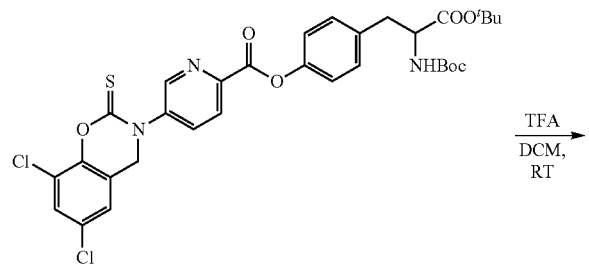

3

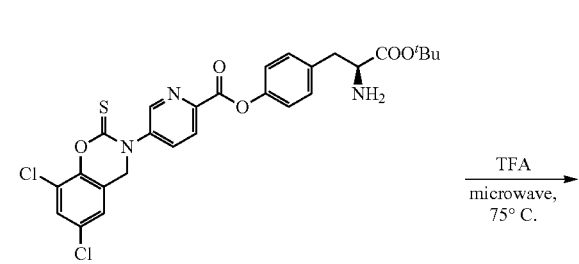

4

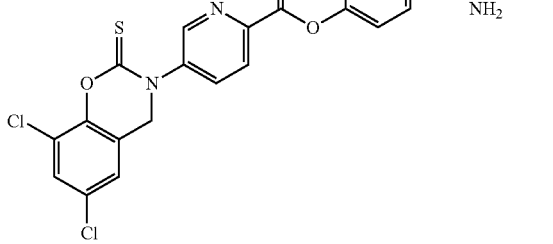

04036

Step 1. Compound 3

Compound 04115 (900 mg, 2.5 mmol)), compound 2 (1.03 g, 3.1 mmol), DCC (670 mg, 3.25 mmol) and DMAP (30 mg, 0.25 mmol) were dissolved in dimethylformamide (10 mL), and stirred at 25° C. for 3 hours. The reaction solution was diluted with water (30 mL) and then extracted with ethyl acetate (3×50 mL), the organic phase was dried over anhydrous sodium sulfate, concentrated under reduced pressure, and the residue was purified by silica gel column chromatography (developing agent was petroleum ether/ethyl acetate=2/1) to obtain compound 3 (white solid, 300 mg, yield: 1.8%).

Step 2. Compound 4

Compound 3 (150 mg, 0.22 mmol) was dissolved in dichloromethane (10 mL), trifluoroacetic acid (5 mL) was added, and stirred at 25° C. for 18 hours. The reaction solution was concentrated under reduced pressure, and the residue was purified by preparative HPLC to obtain compound 4 (white solid, 80 mg, yield: 63%).

LCMS: [M+H]$^+$=574.1.

Step 3. Compound 04036

Compound 4 (80 mg, 0.14 mmol) was dissolved in trifluoroacetic acid (2 mL), and the reaction solution was heated with microwave to 75° C. and reacted for 10 minutes. The reaction solution was concentrated under reduced pressure, and the residue was purified by preparative HPLC to obtain compound 04036 (white solid, 20.1 mg, yield: 27%).

LCMS: [M+H]$^+$=518.1.

$^1$H NMR (400 MHz, DMSO-d$_6$) δ 8.94 (d, J=2.3 Hz, 1H), 8.45-8.07 (m, 1H), 7.76 (d, J=2.4 Hz, 0H), 7.39 (dd, J=33.6, 5.4 Hz, 2H), 7.21 (d, J=8.5 Hz, 2H), 5.02 (s, 2H), 3.41 (d, J=4.5 Hz, 1H), 3.14 (s, 1H), 2.88 (d, J=6.3 Hz, 1H).

Example 20 Preparation of Compound 04048

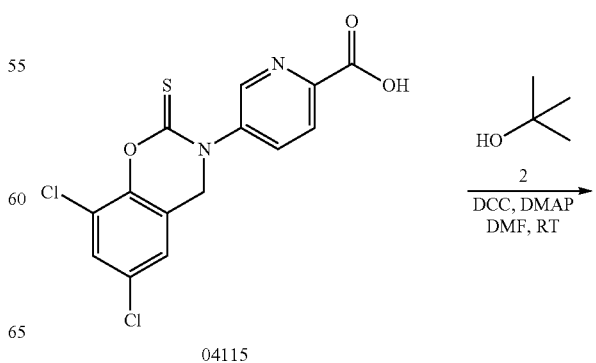

04115

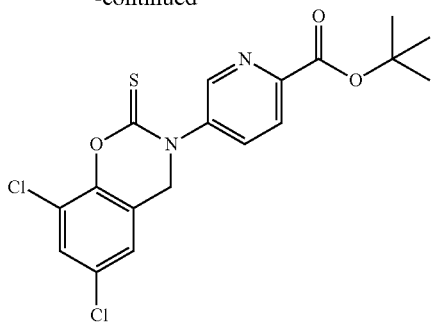

04048

Step 1. Compound 04048

Compound 04115 (1 g, 2.8 mmol), tert-butanol (980 mg, 14.1 mmol), DCC (640 mg, 3.1 mmol) and DMAP (68 mg, 0.56 mmol) were dissolved in dimethylformamide (15 mL), and stirred at 25° C. for 3 hours. The reaction solution was diluted with water (60 mL) and then extracted with ethyl acetate (3×100 mL), the organic phase was dried over anhydrous sodium sulfate, concentrated under reduced pressure, and the residue was purified by silica gel column chromatography (developing agent: petroleum ether/ethyl acetate=2/1) to obtain compound 04048 (white solid, 28.5 mg, yield: 2.5%).

LCMS: [M+H]$^+$=411.1.

$^1$H NMR (400 MHz, DMSO-d$_6$) δ 8.85 (s, 1H), 8.15 (s, 2H), 7.79 (d, J=2.1 Hz, 1H), 7.45 (d, J=1.9 Hz, 1H), 5.01 (s, 2H), 1.58 (s, 9H).

Example 21 Preparation of Compound 04049

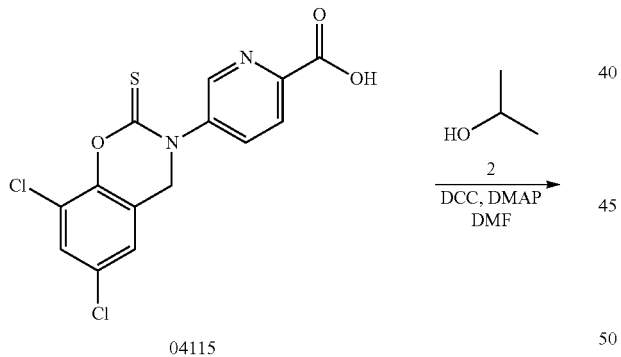

Step 1. Compound 04049

Compound 04115 (350 mg, 1 mmol), isopropanol (300 mg, 5 mmol), DCC (250 mg, 1.2 mmol) and DMAP (12 mg, 0.1 mmol) were dissolved in dimethylformamide (3 mL), and stirred at 25° C. for 3 hours. The reaction solution was diluted with water (30 mL) and then extracted with ethyl acetate (3×50 mL), the organic phase was dried over anhydrous sodium sulfate, concentrated under reduced pressure, and the residue was purified by silica gel column chromatography (developing agent: petroleum ether/ethyl acetate=2/1) to obtain compound 04049 (white solid, 10.7 mg, yield 2.7%).

LCMS: [M+H]$^+$=397.1, [M+H+2]$^+$=399.1

$^1$H NMR (400 MHz, DMSO-d$_6$) δ 8.87 (d, J=1.8 Hz, 1H), 8.18 (dt, J=8.4, 5.3 Hz, 2H), 7.78 (d, J=2.3 Hz, 1H), 7.45 (d, J=2.2 Hz, 1H), 5.25-5.15 (m, 1H), 5.02 (s, 2H), 1.36 (d, J=6.2 Hz, 6H).

Example 22 Preparation of Compound 04050

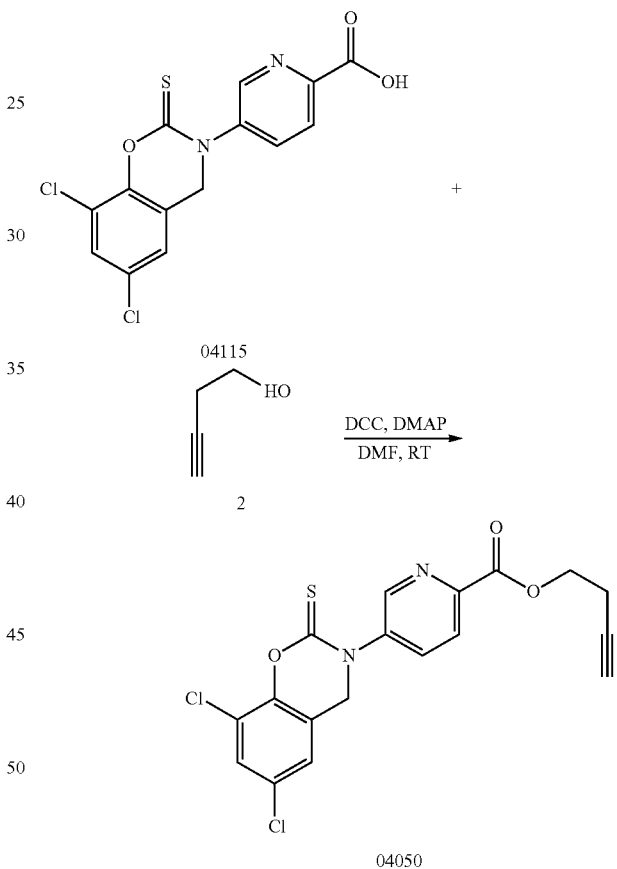

Step 1. Compound 04050

Compound 041.15 (350 mg, 1.0 mmol), compound 2 (170 mg, 2.0 mmol), DCC (247 mg, 1.2 mmol) and DMAP (12 mg, 0.1 mmol) were dissolved in dimethylformamide (3 mL), and stirred at 25° C. for 3 hours. The reaction solution was diluted with water (30 mL) and then extracted with ethyl acetate (3×50 mL), the organic phase was dried over anhydrous sodium sulfate, concentrated under reduced pressure, and the residue was purified by silica gel column chromatography (developing agent: dichloromethane/tetrahydrofuran=100/1) to obtain compound 04050 (white solid, 72 mg, yield: 18%).

LCMS: [M+H]$^+$=407.0, [M+H+2]$^+$=409.0

$^1$H NMR (400 MHz, DMSO-d$_6$) δ 8.89 (d, J=2.0 Hz, 1H), 8.23-8.14 (m, 2H), 7.78 (d, J=2.4 Hz, 1H), 7.73 (d, J=2.4 Hz, 1H), 5.02 (s, 2H), 4.41 (t, J=6.4 Hz, 2H), 2.91 (s, 1H), 2.68-2.66 (m, 2H).

Example 23 Preparation of Compound 04052

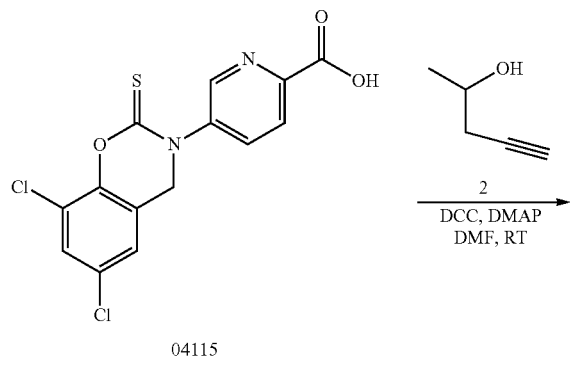

Step 1. Compound 04052

Compound 04115 ((200 mg, 0.56 mmol), compound 2 (57 mg, 0.67 mmol), DCC (138 mg, 0.67 mmol) and DMAP (7 mg, 0.067 mmol) were dissolved in dimethylformamide (3 mL), and stirred at 25° C. for 3 hours. The reaction solution was diluted with water (20 mL) and then extracted with ethyl acetate (3×30 mL), the organic phase was dried over anhydrous sodium sulfate, concentrated under reduced pressure, and the residue was purified by silica gel column chromatography (developing agent: dichloromethane/tetrahydrofuran=100/1) to obtain compound 04052 (white solid, 49 mg, yield: 21%)

LCMS: [M+H]$^+$=421.0

$^1$H NMR (400 MHz, DMSO-d$_6$) δ 8.88 (s, 1H), 8.22-8.16 (m, 2H), 7.78 (d, J=2.0 Hz, 1H), 7.43 (d, J=1.6 Hz, 1H), 5.21-5.17 (m, 1H), 5.08 (s, 2H), 2.95 (s, 1H), 2.65-2.63 (m, 2H), 1.40 (d, J=6.0 Hz, 3H).

Example 24 Preparation of Compound 04055

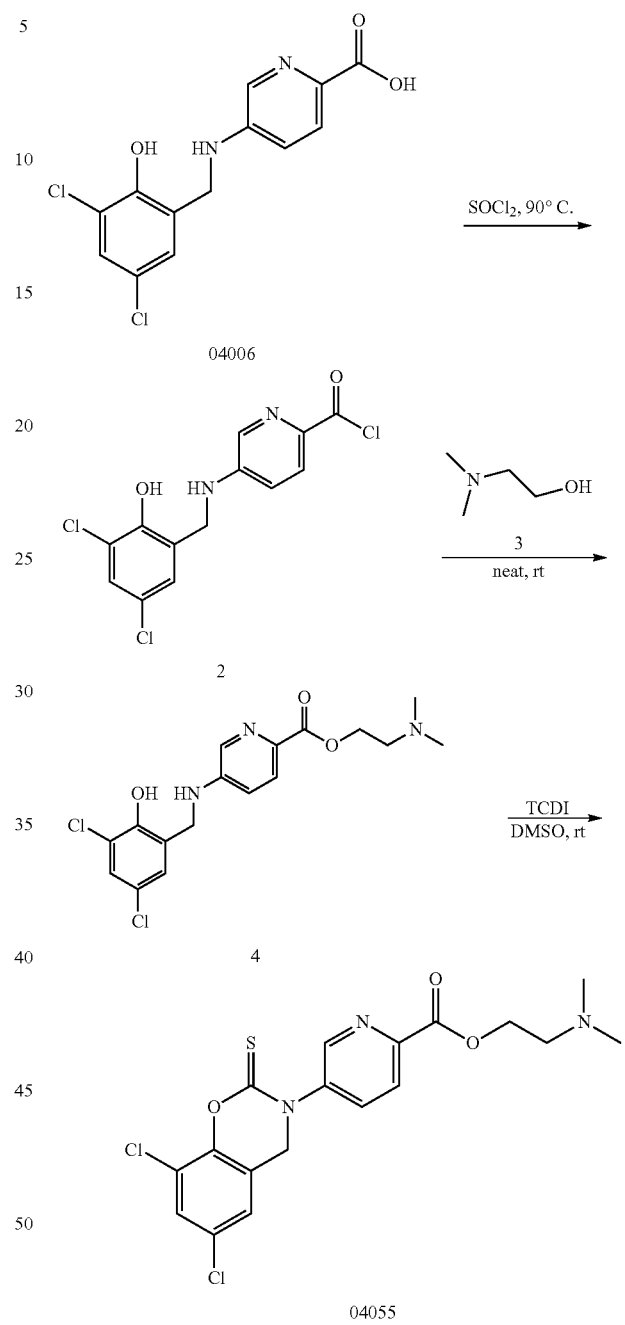

Step 1. Compound 4

Compound 04006 (1.5 g, 4.8 mmol) was dissolved in thionyl chloride (15 mL), and after stirring at 90° C. for 2 hours, thionyl chloride was evaporated under vacuum to be removed to obtain black compound 2 (crude product). The above compound 2 was added to compound 3 (10 mL) at 0° C., and the reaction solution was stirred at 25° C. for 3 hours. The mixture was concentrated under reduced pressure, and the residue was purified by silica gel column chromatography (developing agent: dichloromethane/methanol=10/1) to obtain compound 4 (brown solid, 2.1 g, yield: 100%).

LCMS: [M+H]$^+$=384.2.

Step 2. Compound 04055

Compound 4 (700 mg, 1.82 mmol) was dissolved in dimethyl sulfoxide (20 mL), TCDI (649 mg, 3.64 mmol) was added, and stirred at 25° C. for 3 hours under nitrogen protection. The reaction solution was diluted with ethyl acetate (200 mL) and washed with saturated sodium chloride solution (3×50 mL), the organic phase was dried over anhydrous sodium sulfate, concentrated under reduced pressure, and the residue was purified by preparative liquid chromatography to obtain compound 04055 (67.1 mg, yield: 8.6%).

LCMS: [M+H]$^+$=426.0, [M+H+2]$^+$=428.0

$^1$H NMR (400 MHz, DMSO-d$_6$) δ 8.88 (s, 1H), 8.27-8.07 (m, 2H), 7.78 (d, J=2.4 Hz, 1H), 7.44 (s, 1H), 5.02 (s, 2H), 4.42 (t, J=5.6 Hz, 2H), 2.66 (t, J=5.6 Hz, 2H), 2.24 (s, 6H).

Example 25 Preparation of Compound 04169 and Compound 04069

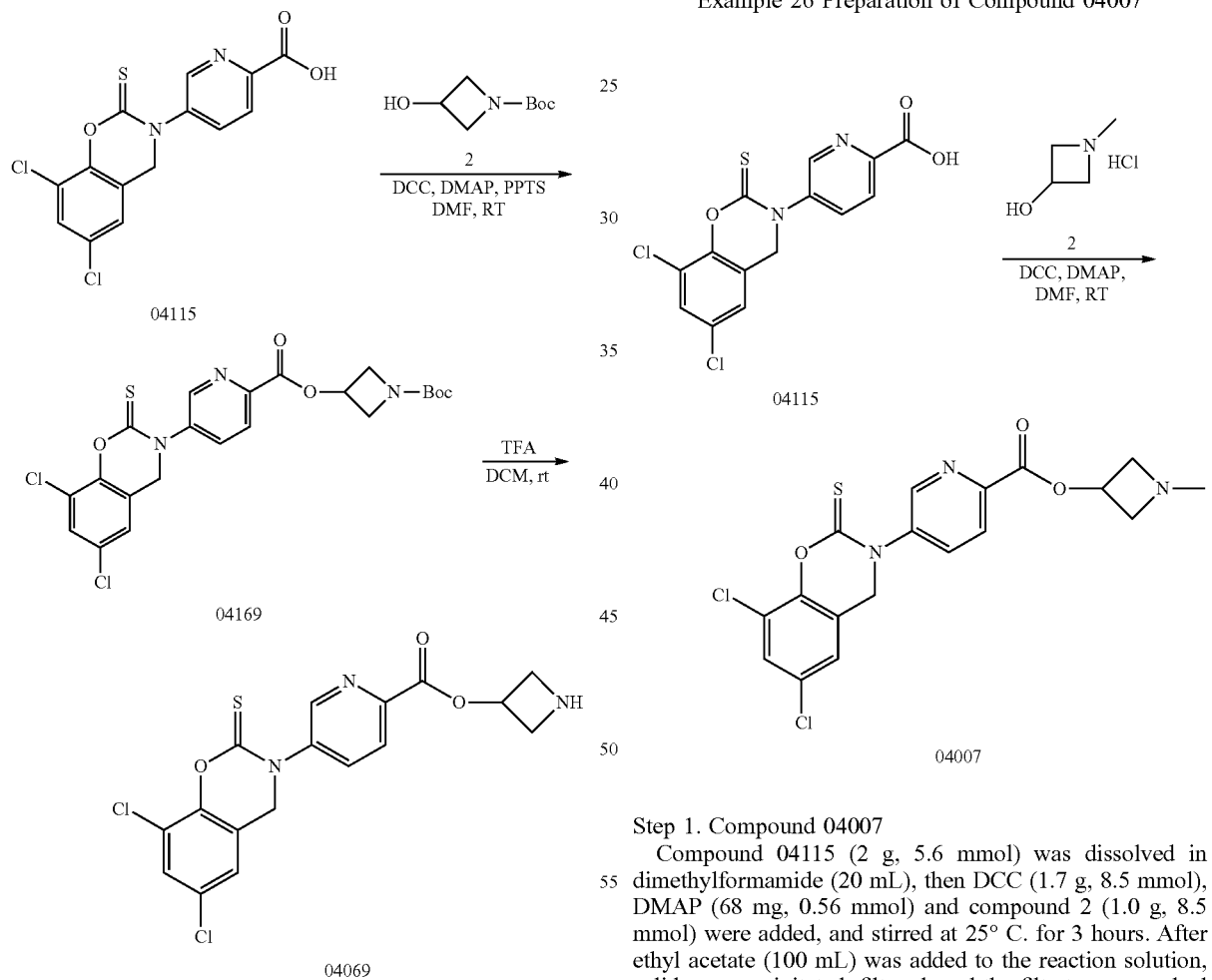

Step 1. Compound 04169

Compound 04115 (2.09 g, 5.9 mmol) was dissolved in dimethylformamide (100 mL), then DCC (1.8 g, 8.9 mmol), DMAP (2.16 g, 17.7 mmol), PPTS (4.4 g, 17.7 mmol) and compound 2 (5.0 g, 29.4 mmol) were added, and the reaction solution was stirred at 50° C. for 4 hours. After ethyl acetate (100 mL) was added to the reaction solution, solid was precipitated, filtered, and the filtrate was washed with water. The separated organic phase was concentrated under reduced pressure, and the residue was purified by silica gel column chromatography (petroleum ether/ethyl acetate=100/1) to obtain compound 04169 (yellow solid, 1.6 g, yield: 53%).

LCMS: [M+H]$^+$=510.0.

Step 2. Compound 04069

Compound 04169 (1.0 mg, 1.96 mmol) was dissolved in dichloromethane (6 mL), then trifluoroacetic acid (3 mL) was added, and reacted at 25° C. for 1 hour. The mixture was concentrated under reduced pressure, and the residue was purified by preparative liquid chromatography to obtain compound 04069 (yellow solid, 420.6 mg, yield: 48%).

LCMS: [M+H]$^+$=410.0

$^1$H NMR (400 MHz, CD$_3$OD) δ 8.89 (d, J=2.4 Hz, 1H), 8.36 (d, J=8.4 Hz, 1H), 8.18 (dd, J=8.4, 2.4 Hz, 1H), 7.58 (d, J=2.4 Hz, 1H), 7.30 (d, J=2.4 Hz, 1H), 5.63-5.60 (m, 1H), 5.00 (s, 2H), 4.57-4.52 (m, 2H), 4.37-4.32 (m, 2H).

Example 26 Preparation of Compound 04007

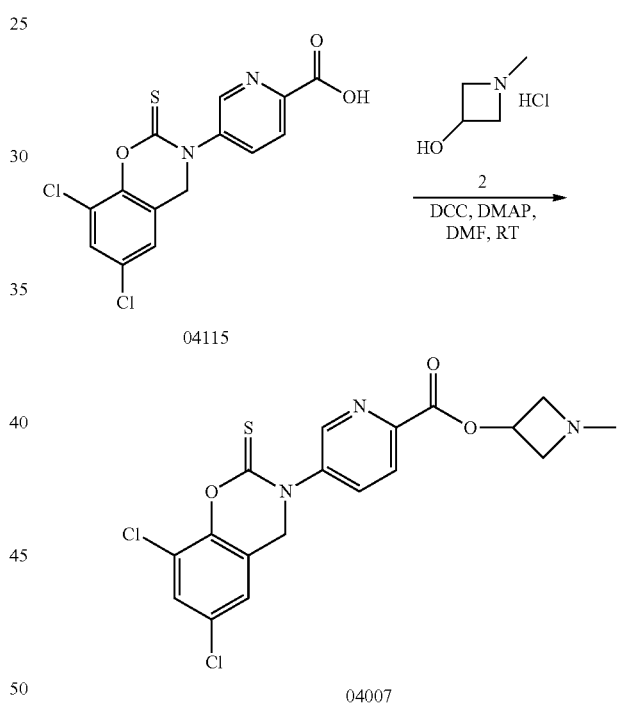

Step 1. Compound 04007

Compound 04115 (2 g, 5.6 mmol) was dissolved in dimethylformamide (20 mL), then DCC (1.7 g, 8.5 mmol), DMAP (68 mg, 0.56 mmol) and compound 2 (1.0 g, 8.5 mmol) were added, and stirred at 25° C. for 3 hours. After ethyl acetate (100 mL) was added to the reaction solution, solid was precipitated, filtered, and the filtrate was washed with water. The organic phase was concentrated under reduced pressure, and the residue was purified by silica gel column chromatography (dichloromethane/methanol=100/1) to obtain compound 04007 (500 mg, yield: 21%) as yellow solid.

LCMS: [M+H]$^+$=424.0.

$^1$HNMR (400 MHz, DMSO-d$_6$) δ 8.89 (d, J=1.6 Hz, 1H), 8.25-8.19 (m, 2H), 7.78 (d, J=2.4 Hz, 1H), 7.44 (d, J=2.4 Hz,

1H), 5.21-5.15 (m, 1H), 5.02 (s, 2H), 3.72-3.68 (m, 2H), 3.15-3.12 (m, 2H), 2.30 (s, 3H).

Example 27 Preparation of Compound 04047

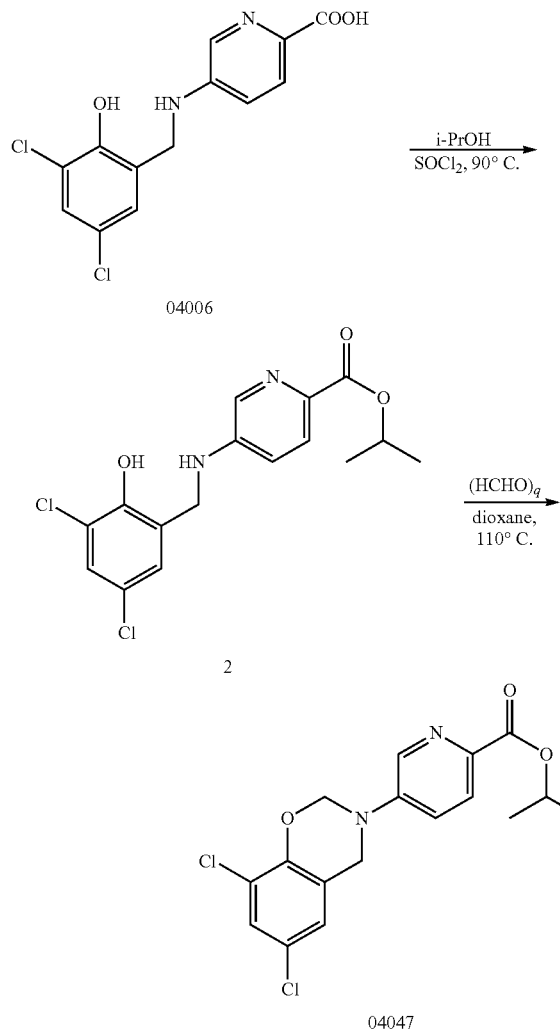

Step 1. Compound 2

Compound 04006 (200 mg, 0.64 mmol) was dissolved in thionyl chloride (3 mL), heated to 90° C., stirred for 1 hour, cooled to 0° C., and isopropanol (10 mL) was added to the reaction solution, and heated to 25° C. and stirred for 30 minutes. After evaporating the reaction solution under reduced pressure to dry, dichloromethane (50 mL) was added. The obtained solution was washed with saturated sodium bicarbonate solution (3×50 mL), water (2×50 mL) and saturated sodium chloride solution (2×50 mL) in sequence. The organic phase was dried over anhydrous sodium sulfate and then concentrated under reduced pressure. The residue was purified by silica gel column chromatography (developing solvent: dichloromethane/methanol=10/1) to obtain compound 2 (brown solid, 260 mg, yield: 100%).

LCMS: [M+H]⁺=355.1.

Step 2. Compound 04047

Compound 2 (100 mg, 0.28 mmol) was dissolved in 1,4-dioxane (3 mL), paraformaldehyde (CAS: 30525-89-4, 25 mg, 0.845 mmol) was added, and the reaction solution was heated to 110° C. and stirred for 16 hours. The mixture was concentrated under reduced pressure, and the residue was purified by preparative liquid chromatography to obtain compound 04047 (yellow solid, 51 mg, yield: 50%).

LCMS: [M+H]⁺=367.1

¹H NMR (400 MHz, CDCl₃) δ 8.57 (d, J=2.5 Hz, 1H), 8.04 (d, J=8.6 Hz, 1H), 7.44 (dd, J=8.7, 2.7 Hz, 1H), 7.24 (d, J=2.3 Hz, 1H), 6.96 (d, J=2.1 Hz, 1H), 5.49 (s, 2H), 5.34-5.28 (m, 1H), 4.69 (s, 2H), 1.40 (d, J=6.3 Hz, 6H).

Example 28 Preparation of Compound 04051

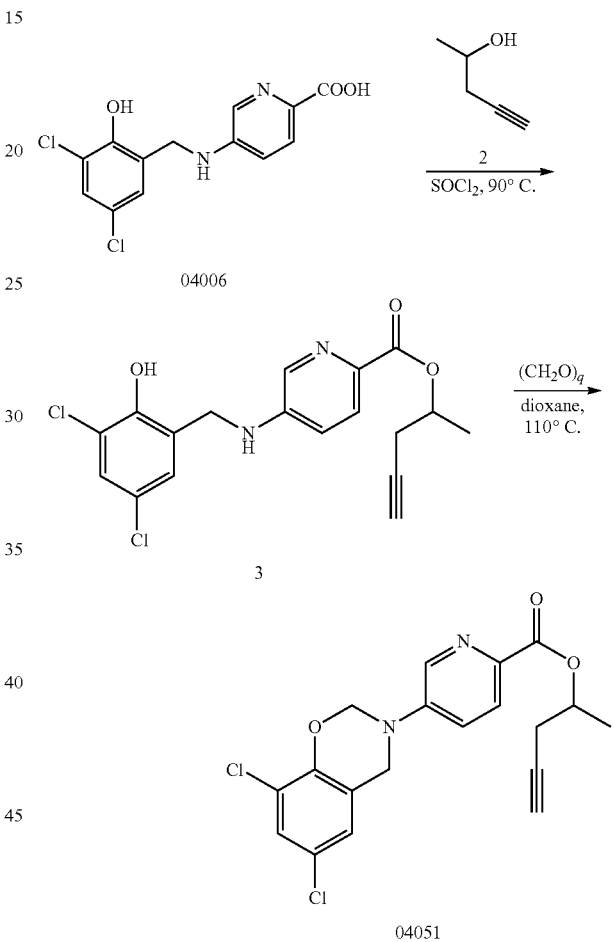

Step 1. Compound 3

Compound 04006 (1.5 g, 4.8 mmol) was dissolved in thionyl chloride (15 mL), heated to 90° C. and stirred for 2 hours. After the reaction solution was concentrated under reduced pressure, compound 2 (3 mL) was added, and the obtained solution was stirred at 25° C. for 5 hours. The mixture was concentrated under reduced pressure, and the residue was purified by preparative liquid chromatography to obtain compound 3 (yellow solid, 590 mg, yield: 32%).

LCMS: [M+H]⁺=379.1

Step 2. Compound 04051

Compound 3 (110 mg, 0.29 mmol) was dissolved in 1,4-dioxane (3 mL), paraformaldehyde (CAS: 30525-89-4) (79 mg, 0.87 mmol) was added, and the reaction solution was heated to 110° C. and stirred for 3 hours under nitrogen protection. The mixture was concentrated under reduced pressure, and the residue was purified by silica gel column chromatography (developing agent: petroleum ether/ethyl acetate=1/1) to obtain compound 04051 (pink solid, 27.3 mg, yield: 24%).

LCMS: [M+H]$^+$=391.0

$^1$H NMR (400 MHz, CDCl$_3$) δ 8.57 (d, J=2.0 Hz, 1H), 8.05 (d, J=8.8 Hz, 1H), 7.44 (dd, J=8.8, 2.4 Hz, 1H), 7.25 (s, 1H), 6.97 (s, 1H), 5.50 (s, 2H), 5.33-5.27 (m, 1H), 4.70 (s, 2H), 2.69-2.55 (m, 2H), 2.02 (s, 1H), 1.49 (d, J=6.0 Hz, 3H).

Example 29 Preparation of Compound 04038

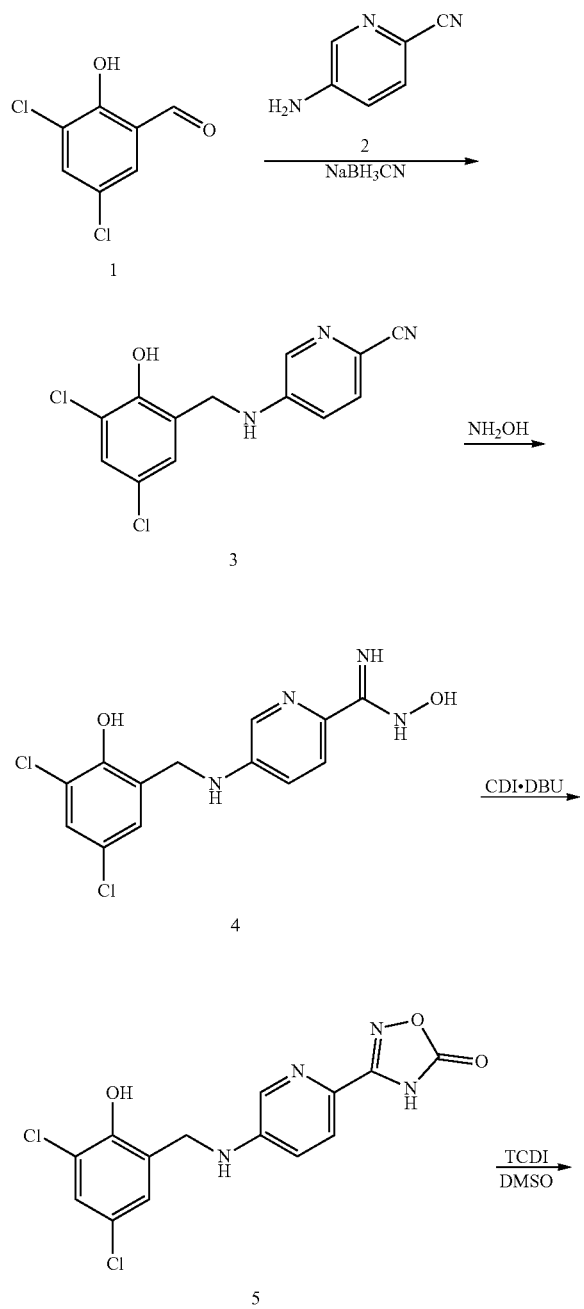

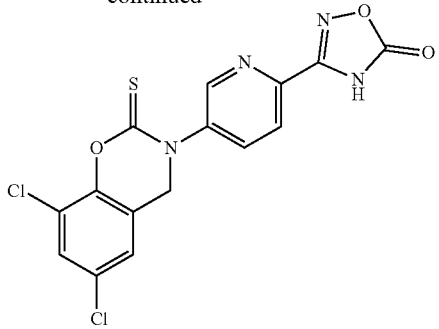

04038

Step 1. Compound 3

Glacial acetic acid (1 mL) was added to a solution of compound 2 (0.60 g, 5.1 mmol) and compound 1 (1.0 g, 5.2 mmol) in methanol (10 mL), stirred at 25° C. for 2 hours, then sodium cyanoborohydride (1.0 g, 15.7 mmol) was added, and continued to stir for 1 hour. The mixture was concentrated under reduced pressure, and the residue was purified by silica gel column chromatography to obtain white compound 3 (600 mg, yield: 39.5%).

MS (ESI): Calcd. for $C_{13}H_9Cl_2N_3O$ 293; Found 294 [M+H]$^+$.

Step 2. Compound 4

Hydroxylamine hydrochloride (47 mg, 1.4 mmol) and sodium bicarbonate (114 mg, 1.4 mmol) were added to a mixed solution of compound 3 (0.20 g, 0.68 mmol) in ethanol (6 mL) and water (3 mL), and the reaction system was heated to 80° C. and stirred for 2 hours. The reaction solution was cooled to 25° C., concentrated under reduced pressure, and water (10 mL) was added, and stirred at 25° C. for 30 minutes, extracted with dichloromethane, dried over anhydrous sodium sulfate, and concentrated under reduced pressure to obtain white compound 4 (166 mg, yield: 74.9%).

MS (ESI): Calcd. for $C_{13}H_{12}Cl_2N_4O_2$ 326; Found 327 [M+H]$^+$.

Step 3. Compound 5

CDI (129 mg, 0.80 mmol) and DBU (122 mg, 0.80 mmol) were added to a solution of compound 4 (0.13 g, 0.40 mmol) in dimethyl sulfoxide (6 mL). The reaction system was stirred at 25° C. for 60 minutes, diluted with water (50 mL), adjusted pH=3 with 1N HCl, extracted with ethyl acetate, dried over anhydrous sodium sulfate, concentrated under reduced pressure, and the residue was purified by preparative chromatography to obtain white compound 5 (52 mg, yield: 36.9%).

MS (ESI): Calcd. for $C_{14}H_{10}Cl_2N_4O_3$ 352; Found 353 [M+H ]$^+$.

HNMR (400 MHz, DMSO-d$_6$): δ 12.70 (s, 1H), 9.86 (s, 1H), 8.12-8.07 (d, J=2.0 Hz, 1H), 7.73-7.66 (d, J=8.8 Hz, 1H), 7.46-7.42 (d, J=2.0 Hz, 1H), 7.24-7.16 (m, 2H), 7.06-7.01 (dd, J=2.0 Hz, 8.8 Hz, 1H), 4.42-4.34 (d, J=5.6 Hz, 2H).

Step 4. Compound 04038

Compound 5 (584 mg, 1.66 mmol) was dissolved in dimethyl sulfoxide (5 mL), and TCDI (295 mg, 1.66 mmol) was slowly added. The reaction system was stirred at 25° C. for 1 hour, extracted with ethyl acetate, washed with saturated sodium chloride solution, and dried over anhydrous sodium sulfate. The mixture was concentrated under reduced pressure, and the residue was purified by preparative liquid chromatography to obtain compound 04038 (white solid, 299.3 mg, yield: 45.8%).

LCMS: [M+H]$^+$=394.97.

$^1$H NMR (400 MHz, DMSO-d$_6$): δ 13.03 (s, 1H), 8.92 (d, J=1.2 Hz, 1H), 8.13-8.22 (m, 2H), 7.78 (d, J=2.4 Hz, 1H), 7.44 (d, J=2.4 Hz, 1H), 5.04 (s, 2H).

Example 30 Preparation of Compound 04039

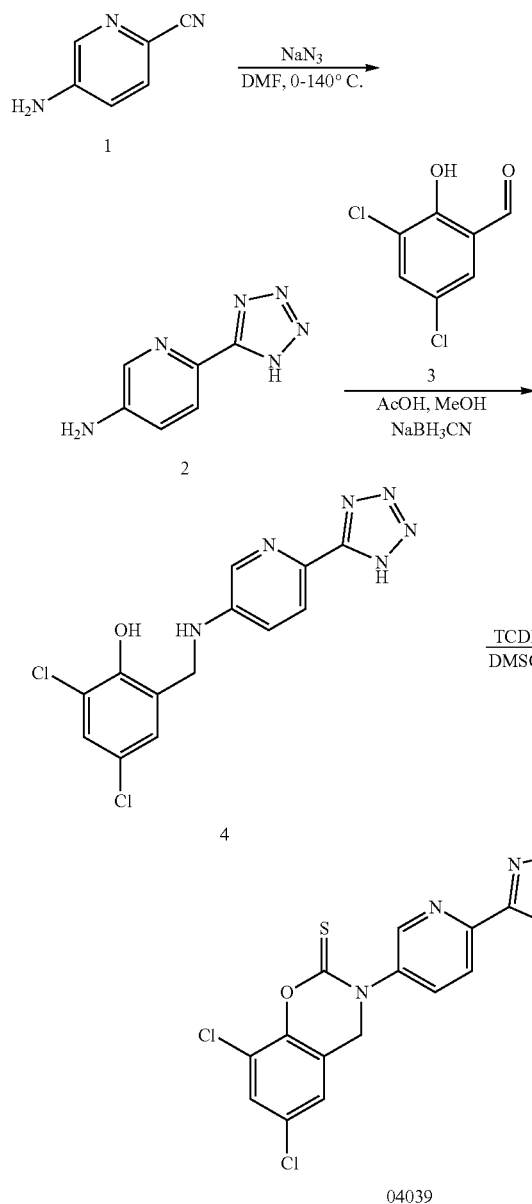

concentrated under reduced pressure to obtain yellow solid compound 2 (0.30 g, yield: 22.0%).

MS (ESI): Calcd. For C$_6$H$_6$N$_6$ 162; Found 163 [M+H]$^+$.

Step 2. Compound 4

Glacial acetic acid (4 drops) was added to a solution of compound 2 (100 mg, 0.62 mmol) and compound 3 (120 mg, 0.63 mmol) in methanol (10 mL), stirred at 25° C. for 2 hours under nitrogen protection, and sodium cyanoborohydride (101 mg, 1.57 mmol) was added, and the reaction was continued to stir for 1 hour, and concentrated under reduced pressure. The residue was purified by preparative chromatography to obtain white compound 4 (27.66 mg, yield: 13.3%).

MS (ESI): Calcd. for C$_{13}$H$_{10}$Cl$_2$N$_6$O 336; Found 337 [M+H]$^+$.

HNMR (400 MHz, CD$_3$OD): δ 8.12 (s, 1H), 7.94-7.88 (d, J=8.4 Hz, 1H), 7.28-7.25 (d, J=2.0 Hz, 1H), 7.19-7.16 (d, J=2.0 Hz, 1H), 7.09-7.04 (dd, J=2.0 Hz, 8.4 Hz, 1H), 4.45 (s, 2H).

Step 3. Compound 04039

Compound 4 (168 mg, 0.5 mmol) was dissolved in dimethyl sulfoxide (2 mL), TCDI (178 mg, 1.0 mmol) was added, and the reaction solution was stirred at 25° C. for 1 hour. The mixture was concentrated under reduced pressure, and the residue was purified by preparative liquid chromatography to obtain compound 04039 (white solid, 1.2 mg, yield 0.6%).

LCMS: [M+H]$^+$=379.1

$^1$H NMR (400 MHz, DMSO-d$_6$): δ 9.87 (s, 1H), 8.74 (s, 1H), 8.25 (d, J=7.6 Hz, 1H), 8.05 (s, 1H), 7.42 (s, 1H), 7.18 (s, 1H), 4.94 (s, 2H).

Example 31 Preparation of Compound 04040

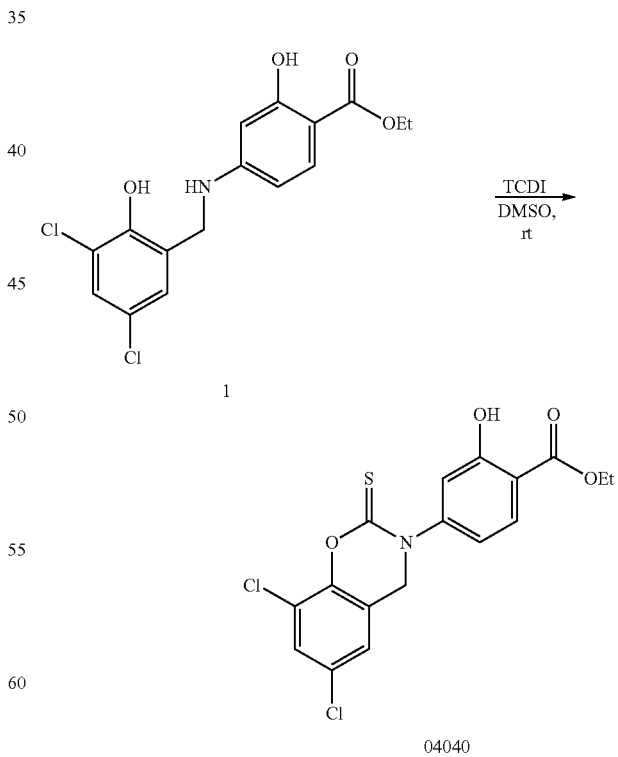

Step 1. Compound 2

Under ice bath conditions, sodium azide (4.4 g, 67.7 mmol) was added to a solution of compound 1 (1.0 g, 8.4 mmol) in dimethylformamide (15 mL) in batches, and the reaction system was heated to 140° C. and reacted for 40 hours. The reaction was cooled to 25° C., filtered, the pH value of the filtrate was adjusted to about 6 with saturated sodium bicarbonate aqueous solution, extracted with ethyl acetate, dried over anhydrous sodium sulfate, filtered, and Step 1. Compound 04040

Compound 1 (176 mg, 0.5 mmol) was dissolved in dimethyl sulfoxide (2 mL), TCDI (106 mg, 0.59 mmol) was added, and stirred at 25° C. for 3 hours. The reaction solution was poured into water (50 mL), extracted with ethyl acetate (3×10 mL), the organic phase was dried over anhydrous sodium sulfate, concentrated under reduced pressure, and the residue was purified by preparative liquid chromatography to obtain compound 04040 (white solid, 76.9 mg, yield: 39.1%).

LCMS: [M+H]$^+$=398.0

$^1$H NMR (400 MHz, CDCl$_3$) δ 11.05 (br, 1H), 7.98 (d, J=8.0 Hz, 1H), 7.44 (s, 1H), 7.03 (s, 1H), 6.98 (s, 1H), 6.95 (d, J=12.0 Hz, 1H), 4.77 (s, 2H) 4.44 (q, J=8.0 Hz, 2H), 1.43 (t, J=4.0 Hz, 3H).

Example 32 Preparation of Compound 04042

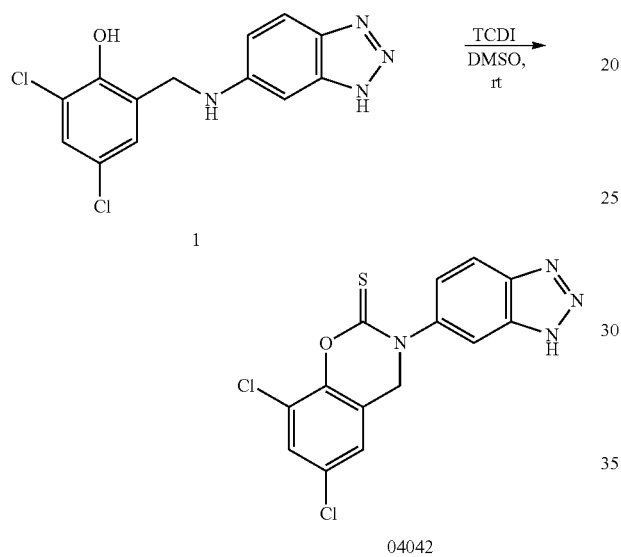

Step 1. Compound 04042

Compound 1 (200 mg, 0.65 mmol) was dissolved in dimethyl sulfoxide (2 mL), TCDI (139 mg, 0.78 mmol) was added, and stirred at 25° C. for 1 hour. The reaction solution was poured into water (100 mL), extracted with ethyl acetate (3×50 mL), the organic phase was dried over anhydrous sodium sulfate, concentrated under reduced pressure, and the residue was purified by silica gel column chromatography (developing agent: ethyl acetate/petroleum ether=3/1) to obtain compound 04042 (white solid, 24.5 mg, yield 12%).

LCMS: [M+H]$^+$=351.0.

$^1$H NMR (400 MHz, CDCl$_3$) δ 7.97 (d, J=8.4 Hz, 1H), 7.94 (s, 1H), 7.51 (d, J=8.8 Hz, 1H), 7.46 (d, J=2.0 Hz, 1H), 7.05 (s, 1H), 4.89 (s, 2H).

Example 33 Preparation of Compound 04041

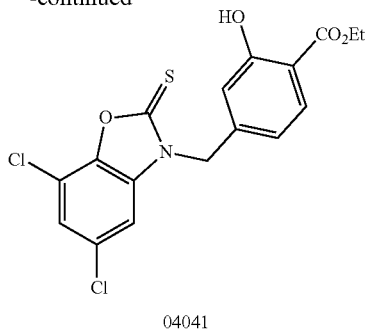

04041

Step 1. Compound 2

Compound 1 (7.6 g, 50 mmol) was dissolved in N,N-dimethylformamide (100 mL) and methyl iodide (21.3 g, 150 mmol) was added. After the reaction system was cooled to 0° C., sodium hydride (60%, 6 g, 150 mmol) was slowly added in batches, stirred for 1 hour, and water (20 mL) was added to quench the reaction. The solution obtained above was extracted with ethyl acetate (3×200 mL), the organic phase was washed successively with water (2×200 mL) and saturated sodium chloride solution (200 mL), dried over anhydrous sodium sulfate, and compound 2 (yellow oily liquid, 9.0 g, yield: 99%) was obtained after concentration under reduced pressure.

LCMS: $[M+H]^+=181.2$

Step 2. Compound 3

Compound 2 (9.0 g, 50 mmol) was dissolved in carbon tetrachloride (100 mL), NBS (26.7 g, 150 mmol) and AIBN (1.64 g, 10 mmol) were added. The reaction system was heated to 80° C. and stirred for 16 hours, and the reaction solution was directly used for the next reaction.

LCMS: $[M+H]^+=339.0$.

Step 3. Compound 4

$AgNO_3$ (25.5 g, 150 mmol) and water (10 mL) were added to the reaction solution obtained in step 2, and stirred at 25° C. for 1 hour. The reaction solution was filtered, the filtrate was diluted with water (300 mL) and then extracted with ethyl acetate (3×200 mL). The organic phase was washed with water (2×200 mL) and saturated sodium chloride solution (200 mL) in turn, then dried over anhydrous sodium sulfate, concentrated under reduced pressure, and the residue was purified by silica gel column chromatography (developing agent: petroleum ether/dichloromethane=1/100) to obtain compound 4 (red oily liquid, 6.0 g, yield: 62%).

LCMS: $[M+H]^+=195.1$.

Step 4. Compound 6

Compound 4 (5.82 g, 30 mmol) was dissolved in DCE (100 mL), compound 5 (5.31 g, 30 mmol), $NaBH(OAc)_3$ (15.9 g, 75 mmol) and acetic acid (10 mL) were added, and stirred at 25° C. for 3 hours. The reaction solution was filtered and concentrated to obtain compound 6 (gray solid, 5.5 g, yield: 52%).

LCMS: $[M+H]^+=356.1$.

Step 5. Compound 7

Compound 6 (1.07 g, 3.0 mmol) was dissolved in dichloromethane (10 mL), $BBr_3$ (3.76 g, 15.0 mmol) was added, and the reaction solution was stirred at 25° C. for 2 hours. The reaction solution was concentrated and purified by silica gel column chromatography (developing agent: dichloromethane/methanol=4/1) to obtain compound 7 (brown solid, 500 mg, yield: 51%).

LCMS: $[+H]^+=328.0$.

Step 6. Compound 8

Compound 7 (164 mg, 0.5 mmol) was dissolved in ethanol (3 mL), thionyl chloride (590 mg, 5.0 mmol) was added, and the reaction solution was stirred at 70° C. for 16 hours. The mixture was concentrated under reduced pressure, and the residue was purified by silica gel column chromatography (developing agent: petroleum ether/ethyl acetate=5/1) to obtain compound 8 (yellow solid, 70 mg, yield: 40%).

LCMS: $[M+H]^+=356.1$.

Step 7. Compound 04041

Compound 8 (71.0 mg, 0.2 mmol) was dissolved in dimethyl sulfoxide (2 mL), TCDI (71.2 mg, 0.4 mmol) was added, and stirred at 25° C. for 1 hour. The reaction solution was diluted with water (50 mL) and then extracted with ethyl acetate (3×50 mL), the organic phase was washed with saturated sodium chloride solution (100 mL), dried over anhydrous sodium sulfate, concentrated under reduced pressure, and the residue was purified by silica gel column chromatography (developing agent: petroleum ether/ethyl acetate=5/1) to obtain compound 04041 (white-like solid, 10.2 mg, yield: 13%).

LCMS: $[M-H]^+=397.9$.

$^1$H NMR (400 MHz, DMSO-$d_6$): δ 10.57 (s, 1H), 7.75 (d, J=8.1 Hz, 1H), 7.64 (s, 2H), 6.98 (s, 1H), 6.94 (d, J=8.2 Hz, 1H), 5.44 (s, 2H), 4.34 (q, J=7.1 Hz, 2H), 1.31 (t, J=7.1 Hz, 3H).

Example 34 Preparation of Compound 04075

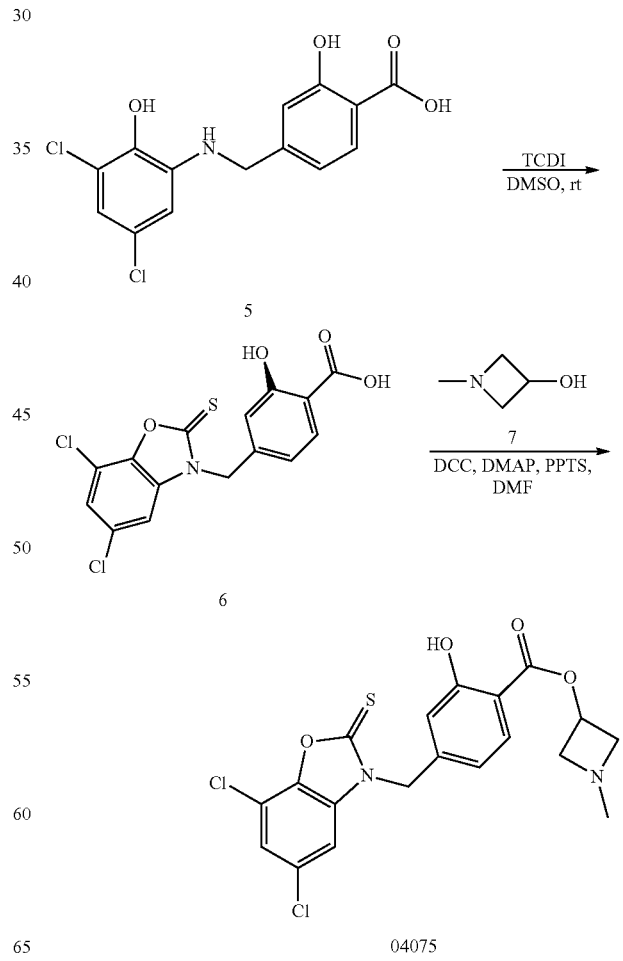

04075

Step 1. Compound 6

Compound 5 (6 g, 18.4 mmol, 1.0 eq) was dissolved in dimethyl sulfoxide (60 mL), then TCDI (6.6 g, 36.8 mmol, 2.0 eq) was added, stirred at 25° C. for 1 hour. The reaction solution was diluted with ethyl acetate and washed with water and saturated sodium chloride solution in turn. The combined organic phase was dried over anhydrous sodium sulfate, concentrated under reduced pressure, and the residue was purified by column chromatography (dichloromethane/methanol=4/1) to obtain compound 6 (1.22, 17%) as a brown solid.

LCMS: [M−H]⁻=368.0

Step 2. Compound 04075

Compound 6 (300 mg, 0.81 mmol, 1.0 eq) was dissolved in dimethylformamide (6 mL), and then compound 7 (503 mg, 4.1 mmol, 5.0 eq), DCC (252 mg, 1.2 mmol, 1.5 eq), DMAP (300 mg, 2.4 mmol, 3.0 eq) and PPTS (600 mg, 2.4 mmol, 3.0 eq) were added. The reaction solution was stirred at 50° C., for 4 hours, cooled to 25° C., and then diluted with ethyl acetate and stirred for 0.5 h. The reaction solution was filtered, the filtrate was washed with water, washed with saturated sodium chloride solution, dried over anhydrous sodium sulfate, concentrated under reduced pressure, and the residue was purified by column chromatography (dichloromethane/methanol=5/1) to obtain compound 04075 (15 mg, 4%) as a white solid.

LCMS: [M−H]⁻=437.0

$^1$H NMR (400 MHz, DMSO-d$_6$) δ 7.77 (d, J=8.0 Hz, 1H), 7.62 (s, 2H), 6.95-6.93 (m, 2H), 5.43 (s, 2H), 5.15-5.08 (m, 1H), 3.71-3.63 (m, 2H), 3.17-3.10 (m, 2H), 2.29 (s, 3H).

Example 35 Preparation of Compound 04077

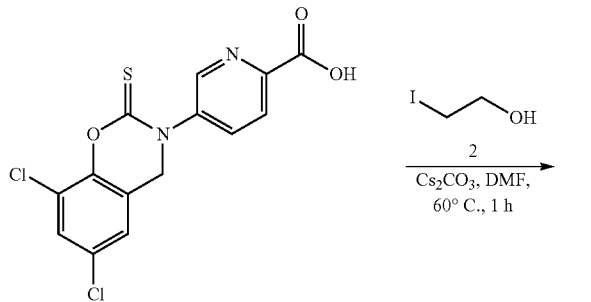

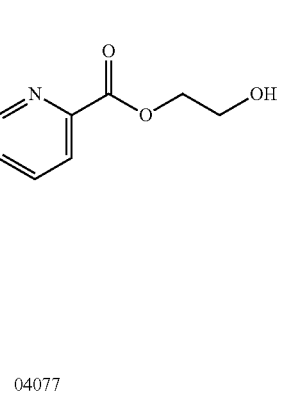

Step 1. Compound 04077

Compound 04015 (120 mg, 0.337 mmol, 1.0 eq) was dissolved in dimethylformamide (9 mL), then compound 2 (87 mg, 0.507 mmol, 1.5 eq) and cesium carbonate (220 mg, 0.675 mmol, 2.0 eq) were added, and stirred at 60° C. for 1 hour. After cooling to 25° C., the reaction solution was diluted with ethyl acetate (30 mL), then washed with water and saturated sodium chloride solution in turn, the organic phase was dried over anhydrous sodium sulfate, concentrated under reduced pressure, and the residue was purified by prep-HPLC (0.1% formic acid/acetonitrile/water) to obtain compound 04077 (30.5 mg, 22%) as a white solid.

LCMS: [M+H]⁺=398.9

$^1$H NMR (400 MHz, DMSO-d$_6$) δ 8.86-8.85 (m, 1H), 8.22 (dd, J=8.4, 0.8 Hz, 1H), 8.15 (dd, J=8.4, 2.4 Hz, 1H), 7.75 (d, J=2.4 Hz, 1H), 7.41 (d, J=2.4 Hz, 1H), 4.99 (s, 2H), 4.93 (t, J=5.6 Hz, 1H), 4.32 (t, J=4.8 Hz, 2H), 3.71-3.69 (m, 2H).

Example 36 Preparation of Compound 04089

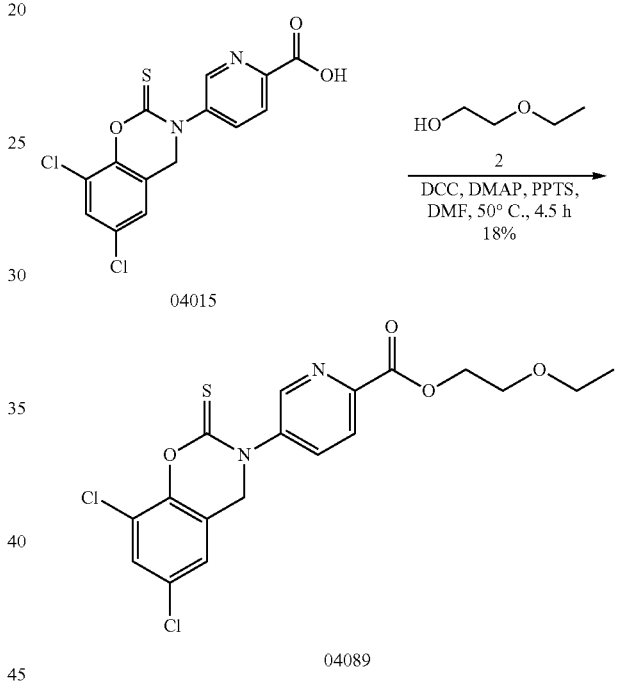

Step 1. Compound 04089

Compound 04015 (1.5 g, 4.22 mmol, 1.0 eq) was dissolved in dimethylformamide (dimethylformamide, 90 mL), and then DCC (1.3 g, 6.33 mmol, 1.5 eq), DMAP (1.55 g, 12.67 mmol, 3.0 eq), PPTS (3.18 g, 12.67 mmol, 3.0 eq) and compound 2 (1.91 g, 21.11 mmol, 5.0 eq) were sequentially added, heated to 50° C. and stirred for 4.5 hours. The reaction solution was cooled to 25° C., and ethyl acetate (60 mL) was added, and stirred for 0.5 h. The reaction solution was filtered, the filtrate was washed with water and saturated sodium chloride solution in turn, the organic phase was dried over anhydrous sodium sulfate, concentrated under reduced pressure, and the residue was purified by silica gel column chromatography (PE/EA=2:1) to obtain compound 04078 (333 mg, 18%).

LCMS: [M+H]⁺=427.0

$^1$H NMR (400 MHz, DMSO-d$_6$) δ 8.88 (dd, J=2.4, 0.8 Hz, 1H), 8.22-8.18 (m, 2H), 7.77 (d, J=2.4 Hz, 1H), 7.43 (d, J=2.4 Hz, 1H), 5.01 (s, 2H), 4.47-4.38 (m, 2H), 3.74-3.67 (m, 2H), 3.50 (q, J=6.8 Hz, 2H), 1.11 (t, J=7.2 Hz, 3H).

Example 37 Preparation of Compound 04081

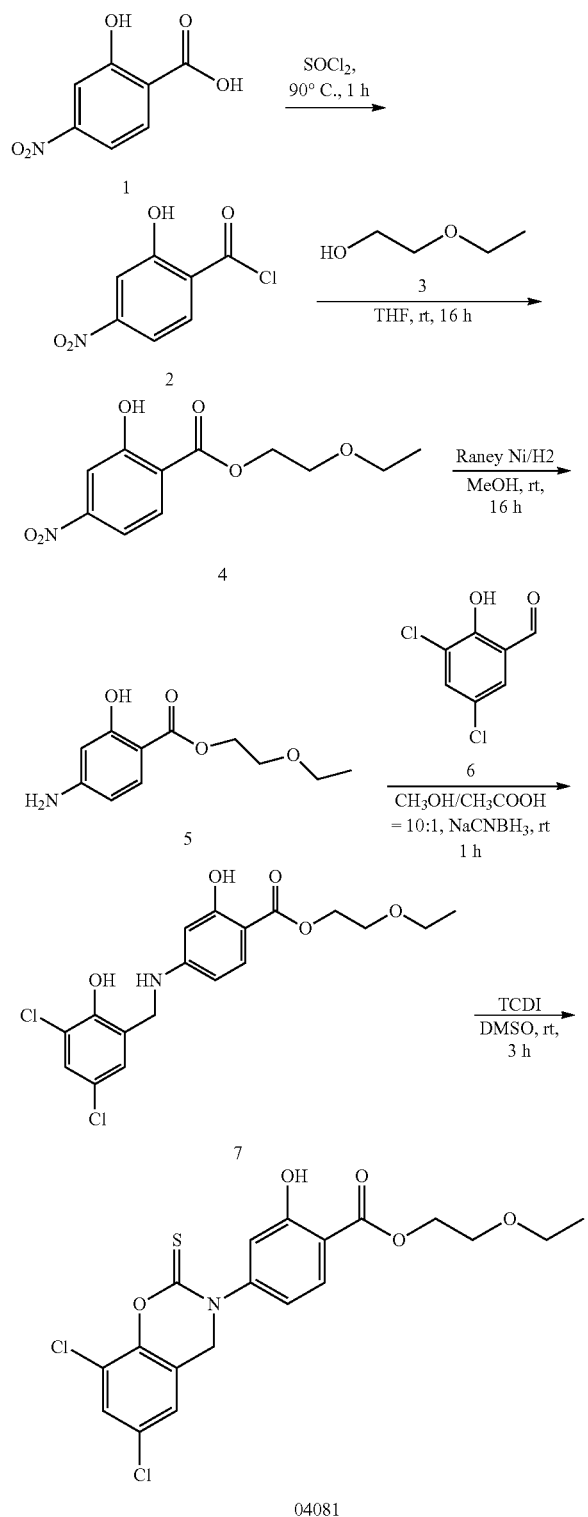

Step 1. Compound 2

Compound 1 (8.0 g, 43.7 mmol, 1.0 eq) was added to thionyl chloride (30 mL), and the temperature was raised to 90° C., and stirred for 1 hour. The reaction solution was cooled to 25° C. and concentrated under reduced pressure to obtain compound 2 (10 g, 100%), which was directly used for the next reaction without purification.

Step 2. Compound 4

Compound 2 (10 g, 43.7 mmol, 1.0 eq) was dissolved in tetrahydrofuran (60 mL), compound 3 (20 mL) was added, and stirred at 25° C. for 16 hours. The reaction solution was concentrated under reduced pressure, and the residue was purified by silica gel column chromatography (petroleum ether/ethyl acetate=4/1) to obtain compound 4 (12.5 g, 100%).

LCMS: [M−H]⁻=254.0

Step 3. Compound 5

Compound 4 (12 g, 43.7 mmol, 1.0 eq) was dissolved in methanol (150 mL), Raney nickel (1.0 g) was added, and the reaction was stirred at 25° C. for 16 hours under 1 atmosphere of hydrogen. The reaction solution was filtered, the filtrate was concentrated under reduced pressure, and the residue was purified by silica gel column chromatography (petroleum ether/ethyl acetate=2/1) to obtain compound 4 (8.0 g, 81%).

LCMS: [M+H]⁺=226.1

Step 4. Compound 7

Compound 5 (7.5 g, 33.3 mmol, 1.0 eq) was dissolved in a mixed solvent of methanol/acetic acid (10:1, 400 mL), and compound 6 (7.5 g, 39.3 mmol, 1.18 eq) was added. The reaction solution was stirred at 25° C. for 30 minutes, and sodium cyanoborohydride (8.37 g, 133.2 mmol, 4.0 eq) was added, and continued to stir for 0.5 h. The reaction solution was concentrated, ethyl acetate (800 mL) and water (100 mL) were added to the residue, and the pH value was adjusted to 7-8 with saturated sodium bicarbonate aqueous solution. The organic phase was dried over anhydrous sodium sulfate, concentrated under reduced pressure, and the residue was purified by silica gel column chromatography (petroleum ether/ethyl acetate=1/1) to obtain compound 7 (12 g, 90%) as a brown oil.

LCMS: [M+H]⁺=400.1

Step 5. Compound 04081

Compound 7 (4 g, 10.0 mmol, 1.0 eq) was dissolved in dimethyl sulfoxide (40 mL), TCDI (1.87 g, 10.49 mmol, 1.05 eq) was added, and stirred at 25° C. for 2 hours. The reaction solution was diluted with ethyl acetate (500 mL) and washed with saturated sodium chloride solution for three times. The organic phase was dried over anhydrous sodium sulfate, concentrated under reduced pressure, and the residue was purified by silica gel column chromatography (petroleum ether/ethyl acetate=20/1) to obtain compound 04081 (815.6 mg, 18.4%).

LCMS: [M+H]⁺=441.9

$^1$H NMR (400 MHz, CDCl$_3$) δ 10.90 (s, 1H), 8.01 (d, J=8.8 Hz, 1H), 7.44 (d, J=2.4 Hz, 1H), 7.04-7.01 (m, 1H), 6.98 (d, J=2.0 Hz, 1H), 6.96-6.93 (m, 1H), 4.76 (s, 2H), 4.53-4.51 (m, 2H), 3.78-3.76 (m, 2H), 3.58 (q, J=6.8 Hz, 2H), 1.23 (t, J=6.8 Hz, 3H).

Example 38 Preparation of Compound 04080

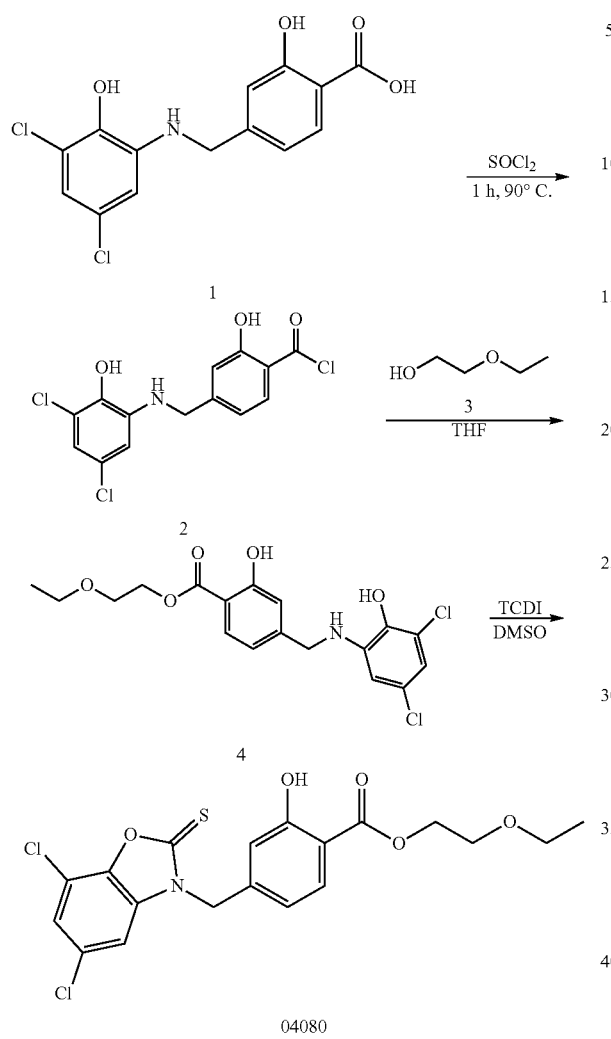

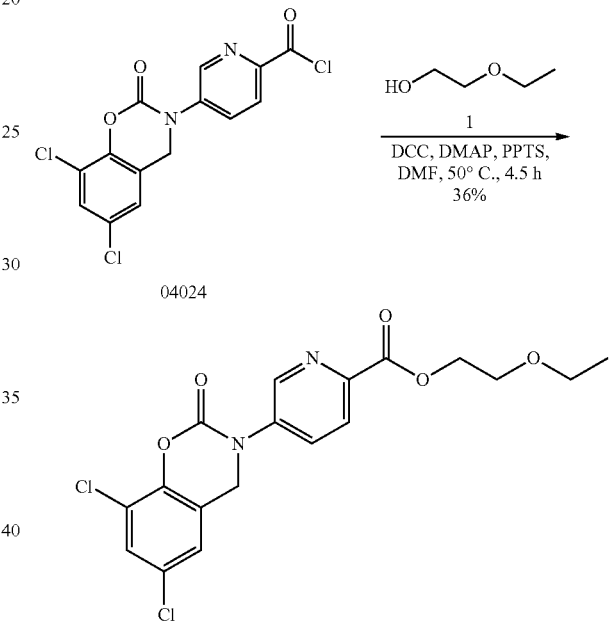

Step 1. Compound 2

Compound 1 (8.5 g, 26.0 mmol, 1.0 eq) was added to thionyl chloride (20 mL), heated to 90° C. and stirred for 1 h at 90° C. The reaction solution was cooled to 25° C., and concentrated under reduced pressure to give compound 2 (10 g, 100%) as a brown oily substance, which was directly used for the next reaction without purification.

Step 2. Compound 4

Compound 2 (10 g, 26.0 mmol, 1.0 eq) was dissolved in tetrahydrofuran (60 mL), compound 3 (20 mL) was added, and stirred at 25° C. for 16 h. The reaction solution was concentrated, diluted with ethyl acetate (500 mL), then the pH value was adjusted to 7-8 with sodium carbonate aqueous solution, and the aqueous phase was extracted with ethyl acetate. The combined organic phase was dried over anhydrous sodium sulfate, concentrated under reduced pressure, and the residue was purified by silica gel column chromatography (petroleum ether/ethyl acetate=4/1) to obtain compound 4 (4 g, 38%) as a brown solid.

LCMS: [M+H]$^+$=400.0

Step 3. Compound 04080

Compound 4 (4 g, 10.0 mmol, 1.0 eq) was dissolved in dimethyl sulfoxide (25 mL), TCDI (2.1 g, 12.0 mmol, 1.2 eq) was added, and stirred at 25° C. for 1 hour. Ethyl acetate (100 mL) and saturated sodium carbonate aqueous solution (100 mL) were added, and the mixture was continued to stir for 1 hour. The solution was separated, the organic phase was washed for three times with saturated sodium chloride solution, and then dried over anhydrous sodium sulfate. The mixture was concentrated under reduced pressure, and the residue was purified by silica gel column chromatography (petroleum ether/ethyl acetate=20/1) to obtain compound 04080 (1.0734 g, 24%)

LCMS: [M−H]$^−$=440.0

$^1$H NMR (400 MHz, DMSO-d$_6$) δ 10.48 (s, 1H), 7.75 (d, J=8.0 Hz, 1H), 7.66-7.61 (m, 2H), 6.99 (s, 1H), 6.95 (d, J=8.0 Hz, 1H), 5.44 (s, 2H), 4.44-4.37 (m, 2H), 3.69-3.67 (m, 2H), 3.48 (q, J=6.8 Hz, 2H), 1.10 (t, J=6.8 Hz, 3H).

Example 39 Preparation of Compound 04096

Step 1. Compound 04096

Compound 04024 (1.1 g, 3.2 mmol, 1.0 eq) was dissolved in dimethylformamide (20 mL), DMAP (1.19 g, 9.73 mmol, 3.0 eq), DCC (1.0 g, 4.87 mmol, 1.5 eq), PPTS (5.01 g, 9.73 mmol, 3.0 eq) and compound 1 (1.46 g, 16.22 mmol, 5.0 eq) were added, heated to 50° C. and stirred for 4.5 hours. The reaction solution was cooled to 25° C., ethyl acetate (80 mL) was added to the reaction solution, stirred for 0.5 h, filtered, the filtrate was washed with water (3×20 mL), washed with saturated sodium chloride solution (20 mL), the organic phase was dried over anhydrous sodium sulfate, concentrated under reduced pressure, and the residue was purified by silica gel column chromatography (petroleum ether/ethyl acetate=1/1) to obtain 04096 (485.8 mg, 36%) as a white solid.

LCMS: [M+H]$^+$=411.0

$^1$HNMR (400 MHz, DMSO-d$_6$) δ 8.85 (d, J=2.0 Hz, 1H), 8.16-8.14 (m, 1H), 8.10-8.07 (m, 1H), 7.72 (d, J=2.4 Hz, 1H), 7.43 (d, J=2.4 Hz, 1H), 5.04 (s, 2H), 4.43-4.41 (m, 2H), 3.71-3.68 (m, 2H), 3.49 (q, J=6.8 Hz, 2H), 1.10 (t, J=6.8 Hz, 3H).

Example 40 Preparation of Compound 04097

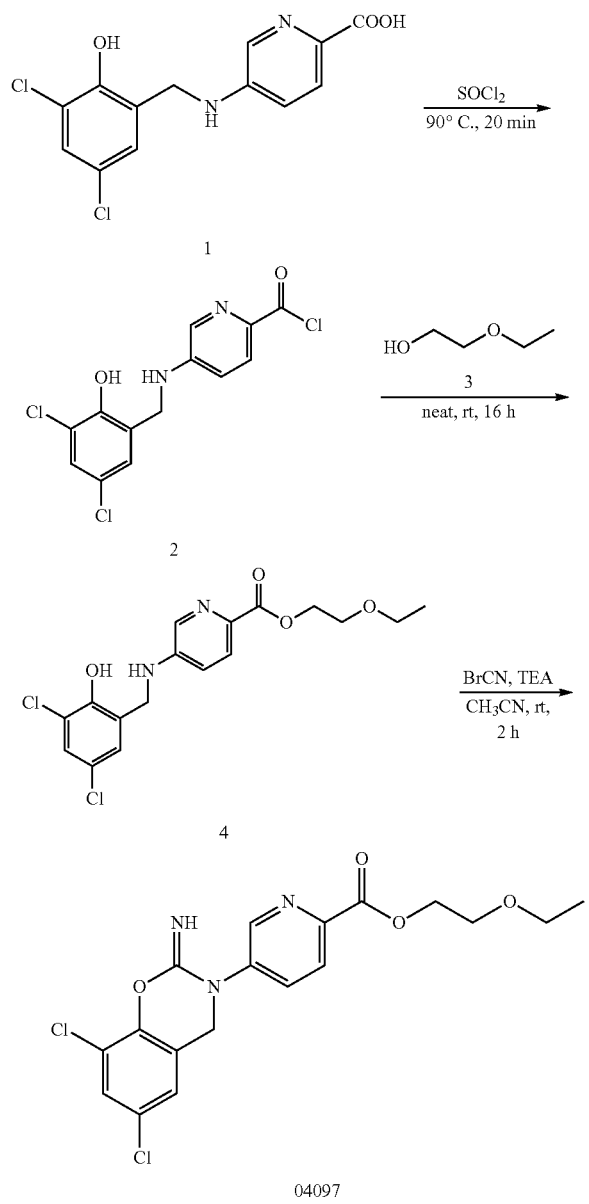

Step 1. Compound 2

Compound 1 (6.0 g, 19.16 mmol, 1.0 eq) was added to thionyl chloride (20 mL), heated to 90° C. and stirred for 20 minutes, and the reaction solution became a yellow clear solution. The reaction solution was cooled to 25° C., concentrated under reduced pressure, and the obtained crude compound 2 (10 g) was a brown oil, which was directly used for the next reaction without purification.

Step 2. Compound 4

Crude compound 2 (10 g) was dissolved in tetrahydrofuran (10 mL), compound 3 (10 mL) was added, and stirred at 25° C. for 16 hours. The reaction solution was concentrated, the residue was dissolved with ethyl acetate (500 mL), and then the pH value was adjusted to 7-8 with sodium carbonate aqueous solution. The aqueous phase obtained after liquid separation was extracted with ethyl acetate, the combined organic phase was dried over anhydrous sodium sulfate, concentrated under reduced pressure, and the residue was purified by silica gel column chromatography (petroleum ether/ethyl acetate=4/1) to obtain compound 4 (1.6 g, two-step yield: 21%) as a white solid.

LCMS: [M+H]$^+$=385.0

Step 3. Compound 04097

Compound 4 (1.6 g, 4.15 mmol, 1.0 eq) was dissolved in acetonitrile (40 mL), cyanogen bromide (660 mg, 6.23 mmol, 1.5 eq) and triethylamine (630 mg, 6.23 mmol, 1.5 eq) were added, and stirred at 25° C. for 2 hours. The reaction solution was diluted with ethyl acetate (300 mL), washed with saturated sodium chloride solution, the organic phase was dried over anhydrous sodium sulfate, concentrated under reduced pressure, and the residue was purified by pre-HPLC (0.1% formic acid/acetonitrile/water) to obtain compound 04097 (51 mg, 4%) as a white solid.

LCMS: [M+H]$^+$=410.0

$^1$H NMR (400 MHz, DMSO-d$_6$) δ 8.84 (s, 1H), 8.09-8.02 (m, 2H), 7.70 (s, 1H), 7.45-7.39 (m, 1H), 7.18 (s, 1H), 4.91 (s, 2H), 4.44-4.38 (m, 2H), 3.72-3.66 (m, 2H), 3.52-3.47 (m, 2H), 1.15-1.09 (m, 3H).

Example 41 Preparation of Compound 04102

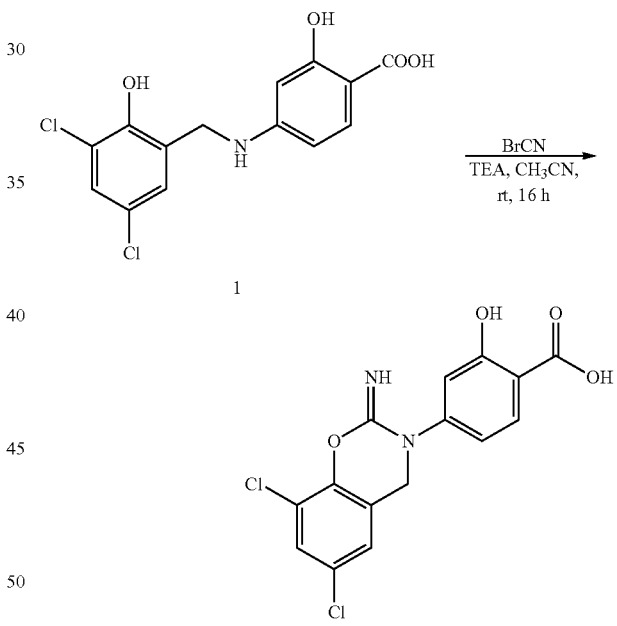

Step 1. Compound 04102

Compound 1 (300 mg, 0.914 mmol, 1.0 eq) was dissolved in acetonitrile (35 mL), cyanogen bromide (97 mg, 0.914 mmol, 1.0 eq) was added, stirred at 25° C. for 30 minutes, then triethylamine (92 mg, 0.914 mmol, 1.0 eq) was added dropwise, and stirred overnight. The reaction solution was concentrated under reduced pressure, and the residue was purified by pre-HPLC (0.1% formic acid/acetonitrile/water) to obtain compound 04102 (10.8 mg, 3%) as a white solid.

LCMS: [M+H]$^+$=353.0

$^1$H NMR (400 MHz, DMSO-d$_6$) δ 7.83-7.81 (m, 2H), 7.47 (d, J=2.4 Hz, 1H), 6.85 (d, J=2.0 Hz, 1H), 6.75 (dd, J=8.1, 2.1 Hz, 1H), 4.86 (s, 2H).

Example 42 Preparation of Compound 04099

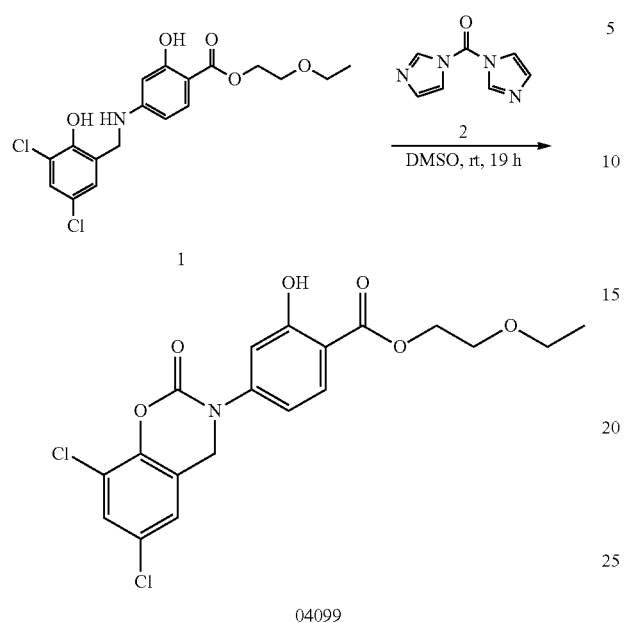

04099

Step 1. Compound 04099

Compound 1 (2.0 g, 5.0 mmol, 1.0 eq) was dissolved in dimethyl sulfoxide (10 mL), carbonyl diimidazole (1.22 g, 7.5 mmol, 1.5 eq) was added, and stirred at 25° C. for 16 hours under nitrogen protection. Carbonyl diimidazole (406 mg, 2.5 mmol, 0.5 eq) was further added, and continued to stir for 3 hours. The reaction solution was diluted with water (20 mL), and then the pH value was adjusted to 3-4 by adding dilute hydrochloric acid (2 M) aqueous solution dropwise. The reaction solution was extracted with ethyl acetate (20 mL×3), the combined organic phase was washed with saturated sodium chloride solution, dried over anhydrous sodium sulfate, concentrated under reduced pressure, and the residue was purified by silica gel column chromatography (petroleum ether/ethyl acetate=5/1) to obtain 04099 (1.31 g, 61%) as a white solid.

LCMS: [M+H]$^+$=426.0

$^1$H NMR (400 MHz, CDCl$_3$) δ 10.85 (s, 1H), 7.94 (d, J=8.4 Hz, 1H), 7.42 (d, J=2.4 Hz, 1H), 7.08-7.07 (m, 1H), 7.01-6.98 (m, 1H), 6.97-6.96 (m, 1H), 4.83 (s, 2H), 4.53-4.50 (m, 2H), 3.79-3.76 (m, 2H), 3.58 (q, J=7.2 Hz, 2H), 1.23 (t, J=7.2 Hz, 3H).

Example 43 Preparation of Compound 04100

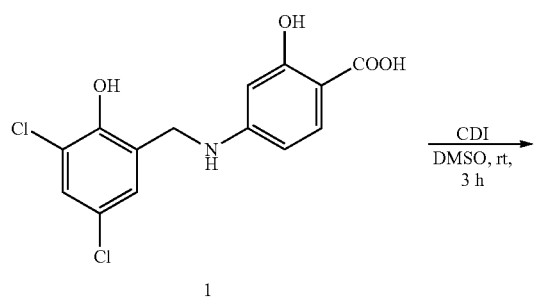

1

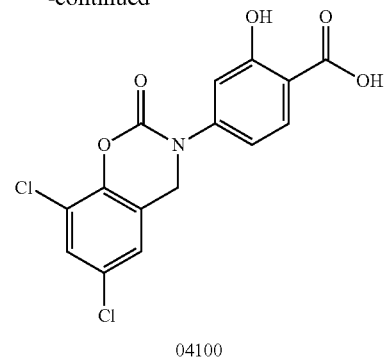

04100

Step 1. Compound 04100

Compound 1 (300 mg, 0.91 mmol, 1.0 eq) was dissolved in dimethyl sulfoxide (10 mL), CDI (220 mg, 1.36 mmol, 1.5 eq) was added, and stirred at 25° C. for 3 hours. Water (10 mL) was added to the reaction solution, the pH value was adjusted to 3-4 with dilute hydrochloric acid, and then extracted with ethyl acetate (3×10 mL). The combined organic phase was dried over anhydrous sodium sulfate, concentrated under reduced pressure, and the residue was purified by pre-HPLC (0.1% formic acid/acetonitrile/water) to obtain compound 04100 (50 mg, 16%) as a white solid.

LCMS: [M+H]$^+$=354.0

$^1$H NMR (400 MHz, DMSO-d$_6$) δ 11.48 (s, 1H), 7.84 (d, J=8.5 Hz, 1H), 7.71 (d, J=2.4 Hz, 1H), 7.44 (d, J=2.4 Hz, 1H), 7.08-7.04 (m, 2H), 4.97 (s, 2H).

Example 44 Preparation of Compound 04103

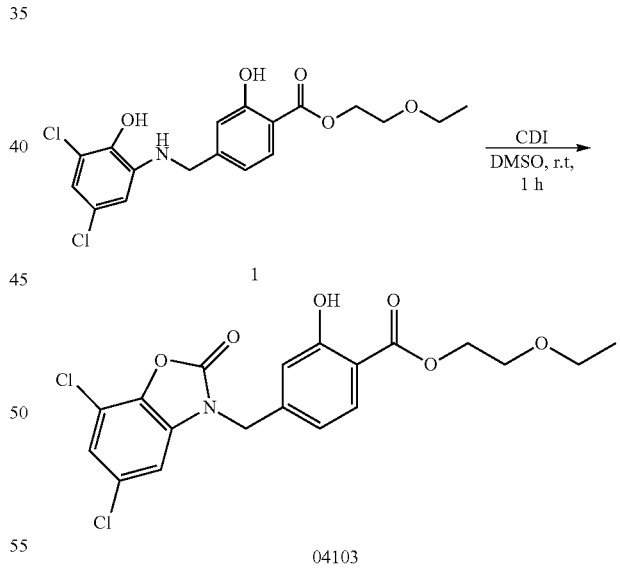

04103

Step 1. Compound 04103

Compound 1 (528 mg, 1.32 mmol, 1.0 eq) was dissolved in dimethyl sulfoxide (6 mL), CDI (257 mg, 1.58 mmol, 1.2 eq) was added, and stirred at 25° C. for 1 hour. Ethyl acetate (15 mL) and saturated sodium carbonate aqueous solution (15 mL) were added, and the reaction solution was continued to stir for 1 hour. After liquid separation, the organic phase was washed with saturated sodium chloride solution, dried over anhydrous sodium sulfate, concentrated under reduced pressure, and the residue was purified by reversed-phase column chromatography (0.1% formic acid/acetonitrile/water) to obtain compound 04103 (305.5 mg, 45%) as a white solid.

LCMS: [M+H]⁺=426.0

$^1$H NMR (400 MHz, DMSO-d$_6$) δ 10.49 (s, 1H), 7.75 (d, J=8.0 Hz, 1H), 7.44-7.43 (m, 2H), 7.02 (s, 1H), 6.97-6.95 (m, 1H), 5.07 (s, 2H), 4.42-4.01 (m, 2H), 3.70-3.69 (m, 2H), 3.49 (q, J=6.8 Hz, 2H), 1.10 (t, J=6.8 Hz, 3H).

Example 45 Preparation of Compound 04104

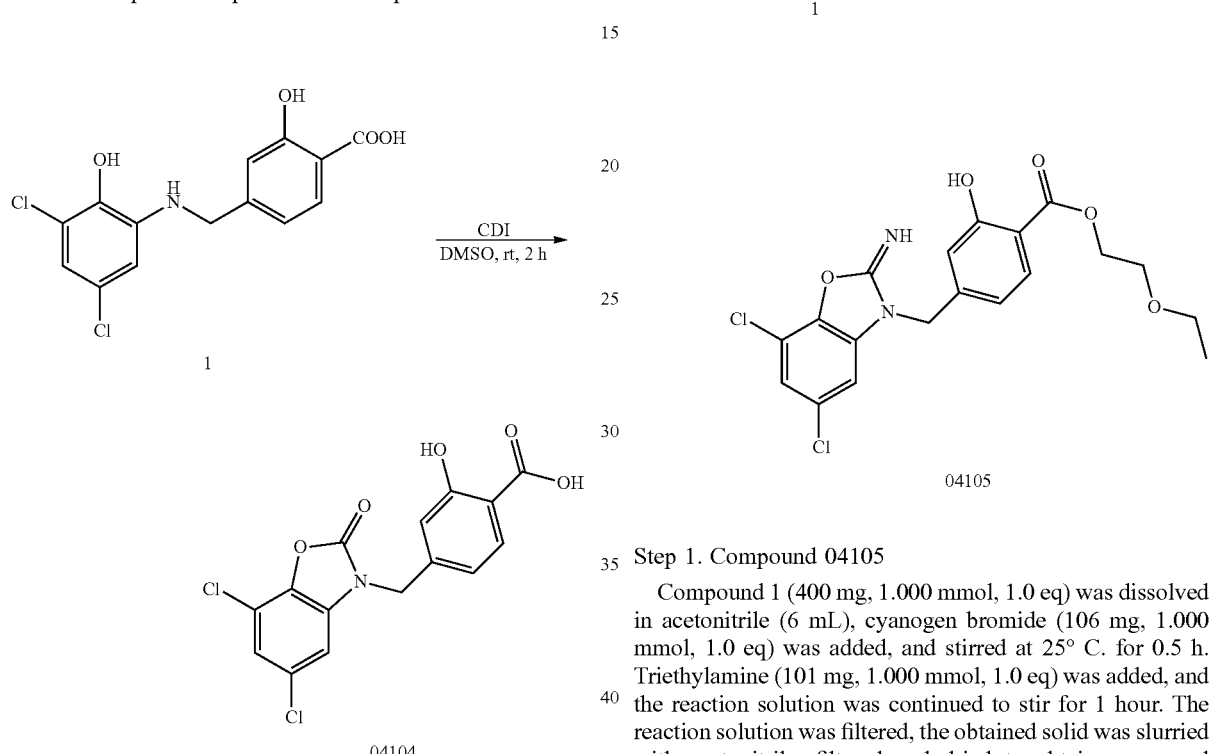

Step 1. Compound 04104

Compound 1 (500 mg, 1.6 mmol, 1.0 eq) was dissolved in dimethyl sulfoxide (15 mL), CDI (377 mg, 2.4 mmol, 1.5 eq) was added, and stirred at 25° C. for 2 hours. Water (15 mL) was added to the reaction solution, then the pH was adjusted to 3-4 with dilute hydrochloric acid, and then extracted with ethyl acetate (3×20 mL). The combined organic phase was dried over anhydrous sodium sulfate, concentrated under reduced pressure, and the residue was purified by reversed-phase column chromatography (0.1% formic acid/acetonitrile/water) to obtain compound 04104 (53 mg, 6%) as a white solid.

LCMS: [M+H]⁺=354.0

$^1$H NMR (400 MHz, DMSO-d$_6$) δ 7.74 (d, J=8.0 Hz, 1H), 7.44-7.42 (m, 2H), 6.94 (s, 1H), 6.86 (d, J=8.0 Hz, 1H), 5.03 (s, 2H).

Example 46 Preparation of Compound 04105

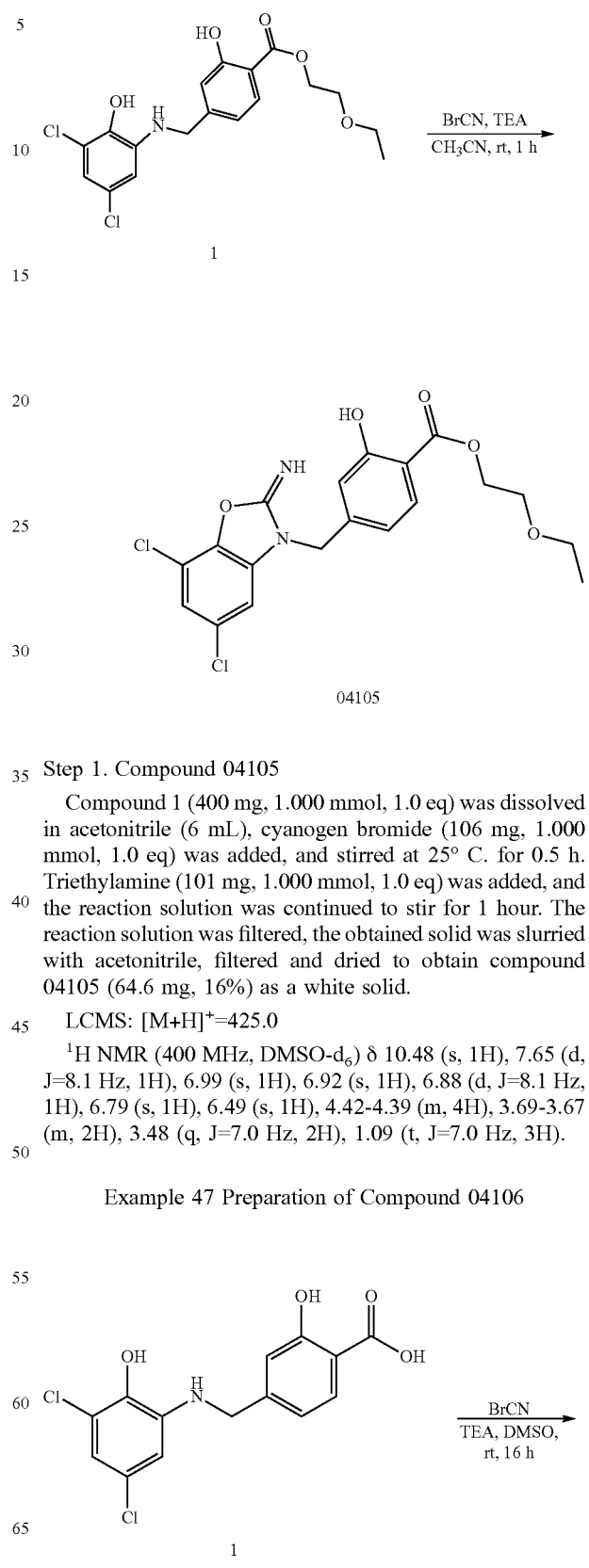

Step 1. Compound 04105

Compound 1 (400 mg, 1.000 mmol, 1.0 eq) was dissolved in acetonitrile (6 mL), cyanogen bromide (106 mg, 1.000 mmol, 1.0 eq) was added, and stirred at 25° C. for 0.5 h. Triethylamine (101 mg, 1.000 mmol, 1.0 eq) was added, and the reaction solution was continued to stir for 1 hour. The reaction solution was filtered, the obtained solid was slurried with acetonitrile, filtered and dried to obtain compound 04105 (64.6 mg, 16%) as a white solid.

LCMS: [M+H]⁺=425.0

$^1$H NMR (400 MHz, DMSO-d$_6$) δ 10.48 (s, 1H), 7.65 (d, J=8.1 Hz, 1H), 6.99 (s, 1H), 6.92 (s, 1H), 6.88 (d, J=8.1 Hz, 1H), 6.79 (s, 1H), 6.49 (s, 1H), 4.42-4.39 (m, 4H), 3.69-3.67 (m, 2H), 3.48 (q, J=7.0 Hz, 2H), 1.09 (t, J=7.0 Hz, 3H).

Example 47 Preparation of Compound 04106

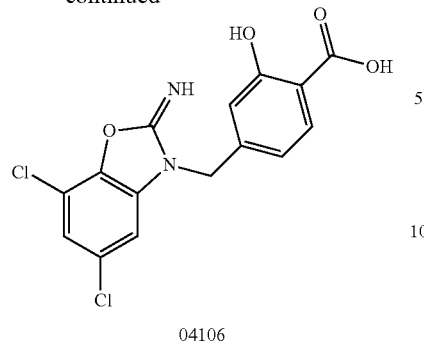

04106

Step 1. Compound 04106

Compound 1 (100 mg, 0.305 mmol, 1.0 eq) was dissolved in dimethyl sulfoxide (5 mL), cyanogen bromide (32 mg, 0.305 mmol, 1.0 eq) was added, and stirred at 25° C. for 0.5 h. Triethylamine (31 mg, 0.305 mmol, 1.0 eq) was added, and stirred overnight. The reaction solution was diluted with ethyl acetate (30 mL), then washed with water and saturated sodium chloride solution in turn. The organic phase was dried over anhydrous sodium sulfate, concentrated under reduced pressure, and the residue was purified by pre-HPLC (0.1% formic acid/acetonitrile/water) to obtain compound 04106 (15.9 mg, 15%) as a white solid.

LCMS: [M+H]$^+$=352.9

$^1$H NMR (400 MHz, DMSO-d$_6$) δ 12.00 (brs, 1H), 7.74 (d, J=8.1 Hz, 1H), 7.20 (d, J=1.9 Hz, 2H), 6.91 (s, 1H), 6.88-6.85 (m, 1H), 5.00 (s, 2H).

Example 48 Preparation of Compound 04107

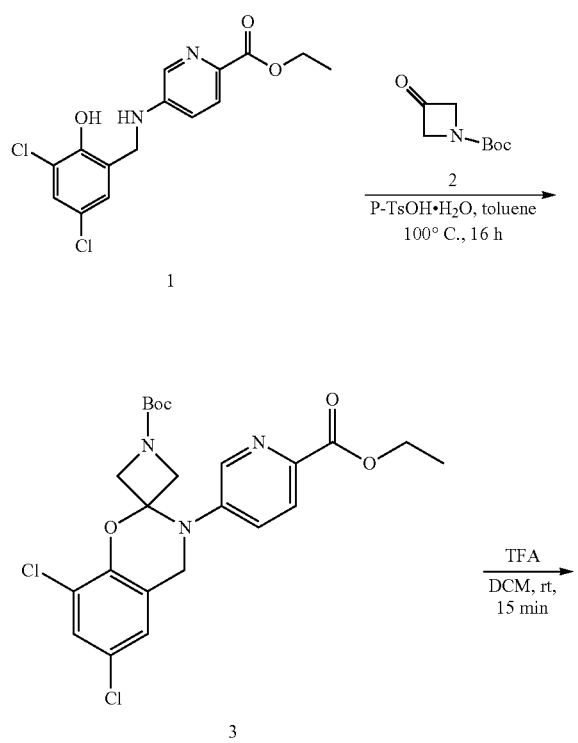

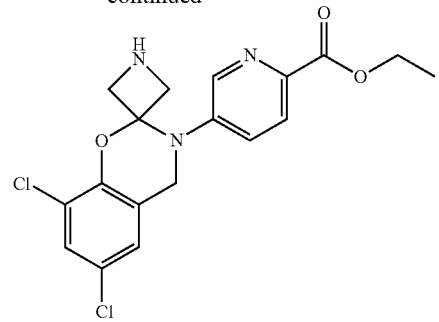

04107

Step 1. Compound 3

Compound 1 (30 mg, 0.0879 mmol, 1.0 eq) was added to toluene (3 mL), compound 2 (30 mg, 0.1758 mmol, 2.0 eq) and p-toluenesulfonic acid monohydrate (3 mg, 0.0176 mmol, 0.2 eq) were sequentially added, and the temperature was raised to 100° C., and stirred for 16 hours. The reaction solution was cooled to 25° C. and concentrated under reduced pressure to obtain compound 3 (43 mg, 99%) as a brown which was directly used for the next reaction without purification.

LCMS: [M+H]$^+$=494.1

Step 2. Compound 04107

Compound 3 (43 mg, 0.0869 mmol, 1.0 eq) was dissolved in dichloromethane (1 mL), trifluoroacetic acid (0.2 mL) was added, and the reaction solution was stirred at 25° C. for 15 minutes. The pH value of the solution was adjusted to 7 with saturated sodium bicarbonate aqueous solution, after liquid separation, extracted with dichloromethane, the combined organic phase was dried over anhydrous sodium sulfate, concentrated under reduced pressure, and the residue was purified by silica gel column chromatography to obtain compound 04107 (yield: 13%).

LCMS: [M+H]$^+$=394.0

Study on Protective Effect of Compounds on Focal Cerebral Ischemia Reperfusion in Rats 1. Materials and Methods 1.1 Experimental Animals Sprague Dawley (SD) rat, male, SPF grade, weight 250-280 g 1.2 Tested Drugs Compounds 04007, 04015, 04041, 04047, 04050 and 04089

Commercially available edaravone injection, products of Nanjing Simcere dongyuan pharmaceutical Co., Ltd, specifications 10 mg/mL 1.3 Experimental Method 1.3.1 Preparation of Focal Cerebral Ischemia-Reperfusion Model The rat focal cerebral ischemia-reperfusion model (Middle cerebral artery occlusion, MCAO) was prepared by internal carotid artery suture method. Rats were injected intraperitoneally with 7% chloral hydrate (6.0 mL/kg), and the depth of anesthesia was appropriate for severe stimulation of animals with slight reaction. The anesthetized rats were tightened with rubber bands on the limbs (the hind limbs were fixed above the knee joint, and the forelimbs were fixed above the wrist joint) and the head, and the animals were fixed on the operating table in the supine position, and the animal shaver was used from the head end to the chest to shave hair, and the skin was disinfected with alcohol. The neck was cut in the middle and the subcutaneous tissue was blunt separated. The thin layer of fascia on the surface of the anterior cervical triangle was separated, inferior border of the hypoglossus-clavicularis muscle was plucked up, and the longitudinal pulsating artery parallel to this muscle could be seen. The arterial shell was opened, the right carotid bifurcation was exposed, and the right common carotid artery, external carotid artery, internal carotid artery were separated, the vagus nerve was gently peeled off, the external carotid artery was ligated and cut off. The end of the common carotid artery proximity to the heart was clamped, and an incision was made from the distal end of the ligature line of the external carotid artery, suture was inserted and entered into the internal carotid artery through the bifurcation of the common carotid artery, and then slowly inserted until there was slight resistance (about 20 mm from the bifurcation), all blood supply of the middle cerebral artery was blocked. The suture was slightly fixed with the silk under the incision of the external carotid artery, the clamping silk at the end of the common carotid artery proximity to the heart was loosen, the wound surface was covered with gauze soaked with disinfected normal saline, and the rats were kept warm by placing on the heat preservation mat. After right cerebral ischemia for 2.0 h, the suture was gently pulled out, blood supply was restored for reperfusion, the external carotid artery was ligated with the silk fixing the suture, the skin was sutured, and disinfected.

1.3.2 Animal Grouping and Administration

The experimental animals were divided into model group, edaravone group (6 mg/kg) and compound to be tested group (5 mg/kg ration of compound to be tested: 5% DMAC+5% Solutol HS 15+90% Saline were used to prepare a solution with a concentration of 1 mg/mL.

After the ischemia model was prepared, the animals were assigned to each group in a single blind with equal probability. The animals were administered intravenously once immediately after reperfusion, and the animals in the model group were given the same volume of normal saline. The animals were sacrificed 24 hours after ischemia, the brain was taken, stained and photographed to determine the area of cerebral infarction.

1.3.3 Measurement of Cerebral Infarction Area

The degree of cerebral infarction was determined by TTC, staining. After the evaluation of the symptoms of neurological defects in animals was completed, the animals were killed with $CO_2$, the brain was taken by decapitation, the olfactory bulb, cerebellum and low brainstem were removed, blood stains on the surface of the brain were washed with normal saline, residual water stains on the surface were sucked out, and placed at −20° C. for 20 min. Immediately after taking out, the coronal section was made vertically downward at the intersection plane of the line of sight, and cut a slice every 2 mm backwards, the brain slices were incubated in 1% TTC dye solution (37° C. for 20 min). The normal brain tissue was dyed crimson, while the ischemic brain tissue was pale. After washing with normal saline, the brain slices were quickly arranged in a row from front to back, the residual water on the surface was sucked to dry, and the photos were taken.

Calculation of cerebral infarction area: The photos were processed by Image J software, the corresponding area of the left brain and the area of the non-infarcted focus of the right brain were calculated, and the percentage of infarct area was obtained.

2. Experimental Result 2.1 Statistical Analysis

Quantitative data are expressed as mean±standard errors, each efficacy index uses GraphPad Prism (6.01) software for one-way ANOVA, and Fisher's LSD test is used to test the difference between groups after the variance test is significant. $P<0.05$ is defined as having a significant difference.

2.2 Effects of Compounds to be Tested on Acute Cerebral Ischemia Reperfusion Injury in Rats The degree of nerve defect symptoms and the area of cerebral infarction in each group of animals are shown in Table 1.

TABLE 1

| Compound | Cerebral infarction area in rats (%) | Cerebral infarction area of rats in model group in the same test(%) | Cerebral infarction area of rats in edaravone group in the same test(%) | Compared with the model group, the reduced proportion of cerebral infarction area in the compound group |
|---|---|---|---|---|
| 04007 | 35.41 ± 3.71 | 48.03 ± 3.56 | 32.08 ± 4.26 | 26% |
| 04041 | 30.37 ± 4.36 | | | 37% |
| 04015 | 24.90 ± 6.47 | 39.38 ± 3.95 | 27.44 ± 3.16 | 37% |
| 04047 | 35.47 ± 5.34 | 41.97 ± 2.43 | 28.47 ± 4.37 | 15% |
| 04050 | 30.97 ± 4.33 | | | 26% |
| 04089* | 27.80 ± 2.22 | 41.89 ± 2.26 | 32.45 ± 2.25 | 34% |

*The dosage is 0.5 mg/kg

It can be seen that, compared with the model group, except that compound 04047 has no significant effect on reducing the cerebral infarct area in model rats, all of compounds 04007, 04015, 04041, 04050, and 04089 can significantly reduce the cerebral infarct area in model rats, showing good neuroprotective effects. Compared with the positive control drug edaravone group, 5 mg/kg dose of compounds 04007, 04015, 04041, 04050 and 0.5 mg/kg dose of compound 04089 have equivalent or better efficacy than 6 mg/kg dose of edaravone group.

All literatures mentioned in the present invention are incorporated by reference herein, as though individually incorporated by reference. Additionally, it should be understood that after reading the above teaching, many variations and modifications may be made by the skilled in the art, and these equivalents also fall within the scope as defined by the appended claims.

The invention claimed is:

1. The compound of formula I or a stereoisomer, or a pharmaceutically acceptable salt thereof:

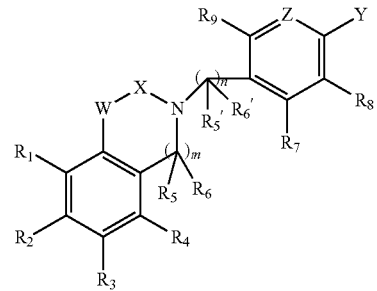

Formula I wherein,
R₁ and R₃ are chlorine;
R₂, R₄, R₅, R₅', R₆, R₆', R₇, R₈ and R₉ are hydrogen;
X is

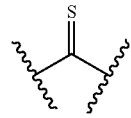

W is O;
m is 1;
n is 0;
Z is N;
Y is COOR₁₅ or CONR₁₆R₁₇;
R₁₅, R₁₆, and R₁₇ are each independently selected from the group consisting of hydrogen, C₁₋₆ alkyl, C₃₋₈ cycloalkyl, C₆₋₁₀ aryl, 3-15 membered saturated or unsaturated heterocycloalkyl or heteroaryl containing one or more heteroatoms selected from N, S or O, and —(C₁₋₆ alkylene)(3-15 membered saturated or unsaturated heterocycloalkyl or heteroaryl containing one or more heteroatoms selected from N, S or O); the alkyl, cycloalkyl, aryl, heteroaryl and heterocycloalkyl are optionally substituted by one or more substituents selected from the group consisting of hydroxyl, C₁₋₆ alkylene hydroxyl, —NR₂₀R₂₁, C₂₋₆ alkynyl, C₂₋₆ alkenyl, C₁₋₆ alkyl, C₃₋₈ cycloalkyl, 3-8 membered heterocycloalkyl containing one or more heteroatoms selected from N, S or O unsubstituted or substituted by C₁₋₆ alkyl, halogenated C₁₋₆ alkyl, C₁₋₆ alkyl substituted by amino and carboxyl, C₁₋₆ alkoxy, and —COO (C₁₋₆ alkyl); and
R₂₀ and R₂₁ are independently hydrogen or C₁₋₆ alkyl.

2. The compound or the stereoisomer, or the pharmaceutically acceptable salt thereof of claim 1, wherein
Y is COOR₁₅.

3. The compound or the stereoisomer, or the pharmaceutically acceptable salt thereof of claim 1, wherein
Y is COOR₁₅; and
R₁₅ is selected from the group consisting of hydrogen, C₁₋₆ alkyl, and C₃₋₈ cycloalkyl; wherein the alkyl and cycloalkyl are optionally substituted by one or more C₁₋₆ alkoxy.

4. The compound or the stereoisomer, or the pharmaceutically acceptable salt thereof of claim 1, wherein
Y is COOR₁₅; and
R₁₅ is C₁₋₆ alkyl substituted by C₁₋₆ alkoxy.

5. The compound or the stereoisomer, or the pharmaceutically acceptable salt thereof of claim 1, wherein the compound is selected from the group consisting of

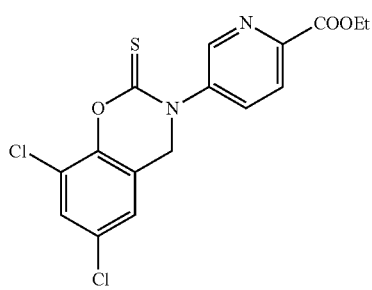

-continued

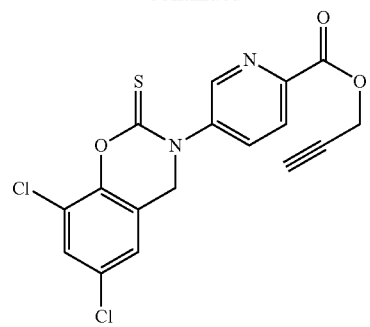

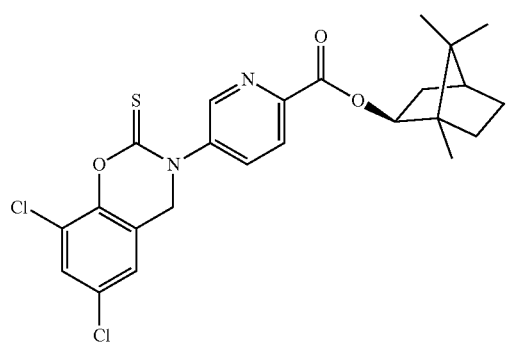

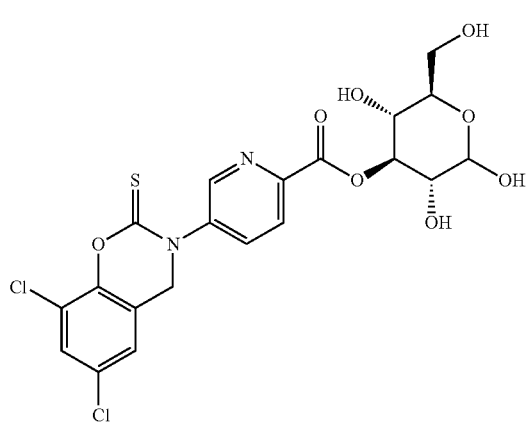

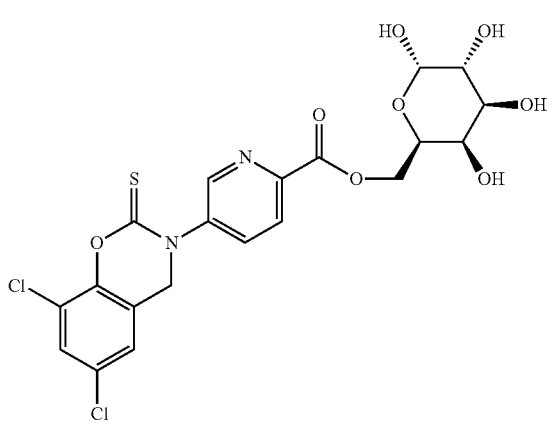

91
-continued
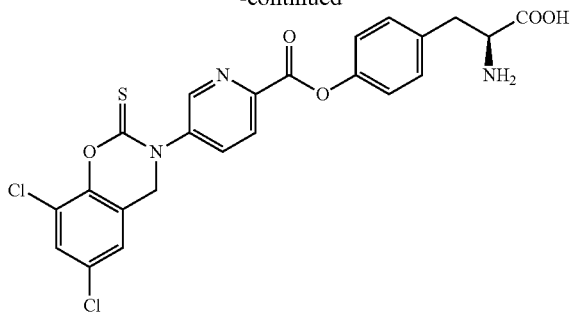
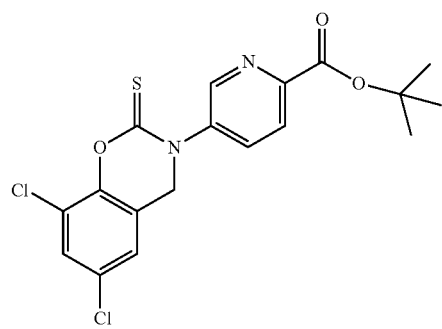
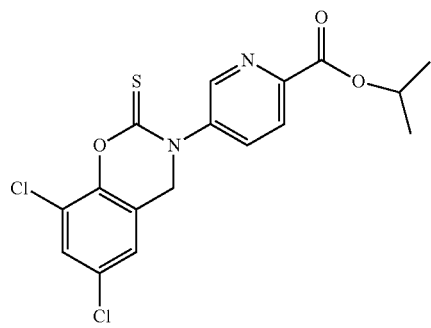
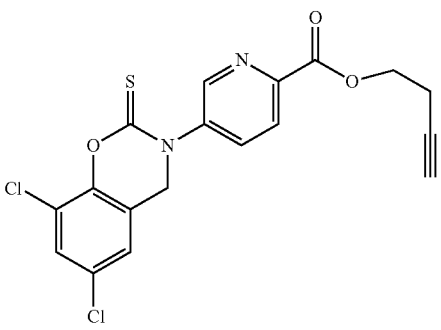
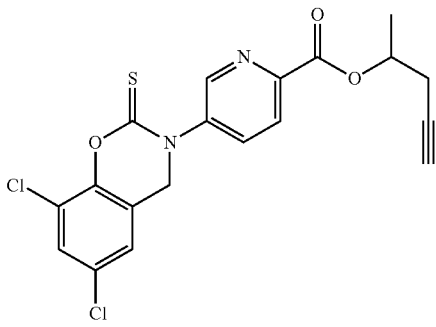
92
-continued
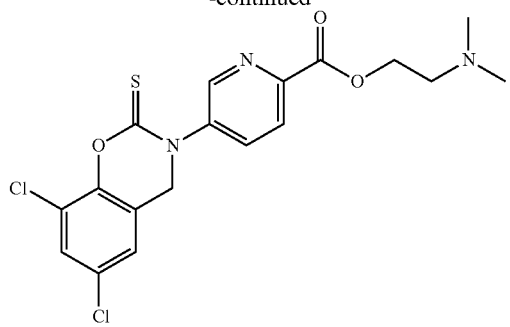
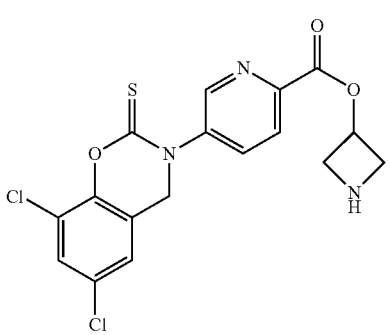
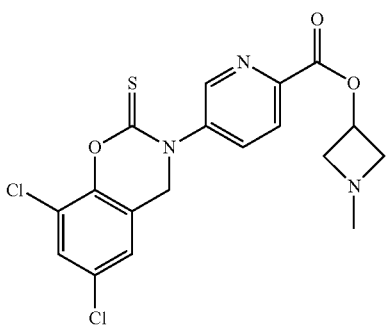
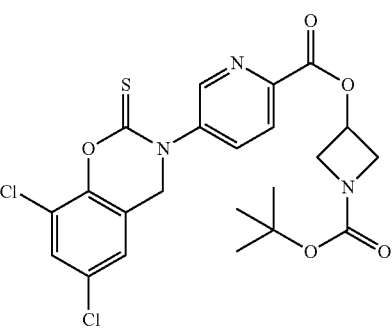
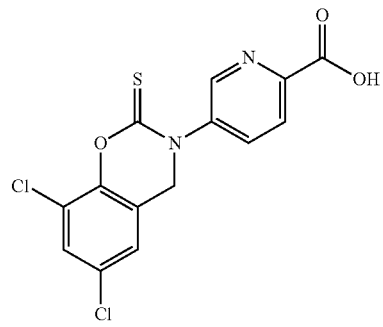

-continued

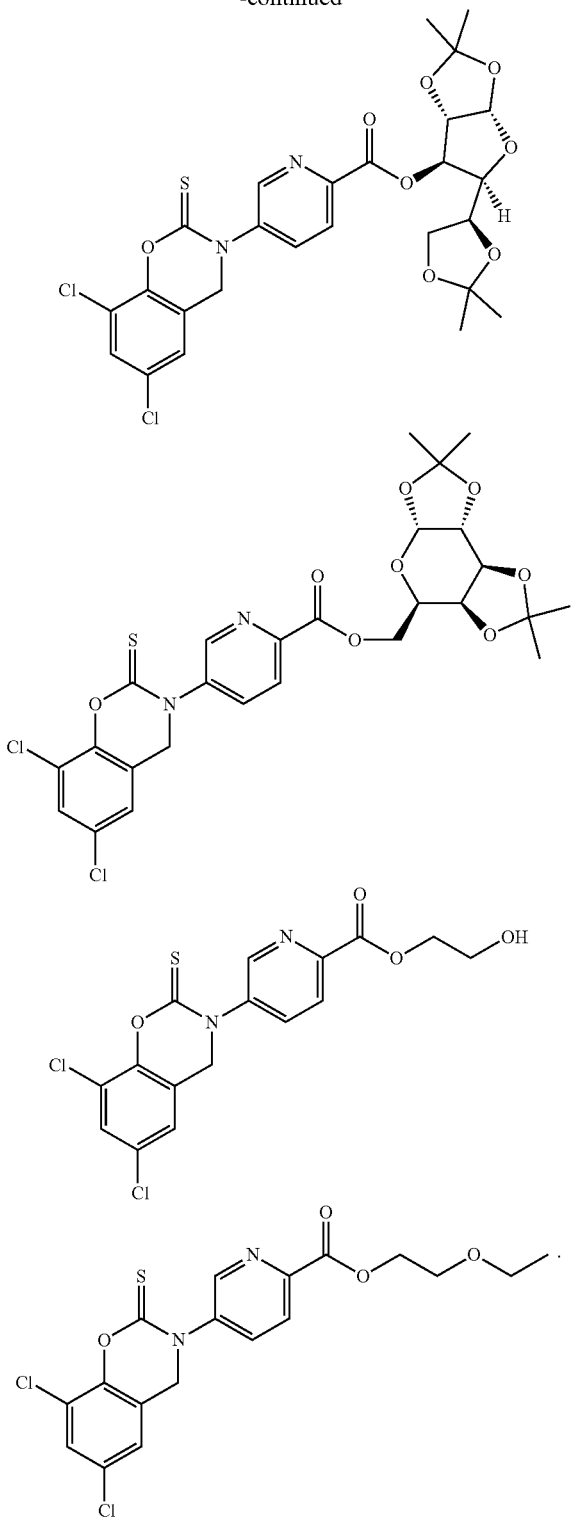

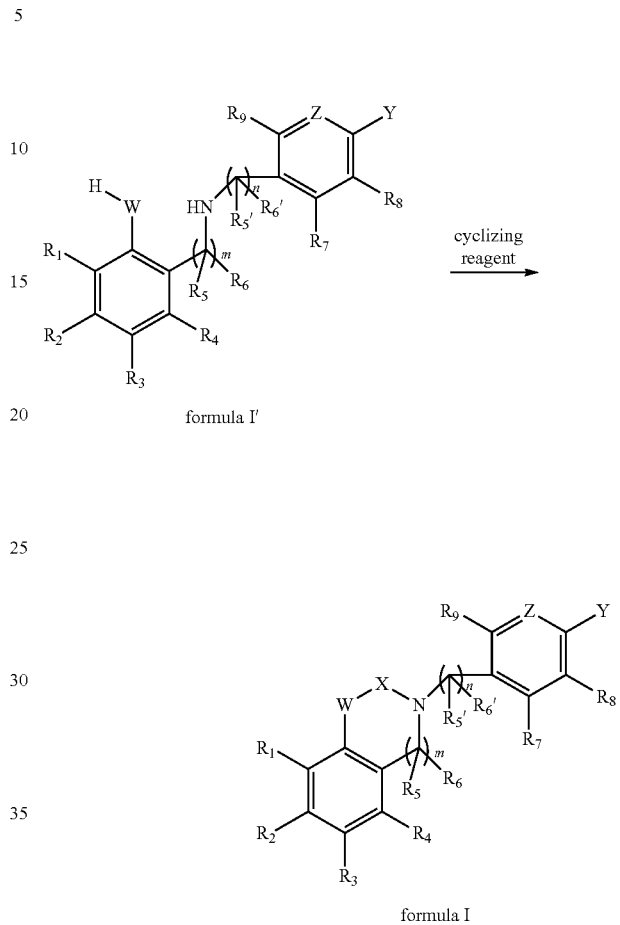

6. A preparation method for the compound or the stereoisomer, or the pharmaceutically acceptable salt thereof of claim 1 comprising the following steps:

reacting a compound of formula I' with a cyclizing reagent to obtain the compound of formula I.

7. A pharmaceutical composition comprising a pharmaceutically acceptable carrier and one or more compounds or the stereoisomer or the pharmaceutically acceptable salt thereof of claim 1.

8. A medicament for the treatment of neuropathic pain, migraine, inflammatory pain, chronic pain, stroke, brain injury, depression, Alzheimer's disease, epilepsy, or cerebral infarction comprising the compound, the stereoisomer, or the pharmaceutically acceptable salt thereof of claim 1.

* * * * *